United States Patent
Graef et al.

(10) Patent No.: US 8,893,959 B1
(45) Date of Patent: *Nov. 25, 2014

(54) CHECK CASHING BANKING SYSTEM CONTROLLED RESPONSIVE TO DATA BEARING RECORDS

(75) Inventors: H Thomas Graef, Bolivar, OH (US); Sathish Irudayam, North Canton, OH (US); Natarajan Ramachandran, Uniontown, OH (US); Michael Scanlon, Midlothian (GB); Jeffrey A Hill, Canton, OH (US)

(73) Assignee: Diebold, Incorporated, North Canton, OH (US)

( * ) Notice: Subject to any disclaimer, the term of this patent is extended or adjusted under 35 U.S.C. 154(b) by 138 days.

This patent is subject to a terminal disclaimer.

(21) Appl. No.: 13/616,114

(22) Filed: Sep. 14, 2012

Related U.S. Application Data

(63) Continuation-in-part of application No. 13/135,673, filed on Jul. 12, 2011, now Pat. No. 8,561,888, and a continuation-in-part of application No. 12/807,987, filed on Sep. 16, 2010, now Pat. No. 8,002,177, which is a continuation of application No. 12/584,307, filed on Sep. 2, 2009, now Pat. No. 7,798,398, which is a continuation of application No. 11/214,461, filed on Aug. 29, 2005, now Pat. No. 7,584,883.

(60) Provisional application No. 61/399,546, filed on Jul. 14, 2010.

(51) Int. Cl.
    *G07F 19/00* (2006.01)
(52) U.S. Cl.
    USPC .......................................................... 235/379
(58) Field of Classification Search
    USPC .......................................................... 235/379
    See application file for complete search history.

(56) References Cited

U.S. PATENT DOCUMENTS

| 4,355,797 A | * | 10/1982 | Graef et al. | ..................... 271/20 |
| 8,561,888 B1 | * | 10/2013 | Graef et al. | .................. 235/379 |

* cited by examiner

*Primary Examiner* — Karl D Frech
(74) *Attorney, Agent, or Firm* — Black, McCuskey, Souers & Arbaugh, LPA

(57) ABSTRACT

An automated banking machine is operable to cause financial transfers responsive to data read from data bearing records. The machine includes a card reader that can read from cards, user data that corresponds to financial accounts. The machine can operate responsive to the read card data to carry out transactions that transfer and/or allocate funds between accounts. The machine can provide a transaction receipt. The machine includes a cash dispenser to dispense cash to machine users. Value of dispensed cash can be assessed to an account which corresponds to read card data. The machine also includes a check acceptor device that can receive checks from users. The machine can image a received check and then read check data from the check image. An account determined from read card data can be credited the amount of the check.

20 Claims, 38 Drawing Sheets

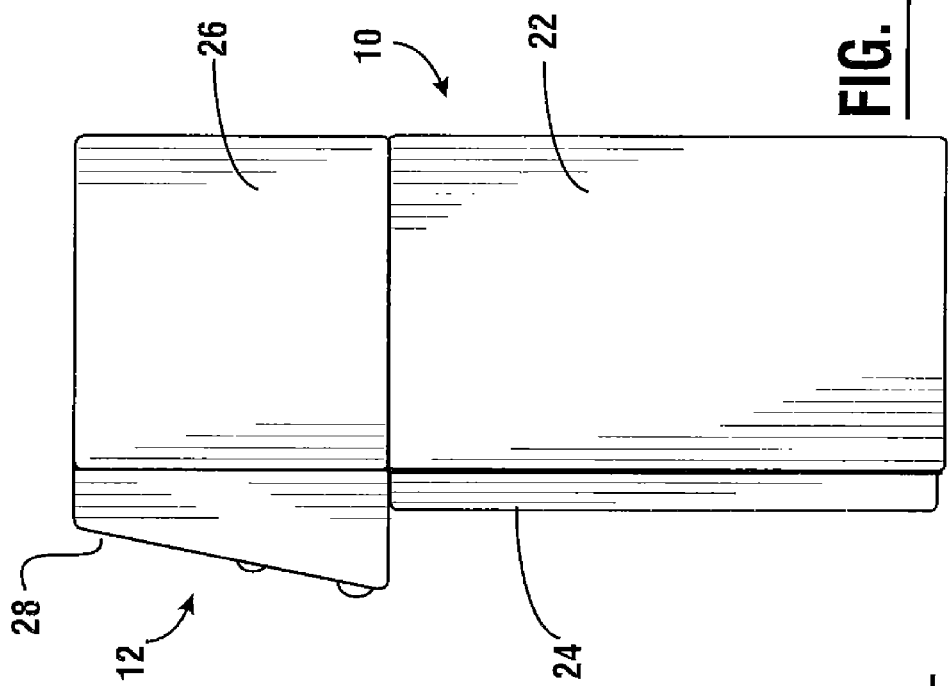
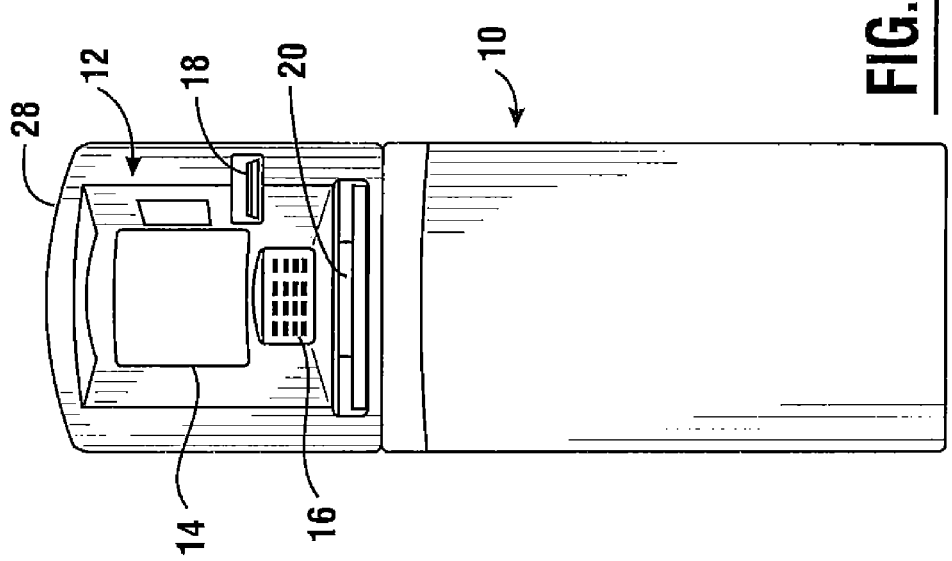

CHECK CASHING BANKING SYSTEM CONTROLLED RESPONSIVE TO DATA BEARING RECORDS

CROSS-REFERENCE TO RELATED APPLICATIONS

This application is a continuation of U.S. application Ser. No. 13/135,673 filed Jul. 12, 2011, which claims benefit pursuant to 35 U.S.C. §119(e) of Provisional Application 61/399,546 filed Jul. 14, 2010. application Ser. No. 13/135,673 is a continuation-in-part of U.S. application Ser. No. 12/807,987 filed Sep. 16, 2010, now U.S. Pat. No. 8,002,177, which is a continuation of U.S. application Ser. No. 12/584,307 filed Sep. 2, 2009, now U.S. Pat. No. 7,798,398, which is a continuation of U.S. application Ser. No. 11/214,461 filed Aug. 29, 2005, now U.S. Pat. No. 7,584,883. The entire disclosures of each of the aforementioned Applications are herein incorporated by reference as if fully rewritten herein.

TECHNICAL FIELD

This invention relates to banking system machines that operate responsive to data read from data bearing records such as user cards, and which subject matter may be currently classifiable in U.S. Class 235, Subclass 379. That is, certain banking machines are part of a banking system that is controlled by information sensed from data bearing records. The banking system causes indicia from a bearer card or record to be compared with computer information regarding the bearer. The banking system can also cause credit to be reallocated among various accounts. Some banking machines of the banking system can keep a check upon financial transactions. A machine can comprise a cash storage device, and also registering devices or equivalents to disclose to the machine user an amount of a transaction. The machine can make an autographic record of the transaction upon a movable strip of paper, and also move the paper. The machine can further comprise various subordinate devices for the purpose of compelling the user to correctly operate the machine. Thus, the invention relates to certain banking machines that may be viewed as registers for purposes of Class 235.

BACKGROUND OF INVENTION

Automated banking machines may include a card reader that operates to read data from a bearer record such as a user card. Automated banking machines may operate to cause the data read from the card to be compared with other computer stored data related to the bearer or their financial accounts. The machine operates in response to the comparison determining that the bearer record corresponds to an authorized user, to carry out at least one transaction which may be operative to transfer value to or from at least one account. A record of the transaction is also often printed through operation of the automated banking machine and provided to the user. Automated banking machines may be used to carry out transactions such as dispensing cash, the making of deposits, the transfer of funds between accounts and account balance inquiries. The types of banking transactions that may be carried out are determined by the capabilities of the particular banking machine and system, as well as the programming of the institution operating the machine.

Other types of automated banking machines may be operated by merchants to carry out commercial transactions. These transactions may include, for example, the acceptance of deposit bags, the receipt of checks or other financial instruments, the dispensing of rolled coin, or other transactions required by merchants. Still other types of automated banking machines may be used by service providers in a transaction environment such as at a bank to carry out financial transactions. Such transactions may include for example, the counting and storage of currency notes or other financial instrument sheets, the dispensing of notes or other sheets, the imaging of checks or other financial instruments, and other types of transactions. For purposes of this disclosure an automated banking machine, automated transaction machine, or an automated teller machine (ATM) shall be deemed to include any machine that may be used to automatically carry out transactions involving transfers of value.

Automated banking machines may benefit from improvements.

OBJECTS OF EXEMPLARY EMBODIMENTS

It is an object of an exemplary embodiment to provide an automated banking machine.

It is a further object of an exemplary embodiment to provide an automated banking machine which has a simpler customer interface.

It is a further object of an exemplary embodiment to provide an automated banking machine which has a single opening for receiving and providing various types of sheets and documents.

It is a further object of an exemplary embodiment to provide an automated banking machine which performs a plurality of banking transaction functions and which has a compact physical size.

It is a further object of an exemplary embodiment to provide an automated banking machine that may be more readily configured to provide different banking functions.

It is a further object of an exemplary embodiment to provide an automated banking machine that is economical to manufacture and operate.

It is a further object of an exemplary embodiment to provide an automated banking machine that accepts and delivers various types of banking documents in a stack from and to customers, respectively.

It is a further object of an exemplary embodiment to provide an automated banking machine that enables selectively separating sheets from a stack and processing such sheets in different ways depending upon the type of sheet.

It is a further object of an exemplary embodiment to provide an automated banking machine that enables selectively assembling document sheets into a stack.

It is a further object of an exemplary embodiment to provide a method for operation of an automated banking machine in which sheets are selectively removed from a stack by transporting the stack in a first transport path through an intersection with a second transport path, in which a sheet directing apparatus adjacent to the intersection selectively separates sheets from the stack.

It is a further object of an exemplary embodiment to provide a method for operation of an automated banking machine in which a sheet moving in a first transport path and a sheet moving in a second transport path are brought together in aligned relation to form a stack, as the sheets pass through an intersection of the first and second transport paths.

Further objects of exemplary embodiments will remain apparent in the following Detailed Description of Exemplary Embodiments and the appended claims.

The foregoing objects are accomplished in an exemplary embodiment by an automated banking machine having a transport which moves sheets or stacks of sheets along a first transport path. The first transport path extends from a user accessible opening on an interface of the machine. The machine also includes an internal second transport path for transporting sheets. The second transport path meets the first transport path at an intersection. A sheet directing apparatus is positioned adjacent to the intersection. The machine further includes at least one sheet dispensing device and at least one sheet accepting device for dispensing and receiving sheets, respectively. The sheet dispensing and receiving devices are in operative connection with either the first or second transport paths.

In operation of the machine a stack of sheets which may include various types of documents is received from a user is moved from the opening along the first transport path. As the stack passes the intersection the sheet directing apparatus is selectively operative to separate a sheet from the stack and direct the sheet into the second transport path. Once in the second transport path the separated sheet may be handled individually for processing or storage in the machine. Passing the stack through the intersection enables selectively removing sheets from the stack in response to operation of the sheet directing apparatus.

Sheets dispensed or otherwise held in the machine are enabled to be assembled into a stack by moving a sheet in the first transport path. A sheet in the second transport path is moved to the intersection in coordinated relation with the first sheet. The first and second sheets engage in aligned relation and form a stack in the first transport path as the sheets move through the intersection. Additional sheets are selectively added to the stack as the stack is thereafter again moved through the intersection while successive sheets are brought to the intersection through the second transport path. Various types of sheets are selectively assembled into the stack in the operation of the machine. Control circuitry operates the components of the machine to assemble the stack. Once the stack is assembled, it is delivered to the user by passing it along the first transport path to the user opening.

In exemplary embodiments data may be acquired and stored which is usable to determine the individual users who have provided and/or received particular sheets from the machine. This may enable the machine to determine the source or disposition of suspect notes for example. Alternatively or in addition, exemplary embodiments may limit the dispense of documents such as checks, money orders or cash from the machine to particular individuals to reduce the risk of money laundering or other illegal or fraudulent activity. Other exemplary embodiments may include other or additional features.

BRIEF DESCRIPTION OF DRAWINGS

FIG. 1 is a front plan view of an exemplary automated banking machine.

FIG. 2 is a left side view of the automated banking machine shown in FIG. 1.

DETAILED DESCRIPTION OF EXEMPLARY EMBODIMENTS

Figure 3:
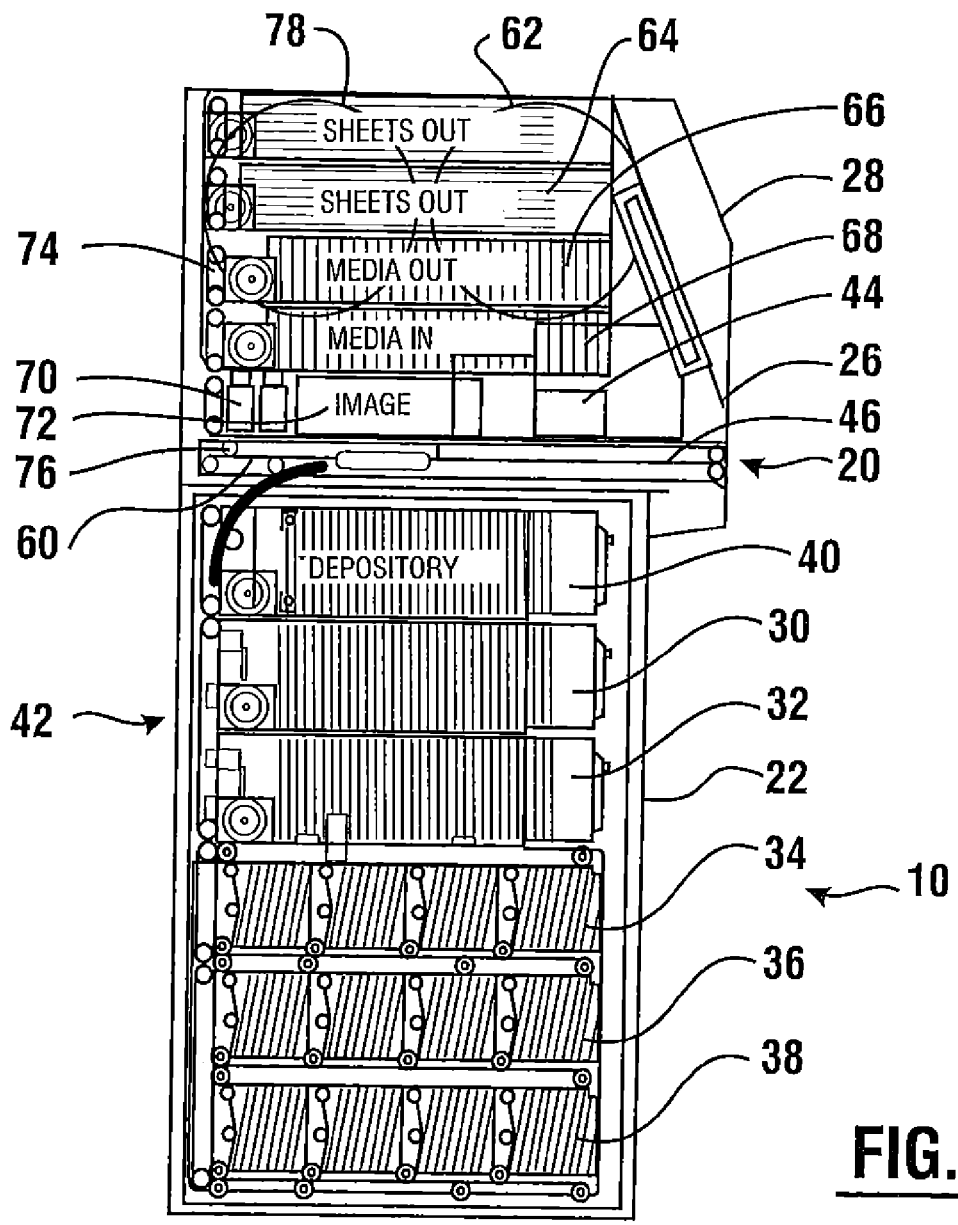
FIG. 3 is a schematic cross sectional view of the automated banking machine shown in FIG. 1.

Referring now to the drawings, and particularly to FIG. 1, there is shown therein an automated banking machine generally indicated 10. Machine 10 is an ATM. However, other exemplary embodiments can comprise other types of automated transaction machines. ATM 10 includes a user or customer interface generally indicated 12. Customer interface 12 includes a touch screen 14. Touch screen 14 is of a type known in the prior art which serves as both an input device and an output device. The touch screen enables outputs through displays on the screen and enables customers to provide inputs by placing a finger adjacent to areas of the screen.

Customer interface 12 further includes a keypad 16. Keypad 16 includes a plurality of buttons which may be actuated by a customer to provide inputs to the machine. Customer interface 12 further includes a card reader slot 18. Card slot 18 is used to input a card with encoded data thereon that is usable to identify the customer and/or the customer's account information. Card slot 18 is connected to a card reader of a conventional type for reading data encoded on the card. Other exemplary embodiments may include types of input devices other than a card reader and/or a keypad. Some embodiments may include input devices such as biometric readers that may be operative to receive customer identifying inputs such as fingerprints, iris scans, retina scans, face topography data, voice data or other inputs that provide data that is usable to identify a user. An example of an automated transaction machine (e.g., ATM) that uses biometric input devices and other types of input devices is shown in U.S. Pat. No. 6,023,688 the disclosure of which is incorporated herein by reference.

Customer interface 12 further includes an opening 20. Opening 20 as later explained, is used to receive stacks of sheets or documents from a customer operating machine 10. Opening 20 is also used to deliver stacks of documents to customers operating the machine. Although opening 20 is shown exposed in FIG. 1, it should be understood that in other embodiments it may be selectively covered by a movable gate or similar closure structure. It should be understood that these features of the described ATM user interface are exemplary and in other embodiments the user interface may include different components and/or features.

As shown in FIG. 2 machine 10 has a generally divided body structure which includes a chest portion 22. Chest portion 22 in the exemplary embodiment is preferably a secure chest and is used for holding items of value such as currency or deposits. Chest portion 22 has a door 24 which can be selectively opened to gain access to the interior of the chest portion. Door 24 preferably includes a combination lock or other locking mechanism (not shown) which prevents the chest portion from being opened by unauthorized persons.

Machine 10 further includes an upper enclosure portion 26. The upper enclosure portion has components of the customer interface 12 thereon. The customer interface portion 12 includes a fascia 28. Fascia 28 is preferably movably mounted on the upper enclosure portion 26 and may be selectively opened to gain access to components housed in the upper enclosure portion. A locking mechanism (not shown) is preferably included in the upper enclosure portion of the exemplary embodiment for preventing unauthorized persons from gaining access to the interior thereof.

As shown in FIG. 3 machine 10 includes a plurality of devices for carrying out banking transactions. It should be understood that the devices discussed hereafter are exemplary and that additional or different devices may be included in other embodiments.

The interior of ATM 10 is schematically shown in FIG. 3. The exemplary ATM includes devices for handling sheets such as notes and other documents. ATM 10 includes sheet dispensing devices, document producing devices and sheet receiving devices. Among the sheet dispensing devices are currency dispensers 30 and 32. Currency dispensers 30 and 32 may be of the type shown in U.S. Pat. No. 4,494,747, the disclosure of which is incorporated herein, which selectively dispense sheets one at a time in response to control signals. Currency dispensers 30 and 32 may include removable sheet holding containers or canisters which include indicia thereon. The canisters may be interchangeable and of the type shown in U.S. Pat. No. 4,871,085, the disclosure of which is incorporated herein. The indicia on the sheet holding canisters may be indicative of the type and/or properties of sheets held therein (i.e. currency type and denomination) and the indicia is read by a reading apparatus when the canister is installed in the machine.

The exemplary ATM may operate in response to the indicia on the canisters to adjust the operation of the dispensers to conform to the canister contents and position. In the exemplary embodiment the sheet holding canisters and other devices, may include indicia of the type shown in U.S. Pat. No. 4,871,085. The information represented by the indicia is read by the reading apparatus and the resulting signals transmitted to the machine control circuitry. The control circuitry adjusts operation of the sheet dispensing and receiving devices in response to the signals to conform to the type and character of the sheets held in the various canisters.

In the exemplary embodiment of machine 10 shown in FIG. 3, the machine preferably includes a note handling mechanism including sheet receiving and delivering devices 34, 36 and 38. The exemplary sheet receiving and delivering devices may be of the type shown in U.S. application Ser. No.

09/390,929 filed Sep. 7, 1999, the disclosure of which is incorporated herein by reference. The sheet delivering and receiving devices may enable receiving and storing sheets in selected compartments as well as selectively delivering sheets from the various compartments. As can be appreciated from the incorporated disclosure, some of the note handling mechanisms may receive and store notes only, others may dispense notes only and some may both receive and dispense notes. Other mechanisms may process sheets of types other than notes. Machine 10 further includes an envelope depository schematically indicated 40. Depository 40 is a device configured to accept and hold relatively thick sheet-like deposit envelopes deposited by customers in the machine.

Depository 40, currency dispensers 30 and 32 and sheet receiving and delivering devices 34, 36 and 38 are all positioned within the chest portion 22 of the machine 10. In the exemplary embodiment, the sheet dispensing and receiving devices, except for the depository, in the exemplary embodiment may be interchangeably positioned in the machine. The control circuitry adjusts operation of the machine accordingly based on the device positions and the indicia on the canisters or devices.

Each of the currency dispensers 30 and 32, sheet receiving and delivering devices 34, 36 and 38, and the depository 40 are in communication with a sheet transport path generally indicated 42. Sheet transport path 42 comprises a plurality of sheet transports which are aligned and in operative connection through a rear area of the chest portion. Sheet transport path 42 may include one or more sheet transports of the type shown in U.S. Pat. No. 5,240,638, the disclosure of which is incorporated herein. Each of the depository 40, currency dispensers 30 and 32 and sheet receiving and delivering devices 34, 36 and 38 are in operative connection with the sheet transport path 42, and are enabled to deliver sheets to and/or receive sheets from the sheet transport path 42.

Sheet transport path 42 extends through an opening (not shown) in the chest portion 22 of the ATM chest. Wiring that connects components located in the chest portion with components in the upper enclosure portion 26 also extends through an opening in the chest portion and is connected to control circuitry, schematically indicated 44. The control circuitry 44 preferably includes at least one processor in operative connection with at least one memory or data store, and is operative to carry out programmed instructions based on data stored in the memory. The control circuitry in the exemplary embodiment operates the machine to carry out the operations hereinafter described.

Upper enclosure portion 26 includes the fascia 28 and the customer accessible opening 20. A first transport path generally indicated 46 extends inside the machine from opening 20. First transport path 46 preferably includes an interwoven belt type transport of the type shown in U.S. Pat. No. 5,797,599, the disclosure of which is incorporated by reference. A transport of this type is schematically shown in FIG. 5 and is generally indicated 48.

Transport 48 includes a plurality of spaced first rolls 50 and a plurality of intermediate spaced second rolls 52. Rolls 50 and 52, which are preferably crowned rolls, support elastomeric belts thereon. First rolls 50 support first belts 54 and second rolls 52 support second belts 56. Belts 54 and 56 extend longitudinally in the transport 48.

Figure 5:
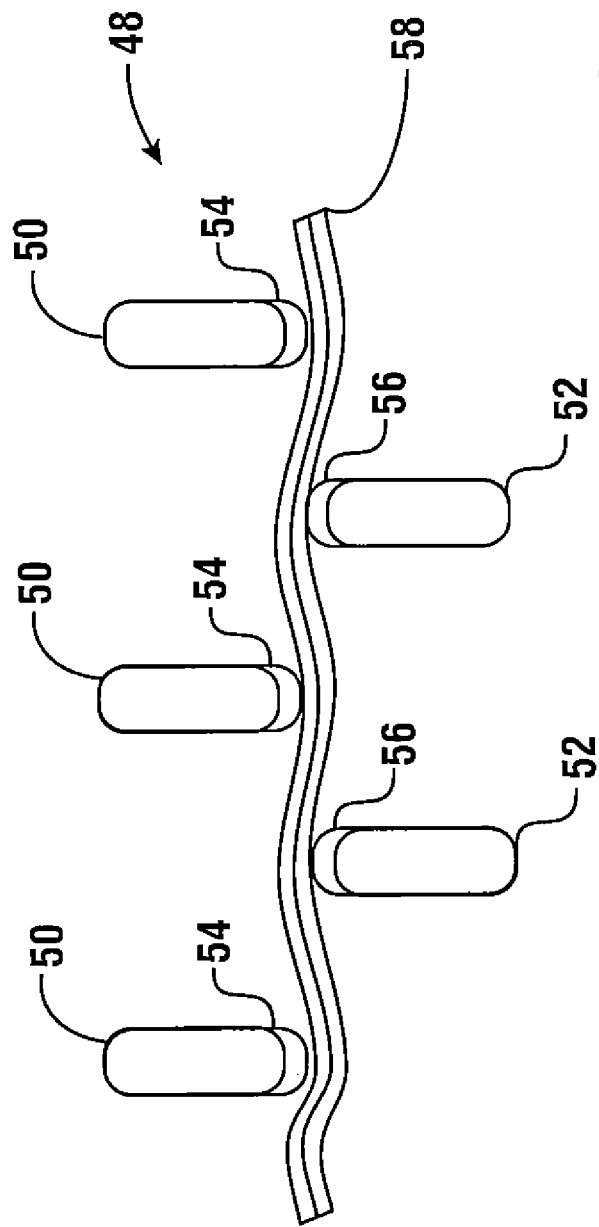
FIG. 5 is a transverse cross sectional view of a transport used in the automated banking machine.

A stack of sheets schematically represented by sheet 58 in FIG. 5, move in engaged relation with belts 54 and 56 in the transport as described in the incorporated patent disclosure. The configuration of transport 48 enables transporting stacks having varied numbers and types of sheets, as well as transporting passbooks and other forms of stacked sheets. The transport of the exemplary embodiment is useful because of its ability to transport sheets of various types, having varied thicknesses and frictional properties while minimizing skewing.

Referring again to FIG. 3, first transport path 46 intersects with transport path 42 at a first intersection, generally indicated 60. As hereinafter explained the exemplary embodiment comprises a separating mechanism that separates sheets individually from a stack and a stack assembly mechanism that produces a stack of documents. In the exemplary embodiment, sheets are selectively stacked and unstacked while moving through first intersection 60 to enable processing of sheets within the machine 10.

Upper enclosure portion 26 also includes various sheet producing, dispensing and/or receiving devices. These dispensing and receiving devices may include dispensers or devices for receiving or dispensing sheets similar to those shown in U.S. Pat. No. 4,494,747 or U.S. application Ser. No. 09/390,929, and may include removable canisters for holding sheets therein. Such removable canisters may also include indicia of the type described in U.S. Pat. No. 4,871,085, which are read by apparatus within the machine. The control circuitry may be operative to control the operation of the machine in response to the indicia.

Devices 62 and 64 may serve as part of document producing device and may hold sheets such as blank receipt or statement forms. Alternatively, one of such canisters may hold blank instruments which must be completed, such as scrip forms, money orders or travelers checks. A further sheet dispensing device 66 may dispense documents that need to be completed before dispense documents that need to be completed before dispense such as bank checks or documents that are dispensed without further processing such as plates of stamps.

A sheet receiving device 68 is also preferably included in the upper enclosure portion. Sheet receiving device 68 may be used for holding sheets such as checks or other instruments, which have been input by a customer to the machine and which have been imaged and/or canceled through processing in the machine.

The exemplary upper enclosure portion further includes at least one printing device schematically indicated 70. Printing device 70 may be used for selectively printing on sheets under control of the control circuitry. An imaging device schematically indicated 72 is also included. Imaging device 72 is preferably of the type which enables reading and generating an electronic image of a document, such as that shown in U.S. Pat. No. 5,534,682 or U.S. Pat. No. 5,923,413 the disclosures of each of which are incorporated as if fully rewritten herein. In some embodiments an imaging device may operate in conjunction with the control circuitry to produce signals which comprise an electronic representation of an image of a check or other instrument. The electronic representation may include all or selected portions of one or both sides of the sheet. For example in some situations it may be suitable to obtain an electronic image of alphabetic, numerical and/or other symbols or features on the check. For example such data may be analyzed using character recognition software such as software commercially available from Check Solutions Inc. or other companies to determine the maker, amount, and/or other data pertinent to the check for purposes of receiving and/or cashing the check. Thus, financial check data can be read by one or more check readers.

In some embodiments printing devices or other devices may also serve as part of a cancellation device. Such a cancellation device may serve to print or otherwise mark checks or other documents received by the machine. For example, the machine may mark as cancelled checks which are received and processed by the ATM. In some embodiments such checks or documents may be marked through operation of the cancellation device and then stored in a check storage location in the machine. In other embodiments the cancellation device after the document has been imaged, may mark the document as cancelled and return the cancelled document to the user of the machine. In some embodiments one or more such cancelled documents may be assembled in a stack in a manner hereafter discussed, when returned to a user. Cancelled documents may also be returned in an assembled stack with other documents such as a receipt for the transaction and/or notes dispensed by the ATM as a result of cashing the check. The control circuitry may also operate to store data corresponding to the check and the identity of the user of the ATM providing the check to the machine in one or more data store for purposes of record keeping. For example the data store may store data corresponding to the check with the data that corresponds to a user's account number, biometric data, photograph or other data usable to identify a user. Of course these approaches are exemplary and other approaches may be used.

In some embodiments the control circuitry may operate to check the user identity data before cashing one or more checks. The control circuitry may also be programmed to limit the risk of check cashing by unauthorized persons and/or to reduce the risk of money laundering. For example before cashing a check the control circuitry may operate to compare data corresponding to the characters identifying the payee indicated on the check to other input data corresponding to the user of the machine and/or to the characters on the check comprising the endorsement. If the payee, user and/or endorsement data does not correspond, the control circuitry may operate so that the check is not accepted or cashed. Further the control circuitry may operate to determine the amount and/or nature of checks the particular user has presented at the ATM and/or within a prior time period. The ATM may also operate to communicate with other computers in a network to determine the amount or nature of checks presented by the user at other ATMs. If the user's check presenting activities fall outside certain established programmed parameters, such that the user's activities may be indicative of theft of the check or money laundering, for example, the ATM may refuse the transaction.

In the alternative and/or in addition a user presenting a check may be required by the control circuitry to provide at least one biometric input. This may be done even in circumstances where the user may be identifiable by data on a card or another manner. The biometric identification data may be compared to stored data (and/or user card data) and used to evaluate the check cashing activities of this particular user. A determination may be made by the control circuitry or by a remote computer to determine if the activities fall outside the established parameters such that the current transaction is suspicious and not permitted. In this way a user with multiple cards and/or multiple identities may be prevented from conducting transactions that might be suspicious in terms of theft or money laundering. Of course some embodiments may also operate to cross check biometric data with data on a debit or credit card or other item or other device presented by the user to the ATM to provide greater assurance as to the identity of the user. Of course in other embodiments other approaches may be used.

The exemplary handling devices 62, 64 and 66, as well as the sheet receiving device 68, of the ATM are all in communication with one or more transports. These transports may be of the type shown in U.S. Pat. No. 5,342,165, the disclosure of which is incorporated herein, or other suitable sheet transport devices. The sheet transport devices form a sheet transport path 74. Sheet transport path 74 extends to transport path 46 and meets transport path 46 at a second intersection 76.

The upper enclosure portion may also include additional or other devices. Such devices may include a journal printer as schematically indicated by rolls 78. The journal printer is used to make a paper record of transactions conducted at machine 10. Electronic journals may also be made by the control circuitry and stored in memory. Other devices which may be included in the machine are other types of document producing devices, audio output devices, customer sensors, cameras and recorders, biometric sensing devices and other apparatus suitable for use in the operation of the particular type of automated banking machine.

Figure 4:
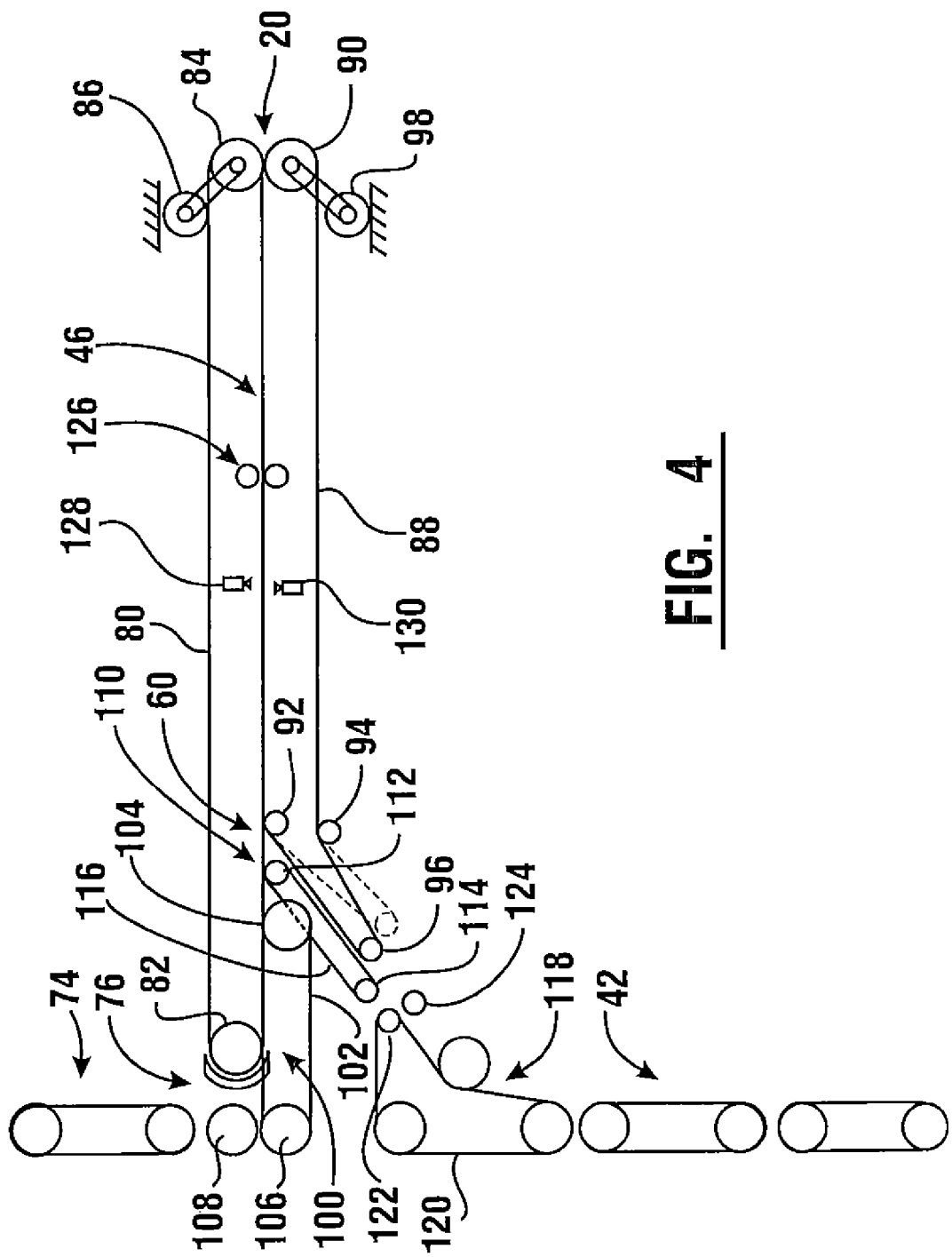
FIG. 4 is a side schematic view of a first transport path and a second transport path in the automated banking machine.

Transport paths 42, 46 and 74 of the exemplary machine are shown in greater detail in FIG. 4. Transport path 46, which includes one or more transports of the interwoven belt type shown in FIG. 5. The transport path has therein a plurality of first belts 80 which extend between first rolls 82 and 84. First rolls 82 and 84 are selectively driven by a reversible drive, schematically indicated 86.

Second belts 88 extend between a second roll 90 and rolls 92, 94 and 96. Second belts 88 are driven by a second reversible drive schematically indicated 98. As shown in FIG. 4, roll 96 is selectively movable for purposes which are later explained. Of course it should be understood that the belts and rolls shown in the first transport path 46 are actually a plurality of spaced belts and rolls of the type shown in FIG. 5.

First transport path 46 further includes a further transport section 100. Transport section 100 is similar to the transport shown in FIG. 5 and includes a plurality of third belts 102 journaled on spaced rolls 104 and 106.

Rolls 106 have positioned adjacent thereto a plurality of holding rolls 108. Rolls 108 are positioned in spaced axial intermediate relation of third belts 102. This configuration imparts a wave configuration to sheets and stacks of sheets in a manner comparable to that imparted to sheets held by transport 48 as shown in FIG. 5. Holding rolls 108 and transport section 100 are independently driven by reversible drives (not shown) under the control of the control circuitry 44.

Adjacent to first intersection 60, where sheet path 42 meets sheet path 46, is a sheet directing apparatus generally indicated 110. Sheet directing apparatus 110 includes sheet engaging rolls 112 and further rolls 114. Rolls 112 and 114 have resilient belts 116 mounted thereon. It should be understood that rolls 112 and 114 are driven by one or more independent reversible drives (not shown) under control of the control circuitry 44. It should be understood that rolls 112 and 114 and belts 116 in FIG. 4, represent a plurality of such belts and rolls which are preferably disposed in intermediate relation between the lower flights of first belts 80.

Transport path 42 further includes transport 118 which is adjacent to depository 40. Transport 118 includes a plurality of rolls which drive belts 120 in response to a reversing drive (not shown). Rolls 122 which are engaged with belts 120, as well as rolls 124 which are independently driven by one or more reversible drives (not shown), are positioned in the sheet path 42 adjacent to rolls 114 and 96. The purpose of this configuration is later discussed in detail.

As schematically represented in FIG. 4 transport path 46 includes sensing devices. These sensing devices are in operative connection with the control circuitry 44, and operate to sense features of sheets and stacks of sheets in the sheet transport path. A thickness sensor schematically indicated 126 is preferably provided for sensing the thickness of sheets, stacks of sheets, or sheet like deposit envelopes that move along transport path 46. Indicia reading devices 128 and 130 are preferably operative to sense indicia on sheets and envelopes moving in the transport path. The sensing devices may include photo reflective devices, magnetic sensing devices or other appropriate devices for distinguishing currency, various types of negotiable instruments and deposit envelopes. For example in some embodiments the sensing devices in combination with the control circuitry in the machine may comprise a validating device for assessing the validity of notes or other documents. An example of such a validating device is shown in U.S. Pat. No. 5,923,413 the disclosure of which is incorporated herein. In some embodiments the validating device may additionally or alternatively be operative to identify individual notes. For example, the validating device may produce through algorithms one or more distinctive values that are generally uniquely associated with a particular note. In addition or in the alternative, the validating device may include character recognition capabilities which enable determination of the serial numbers or other unique characters associated with particular notes. This may enable some embodiments of the machine to store in correlated relation in at least one data store, data that uniquely identifies a note input to the ATM and the particular user who provided the note to the machine. This may enable the ATM to identify a particular suspect note and capture the information on the user who provided it to the machine. The particular type, position and capabilities of sensing devices and/or validating devices used in a particular machine will depend on the characteristics and types of documents which are intended to be processed by the machine.

Various sheet manipulating and processing operations performed by the exemplary automated banking machine of the described embodiment are now explained in detail with reference to FIGS. 6-21.

Figure 6:
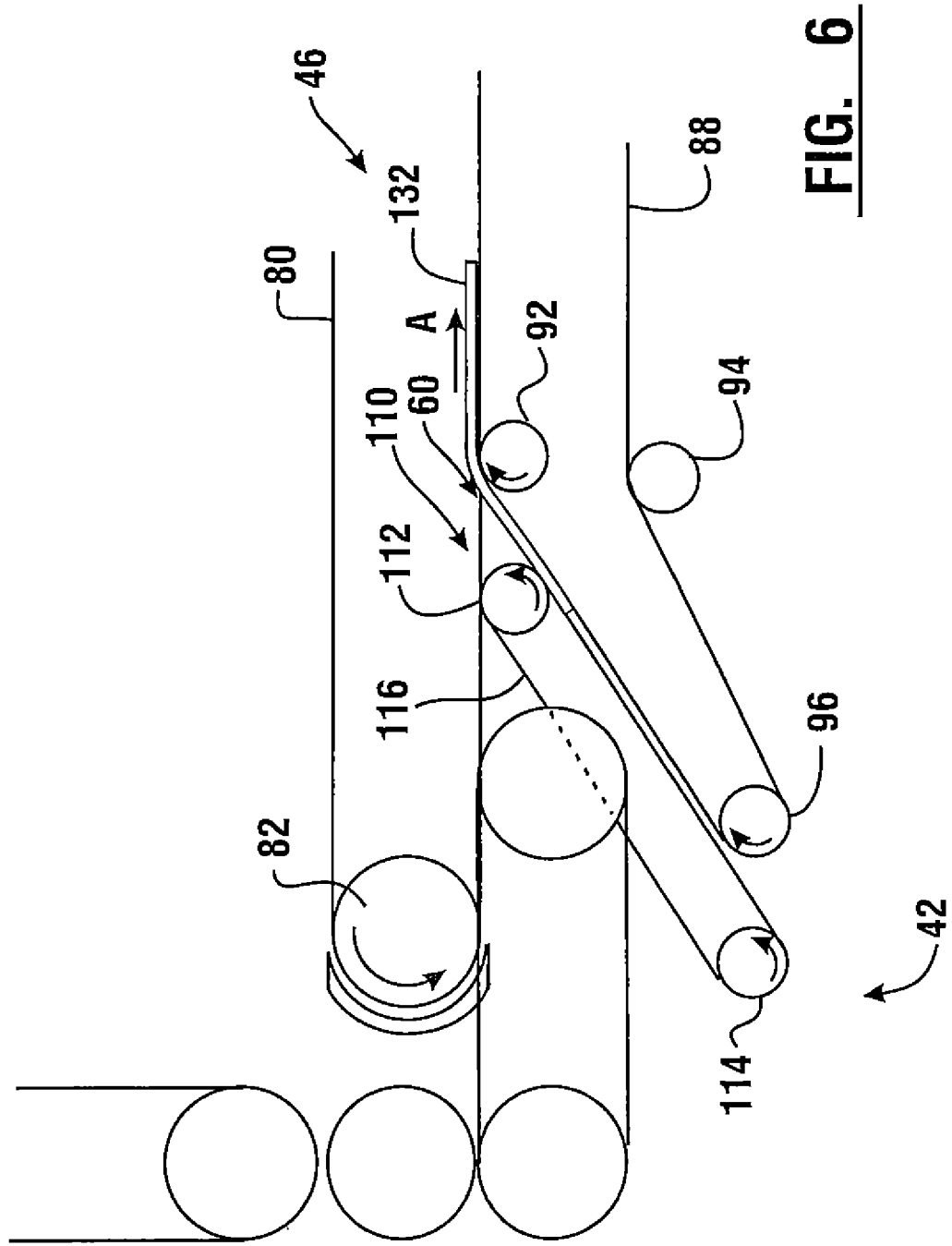
FIG. 6 is a schematic side view of a sheet moving from the second transport path to the first transport path through an intersection.

FIG. 6 shows a sheet 132 moving through the intersection 60 of the first sheet path 46 and sheet path 42. Sheet 132, prior to reaching the position shown in FIG. 6, may have been dispensed by one of the sheet dispensing devices positioned adjacent to transport path 42 and moved adjacent to the intersection by the transports which make up the transport path. As sheet 132 approaches the intersection it is engaged by belts 116 of the sheet directing apparatus 110, as well as belts 88. The control circuitry operates the drives which move the belts to work in cooperating relation to move the sheet toward the intersection. Once the sheet is passed through the intersection it is engaged between the lower flights of belt 80 and the upper flights of belts 88, and the sheet 132 is carried in the first direction indicated by Arrow A in FIG. 6. As will be appreciated from FIG. 4, Arrow A is in the direction of the customer opening 20 of the automated banking machine.

Figure 7:
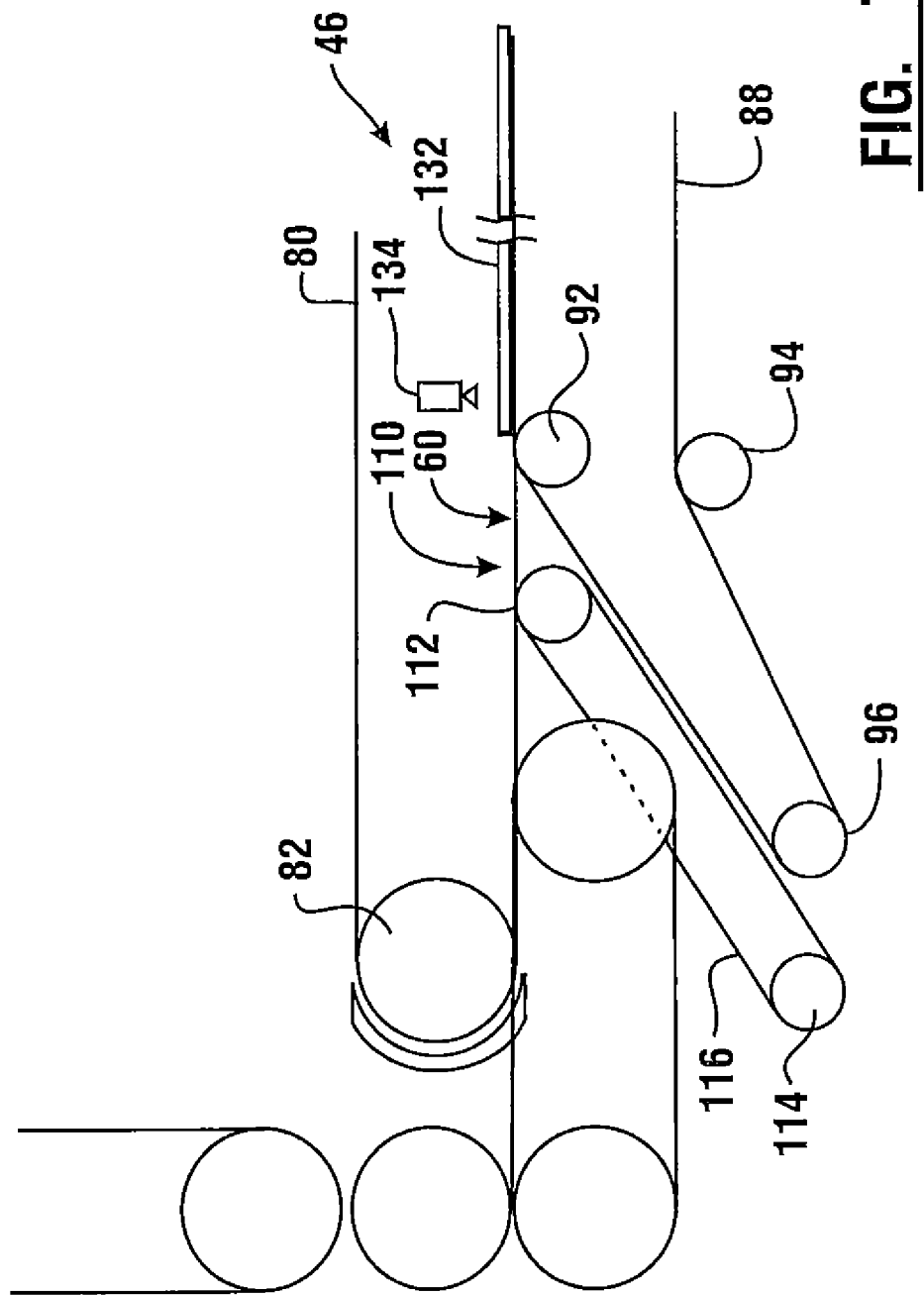
FIG. 7 is a view similar to FIG. 6 with the sheet moved into the first transport path from the intersection.

As shown in FIG. 7 in the mode of operation currently being described, the structures act as a stack assembly mechanism (e.g., a stacker). Once sheet 132 is fully moved through the intersection in the first transport path 146, movement of the sheet in the first direction is stopped. This is accomplished by the control circuitry 44 operating the transport drives in accordance with its program logic stored in memory, and in response to customer inputs at the customer interface. A sensor schematically indicated 134 positioned in the first sheet path senses the position of the sheet. Sensor 134 is in operative connection with the control circuitry. Sensor 134 may be one of several types of sensors suitable for sensing the position of sheets, such as a photo reflective type sensor. Once sheet 132 is in the position shown in FIG. 7, belts 80 and 88 are stopped.

Figure 8:
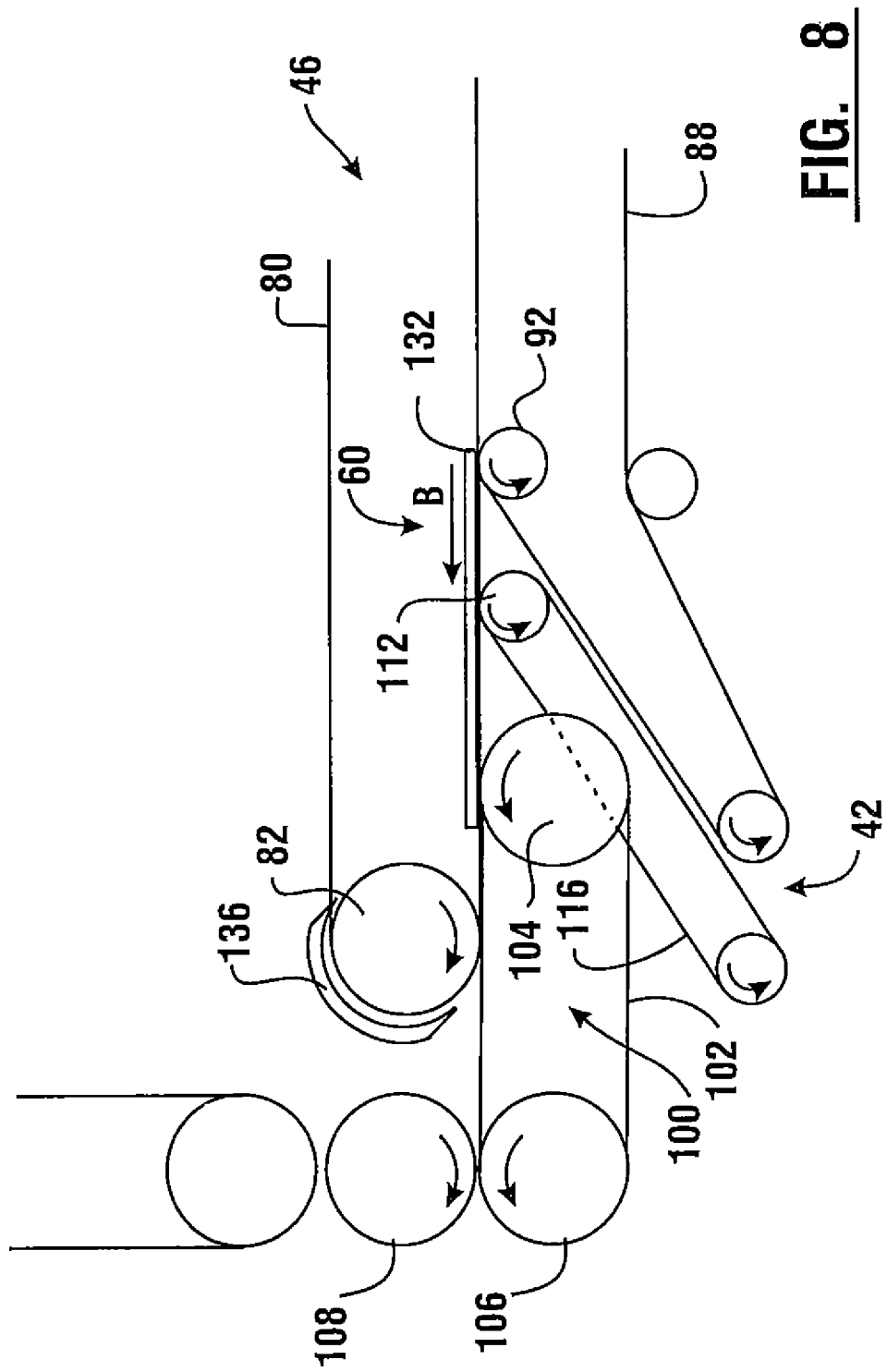
FIG. 8 is a schematic view similar to FIG. 7 with the sheet moving in an opposed direction through the intersection.

As shown in FIG. 8, the control circuitry now operates the components of the machine to move sheet 132 in a second opposed direction as indicated by Arrow B. To move sheet 132 through the intersection in the opposed direction, sheet engaging rolls 112 and belts 116 rotate to prevent sheet 132 from passing into the second sheet transport path 42. Transport section 100 is also operated by the control circuitry to engage sheet 132 and move it in the opposed direction. A sheet turnover member 136 later described in detail, is moved to enable sheet 132 to pass roll 82 in the first sheet path.

Figure 9:
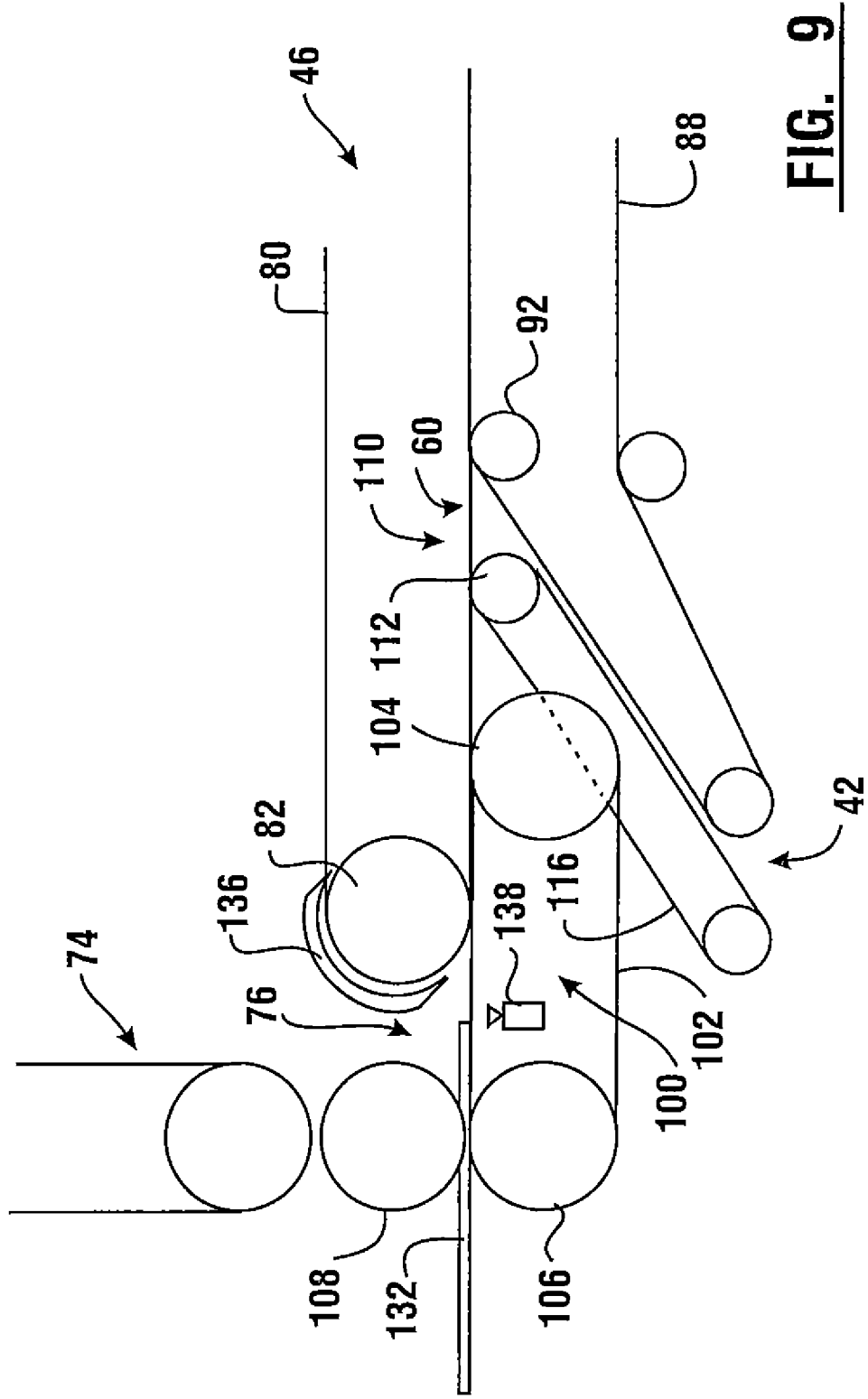
FIG. 9 is a schematic view similar to FIG. 8 with the sheet held in a holding device.

As shown in FIG. 9 sheet 132 is moved in the second direction until it is engaged between holding rolls 108 and transport section 100. A sensor which is schematically indicated 138 is positioned to sense that sheet 132 is positioned in the holding device provided by the combination of holding rolls 108 and transport section 100. Sensor 138 is operatively connected to the control circuitry which operates to stop further movement of sheet 132 in the second direction when it has reached the position shown. It should be noted that sheet 132 in this position is held adjacent to second intersection 76, which is the intersection of sheet path 74 and sheet path 46.

Figure 10:
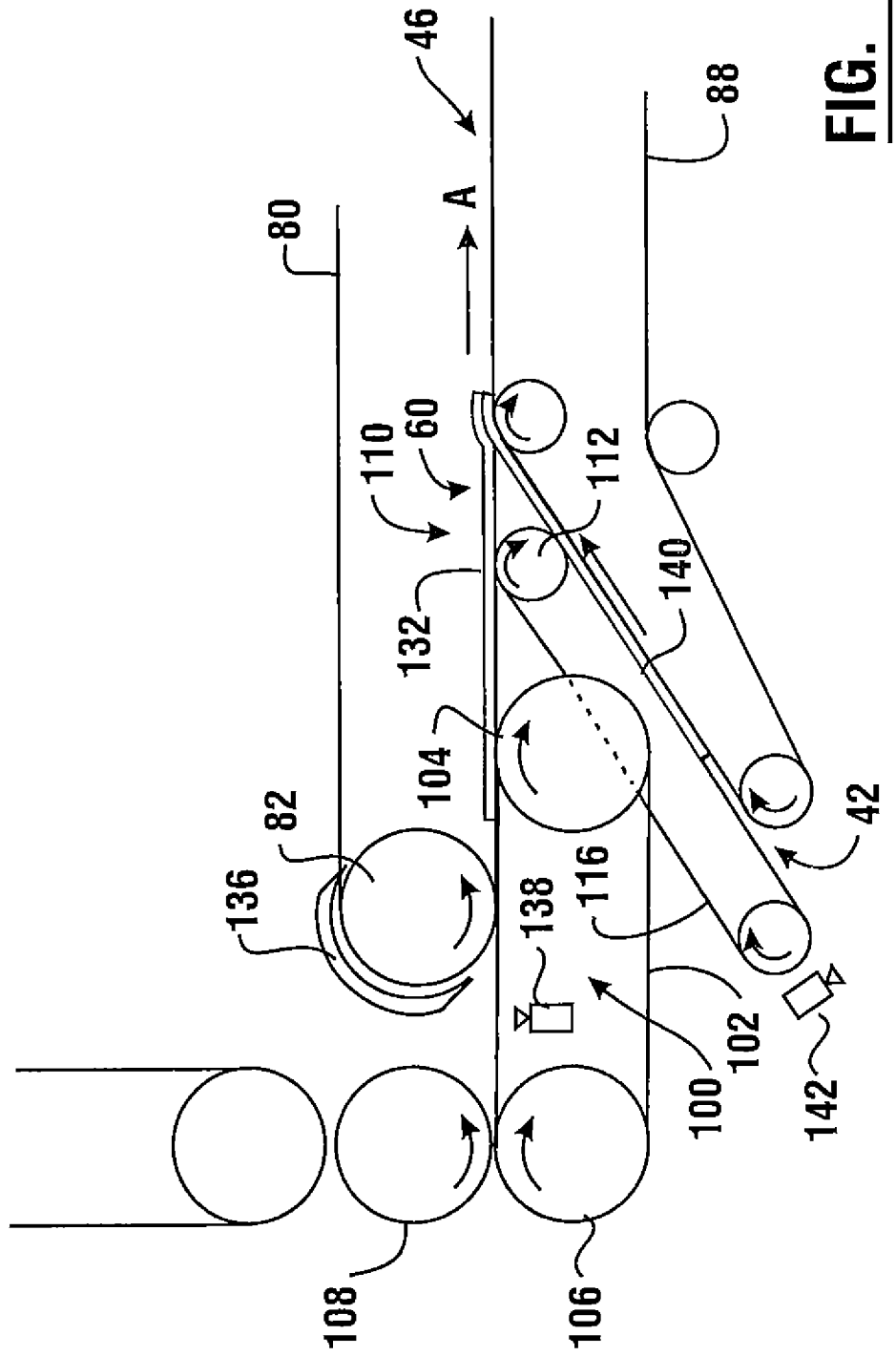
FIG. 10 is a view similar to FIG. 9 with the sheet moving in the intersection and engaging a second sheet being delivered through the second transport path, the second sheet engaging in aligned relation with the first sheet to form a stack.

The next step in the operation of the exemplary stack assembly mechanism is represented in FIG. 10. A further sheet 140 is moved in transport path 42 toward the intersection 60. Sheet 140 may be dispensed by one of the sheet dispensing devices, sheet producing devices or is otherwise in the path, and is moved toward the intersection. As sheet 140 moves adjacent to the intersection it is engaged by the belts 116 of sheet directing apparatus 110 as well as belts 88. Sheet 140 is also sensed by a sensor 142 in transport path 42. Sensor 142 is in operative connection with the control circuitry. The control circuitry operates to accurately coordinate the movement of the sheet 140 in engagement with the sheet directing apparatus 110 and belts 88.

As sheet 140 moves toward the intersection 60 the control circuitry operates to begin moving sheet 132 in the first direction along path 46 toward the intersection. The control circuitry coordinates the operation of the drives for the various components so that sheet 140 and sheet 132 pass through the intersection 60 in coordinated relation. As a result, sheets 132 and 140 engage in aligned, abutting relation so as to form a stack as they move through the intersection 60.

Figure 11:
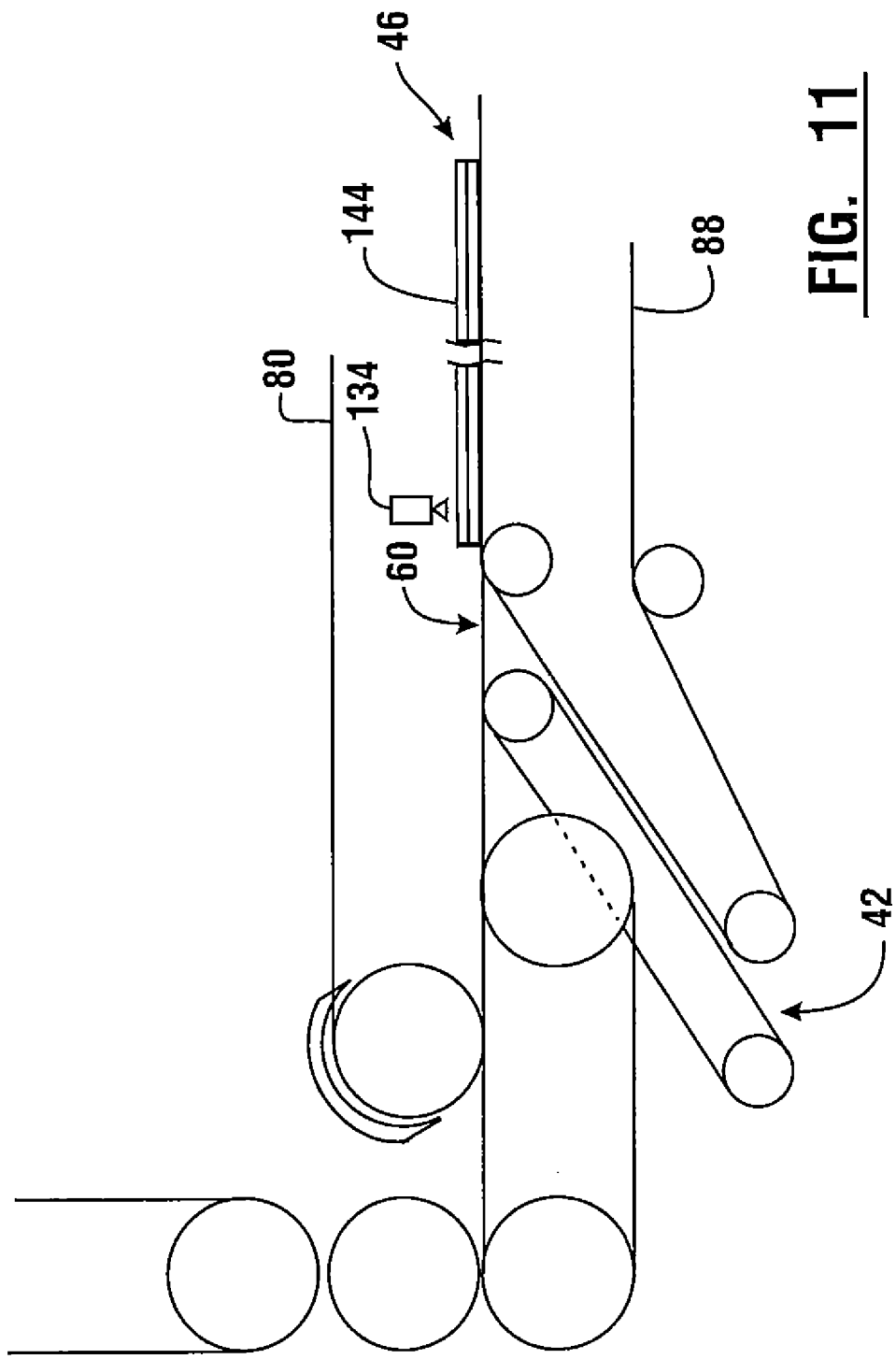
FIG. 11 is a schematic view similar to FIG. 10 in which the stacked pair of sheets have passed through the intersection.

As shown in FIG. 11 once sheets 140 and 132 have passed intersection 60 in the first direction, they are in a stack generally indicated 144. As schematically indicated in FIG. 11, in this mode of operation sensor 144 is operative to sense passage of the stack through the intersection and the control circuitry is operative to stop movement of the stack in the first direction in response to signals from the sensor. After sheets 132 and 140 have combined to form stack 144, additional sheets may be added to the stack. This is accomplished by moving the stack 144 in the second direction similar to that which is done with sheet 132 previously, as represented in FIG. 8. Stack 144 is moved to the position shown in FIG. 12 in which it is held by the holding device formed by holding rolls 108 and transport section 100. Thereafter, additional sheets may be added to the stack by passing sheets on transport path 42 and engaging such sheets in aligned relation with the stack in a manner similar to that represented in FIG. 10.

It will be appreciated that a stack comprising a significant number of generally aligned and abutting sheets may be formed in the manner described. Because the sheets are selectively dispensed from the dispensing devices and/or sheet producing devices adjacent to transport path 42, the sheets may be stacked in a desired order as determined by the control circuitry. For example, sheets which are currency notes may be stacked in order from highest to lowest denomination, or vice versa. Particular sheets may be placed in a desired location within the stack. Once the stack has been assembled in the desired manner by the control circuitry of the machine, it may be moved in first transport path 46 to the opening 20 so it may be taken by a customer.

Figure 12:
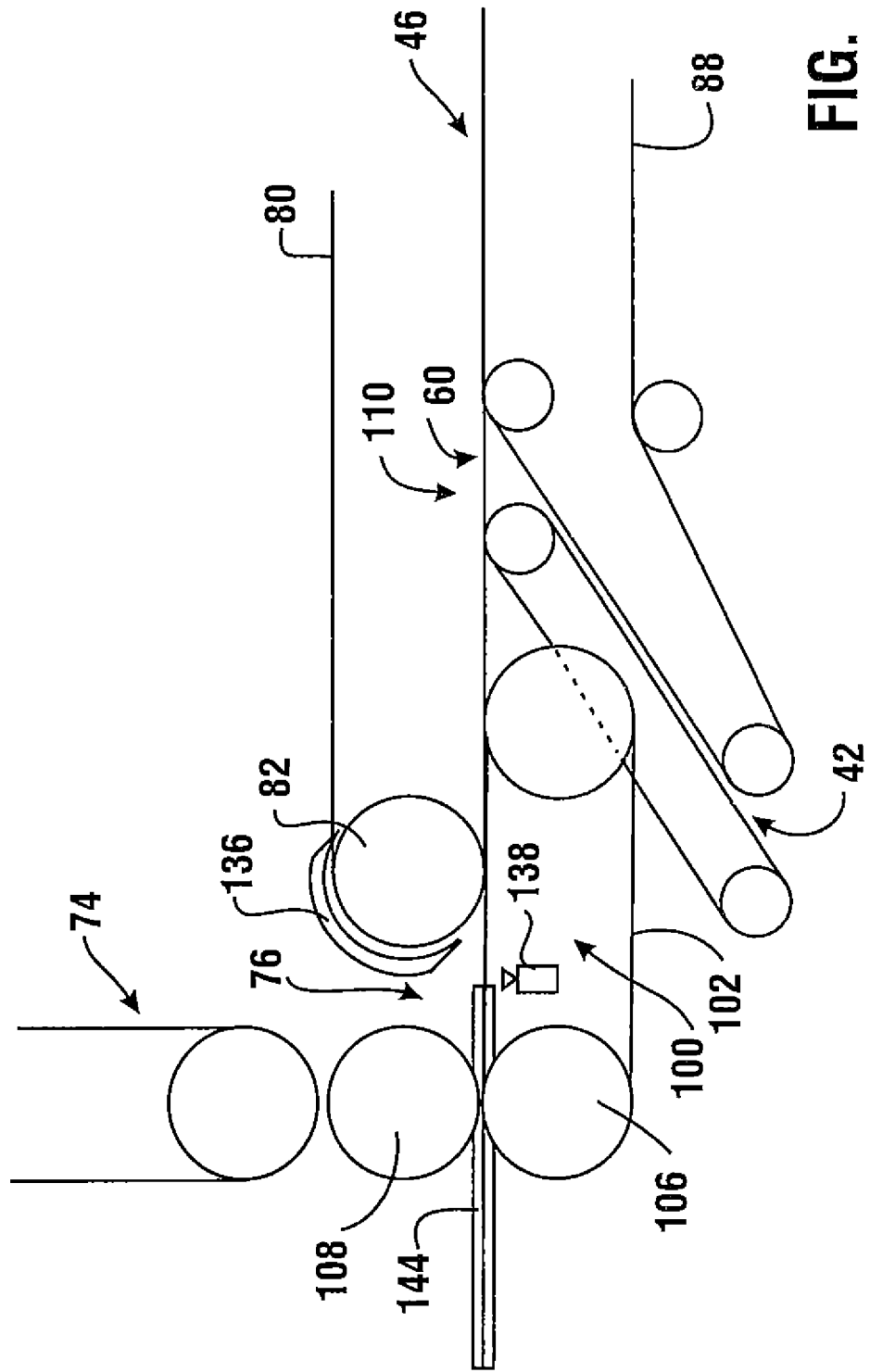
FIG. 12 is a schematic view similar to FIG. 11 in which the stacked sheets are held in the holding device.

It should also be noted that in the position of stack 144 shown in FIG. 12, the stack is positioned in the holding device formed by holding rolls 108 and transport section 100 adjacent to intersection 76. Intersection 76 is the intersection of transport path 46 and transport path 74. Transport path 74 extends to the devices housed in the upper enclosure portion 26 of machine 10.

Figure 16:
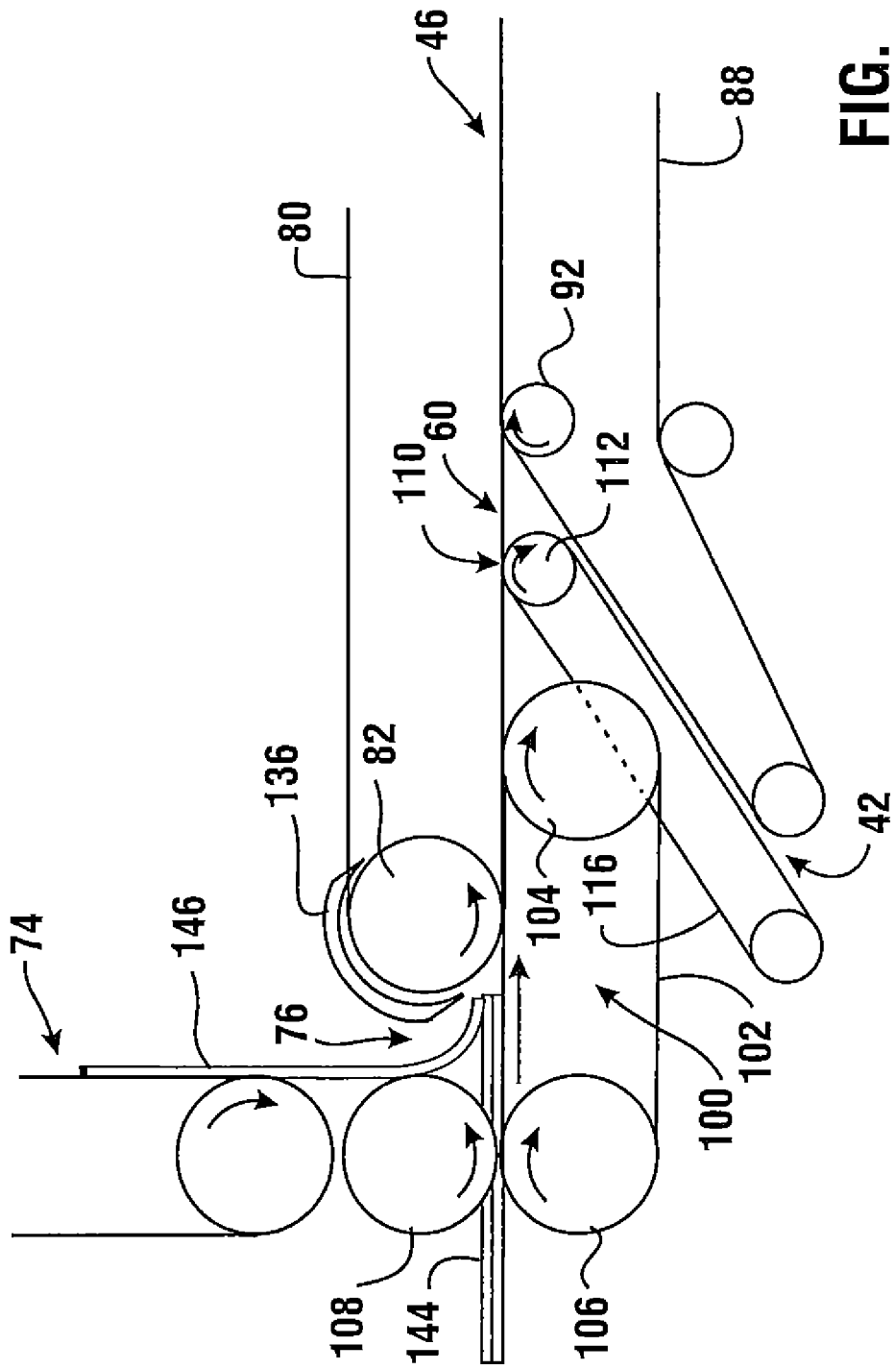
FIG. 16 is a schematic view showing a sheet passing through a second intersection between the first transport path and a third transport path.

As schematically represented in FIG. 16, a sheet 146 may be moved from one of the devices adjacent to sheet path 74 to engage the stack 144 at intersection 76 as the stack moves in the first direction. This enables adding sheets to the stack which are housed in the sheet dispensing devices and/or document producing devices adjacent to sheet path 74. The stack formed by the addition of sheets from sheet path 74 may be moved through sheet path 46 to the customer.

It will be understood that sheets from sheet path 74 may be delivered individually through intersection 76 into sheet path 46, and may thereafter be added to a stack formed at intersection 60 in a manner similar to that previously described. It should also be understood that sheet path 74 includes appropriate sensors that are operatively connected to the control circuitry. The control circuitry operates so that sheets from the sheet path 74 may be added to a stack in engaged, aligned relation with the other sheets in the stack as the sheets pass through intersection 76. As a result the associated structures operate as a further stack assembly mechanism.

Figure 15:
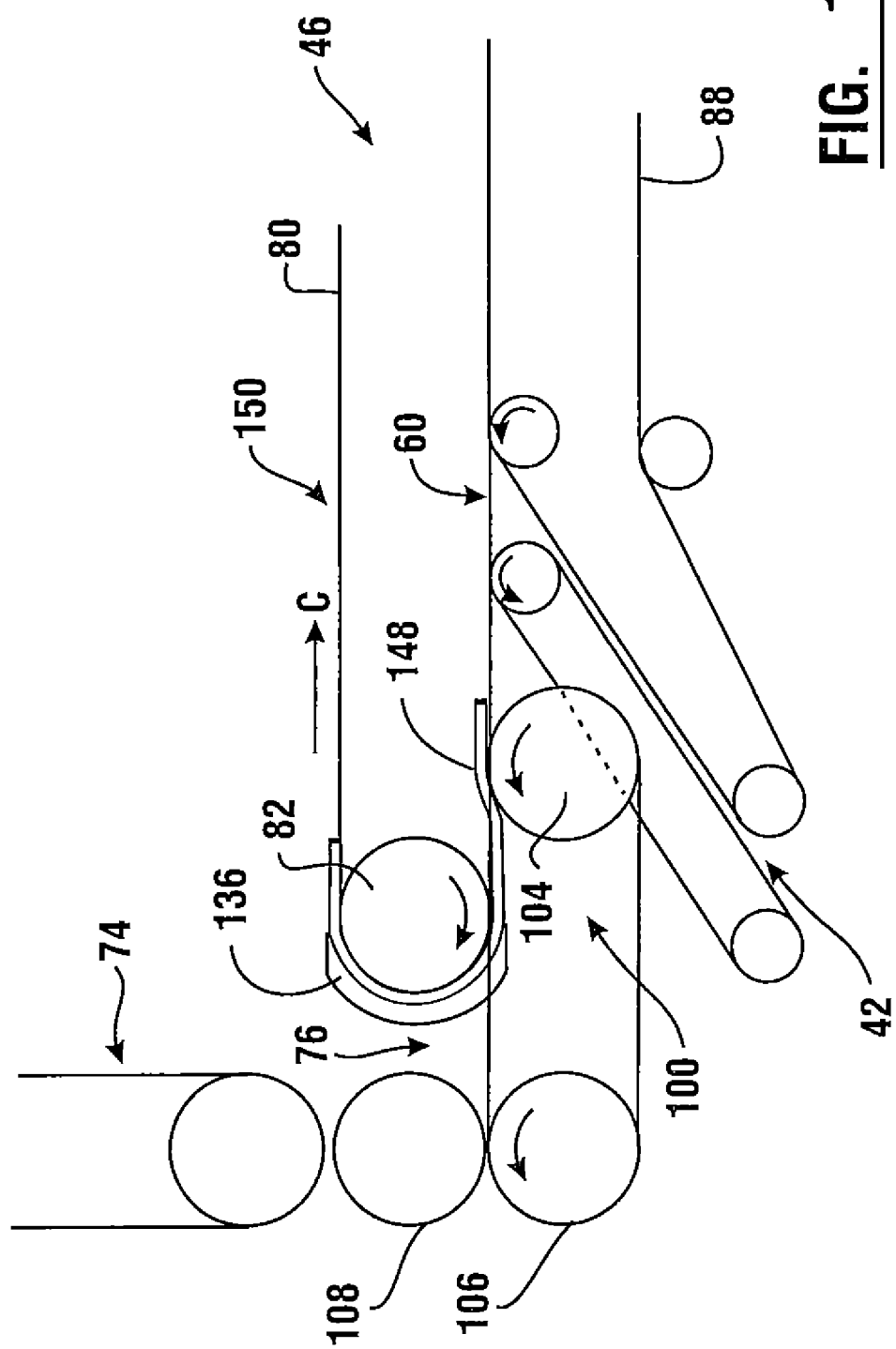
FIG. 15 is a schematic view of the first and second transport paths showing a sheet being reoriented by a sheet turnover device.

As shown in FIG. 15, exemplary machine 10 further includes the capability of taking sheets in the first sheet path and turning them over using a turnover device. This may be done as shown in FIG. 15, through the use of sheet turnover member 136. Exemplary sheet turnover member 136 comprises a member including arcuate guides or tines conforming to the contour of rolls 82. When the turnover member is positioned adjacent to rolls 82, such as in FIG. 15, a moving sheet 148 is caused to be turned over from the position of the sheet in the first sheet path 46. This is accomplished by moving sheet 148 in the direction of Arrow C in FIG. 15. In the exemplary embodiment the upper belt flights of belt 80 are part of a sheet path generally indicated 150. Sheet path 150 extends adjacent to printing device 70 and imaging device 72 shown in FIG. 3. As a result, the sheet may be selectively moved into sheet path 150 for purposes of conducting printing or marking thereon, such as by a cancellation device, for producing an electronic image of the sheet by an imaging device, or both. Of course other or different functions may be performed.

Once the printing or imaging activity has been conducted on the sheet in sheet path 150, the sheet may be returned to the first sheet path 46. Once the sheet 148 is returned to the first sheet path it may be selectively moved to one of the other sheet paths 42 or 74. From these sheet paths it may be directed into and stored in an appropriate sheet storage device or location in the machine. Alternatively, sheet 148 may be selectively moved to be combined in a stack with other sheets at intersections 60 or 76. This may in some embodiments provide for the delivery of cancelled checks to a user. Such cancelled checks may be delivered in a stack with other checks, receipts, notes or other documents.

In some embodiments the sheet turnover members 136 may be configured so that sheets in transport path 150 may be directly added to a stack of sheets at the intersection of sheet path 46 and the turnover device. This is accomplished by configuring or moving the turnover member so that the tines in the lower position do not interfere with the passage of a stack of sheets in the first direction past the turnover member. This feature provides yet another stack assembly mechanism and may be particularly advantageous when a customer receipt is printed on a sheet by the printer in sheet path 150, and it is desired to have the receipt at the top of the stack. This may be achieved by positioning the stack in the holding device formed by holding rolls 108 and transport section 100, and moving the stack in the first direction to the right in FIG. 15 as the printed receipt sheet is engaged in aligned relation with the top of the stack as the stack moves toward opening 20.

It should be understood that in other embodiments, sheets from paths 74 and 42, as well as from path 150, may all be added to a stack as the stack moves from the holding device provided by transport section 100 and holding rolls 108, in the first direction toward the customer. This can be readily envisioned from the schematic view shown in FIG. 16 with the stack 144 moving to the right as shown, and sheets being added to the stack as the stack passes roll 82 and again as the stack moves through intersection 60. As will be appreciated by those skilled in the art, numerous configurations and operations of the system may be provided depending on the functions carried out by the machine as well as the programming and configuration of the control circuitry.

Figure 18:
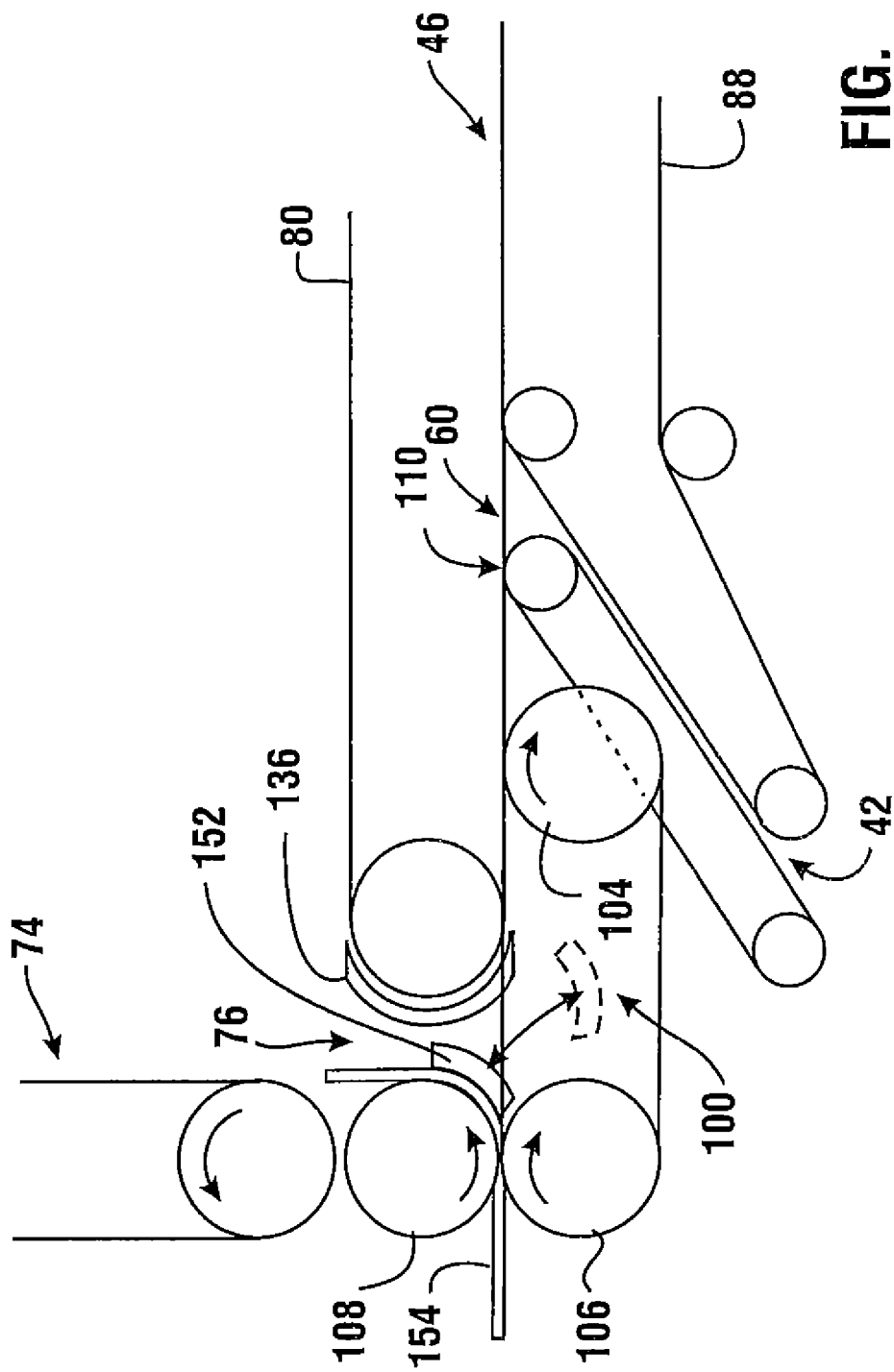
FIG. 18 is a schematic view showing the first, second and third transport paths, with a sheet moving from the holding device to the third transport path.

It should be understood that other sheet turnover devices, other than, or in addition to turnover member 136, may be provided in other embodiments. For example, in FIG. 18 a directing member 152 is shown in cooperating relation with roll 108. Directing member 152 is selectively movable between the position shown, wherein it is adjacent to roll 108 and the position shown in phantom. As represented in FIG. 18, when the directing member 152 is in the position shown it is operative to direct a sheet 154 that is held in the holding device formed by transport section 110 and holding rolls 108 into transport path 74. Sheet 154 may be moved in transport path 74 to a sheet handling device for storage therein in the manner previously discussed.

Alternatively, turnover of the sheet 154 may be accomplished by moving it into transport path 174 and thereafter disposing directing member 152 away from roll 108. Once this is done, sheet 154 may again be directed into path 146 and moved to the right as shown in FIG. 18 so that sheet 154 will move in a manner comparable to that of sheet 146 shown in FIG. 16. This will result in the orientation of sheet 154 being reversed in sheet path 46 from its original orientation.

The components adjacent to intersection 60 may also be operated as a sheet turnover device. This is represented schematically in FIG. 20. This is accomplished by having a sheet 156 initially positioned in the first sheet path similar to sheet 132 in FIG. 7. The sheet is then moved into the second sheet path at intersection 60 by operating the sheet directing apparatus 110 in a manner that is later discussed in detail. Once sheet 156 is in the second sheet path, the direction of belts 88 and 116 is reversed while the lower flights of belt 80 are moved to move the sheet in the second direction indicated by Arrow B. This results in the sheet being turned over from its original orientation in the transport.

Figure 20:
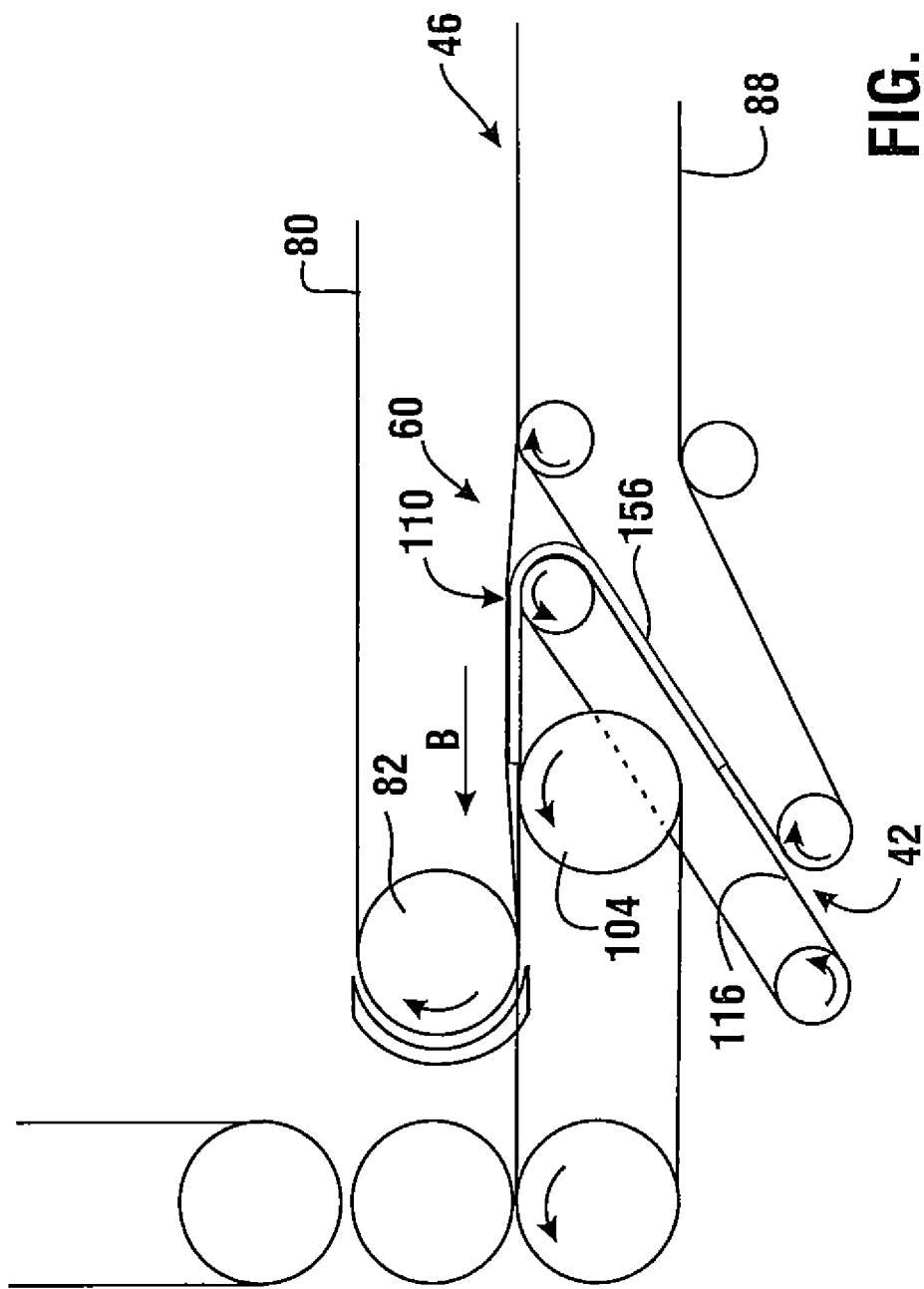
FIG. 20 is a schematic view showing the first and second transport paths with a sheet moving from the second transport path to the first transport path, and schematically demonstrating how the sheet directing apparatus is used as part of a sheet turnover device.

It should be further understood that sheets which originate in transport path 42 may also be directed in the manner shown in FIG. 20. This feature enables selectively positioning sheets and turning them over through a number of different mechanisms this enhances the capabilities of the exemplary automated banking machine.

Figure 13:
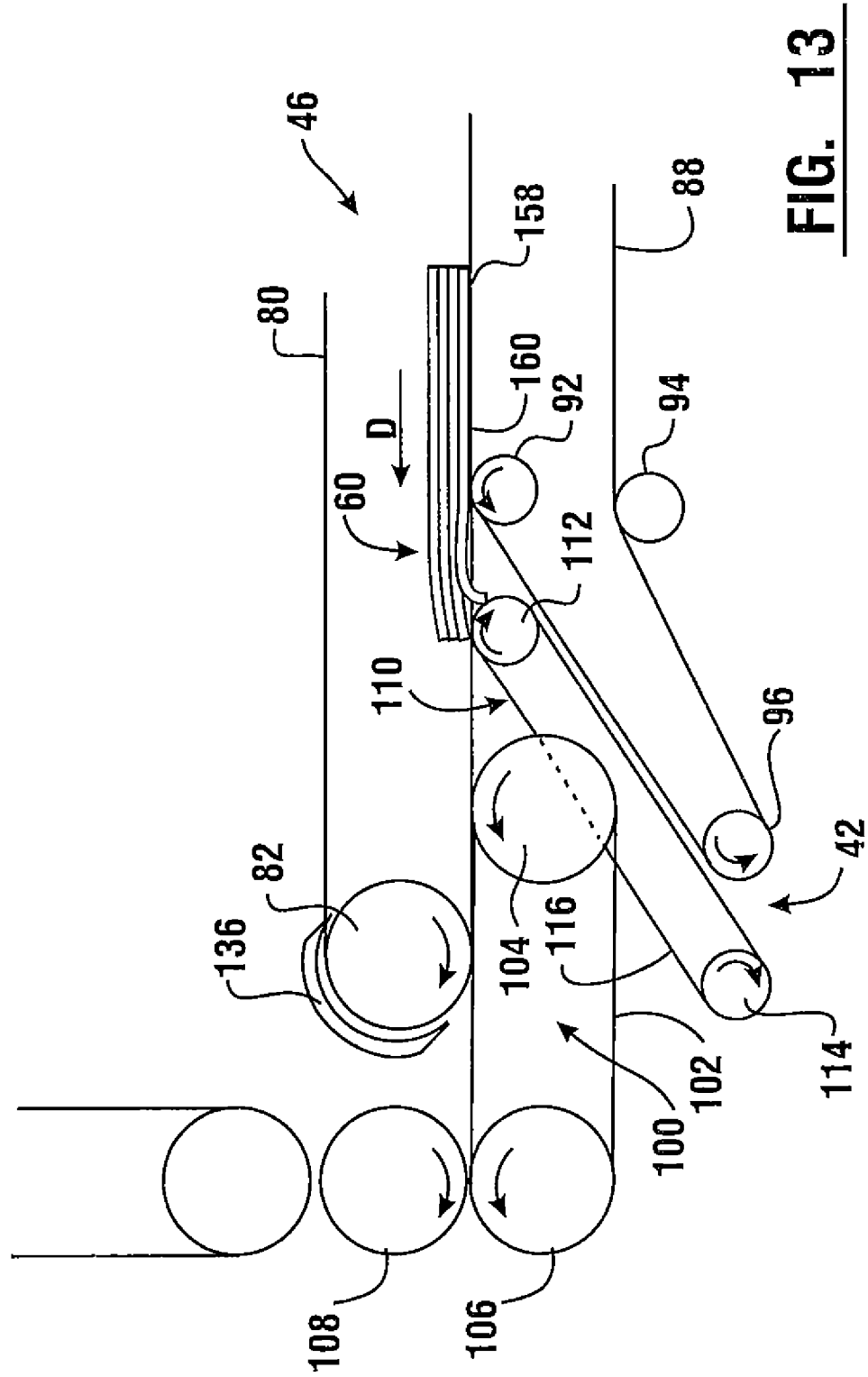
FIG. 13 is a schematic view of the first and second transport paths with the sheet directing apparatus operating to separate a first sheet from a stack as the stack passes through the intersection.
Figure 14:
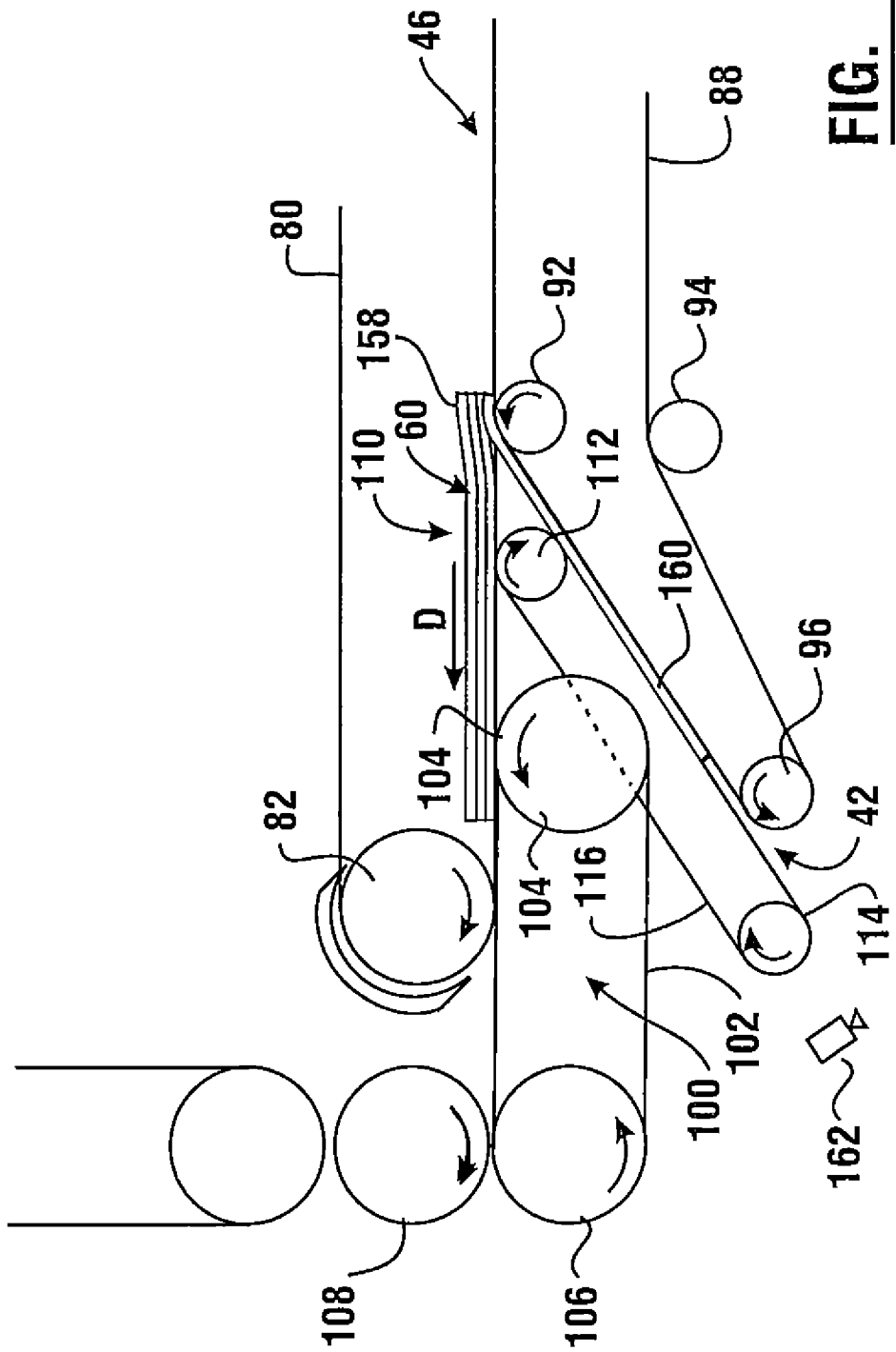
FIG. 14 is a schematic view similar to FIG. 13 showing the sheet separating from the stack as the stack passes through the intersection.

A further useful aspect of the exemplary embodiment is that it includes a separating mechanism for separating sheets from a stack as represented schematically in FIGS. 13 and 14. The exemplary embodiment shown includes the capability of selectively separating a sheet from a stack of sheets as the stack passes through the intersection 60 of transport path 46 and transport path 42. As schematically represented in FIG. 13, a stack of sheets 158 moves in the direction indicated by Arrow D in transport path 46. Although stack 158 is shown as a stack of four sheets, it should be understood that the stack may comprise a greater or lesser number of sheets. Stack 158 may be a stack of sheets received from a user of the machine through opening 20 and may consist of different sheet types. For example in some embodiments stacks accepted in the machine may include stacks of mixed notes, checks, and/or other types of sheets As stack 158 moves toward intersection 60 the control circuitry of the machine operates sheet directing apparatus 110 so that rolls 112 and 114, and belts 116 journaled thereon, move relative to the stack in a direction opposed to the direction of stack movement. As a result of this movement by the sheet directing apparatus, a first sheet 160 which bounds a first side of the stack, is frictionally engaged by belts 116 and is stripped and separated from the stack. The first sheet 160 is directed into the sheet path 42 as the stack which comprises the remaining sheets continues on path 46. This enables sheet 160 to be handled separately by the devices adjacent to path 42, or to be later brought individually back to path 46 for individual transport to devices adjacent to other paths.

It should be noted that in the exemplary embodiment a sensor 162 is positioned adjacent to path 42. Sensor 162 may be a photo electric sensor connected to the control circuitry for sensing the position of the sheet. Alternatively, sensor 162 may comprise a plurality of similar or different sensors adapted for sensing features of a sheet. Sensor 162 may be part of a validation device such as that previously discussed that is suitable for determining note type and denomination. This enables the control circuitry to properly identify a currency sheet and place it in a designated note handling mechanism, storage position, or other the sheet receiving device. Sensors 162 may alternatively operate in connection with the control circuitry to provide a validation mechanism to determine or assess the genuineness of a sheet. In other embodiments other features such as magnetic ink indicia, bar coding and other features may be detected for purposes of identifying the type of sheet as it moves past the sensors.

As previously mentioned, in some embodiments the validation device may be operative to identify particular sheets, such as by serial number or other characteristics. In some embodiments such information may be stored for suspect notes, and in others for all or certain selected categories of notes. Such data concerning individual notes may be stored in a data store in correlated relation with information usable to determine the identity of the user who provided the note to the machine. Other data may be stored as well, such as for example, the storage location or position where the note is stored in the machine or other information that can be used to recover the particular note and/or to document the transaction.

In some embodiments the machine may hold in a data store, identifying information related to notes for purposes of comparison to notes provided to the machine. This may include in some embodiments information corresponding to properties, characteristics or numbers associated with known counterfeit or invalid notes. Such information used for comparison may also include identifying data for individual notes already deposited in the machine. Thus for example, if a note provided to the machine is individually identified by determining the serial number, the serial number may be compared through operation of the control circuitry to stored data for serial numbers of known counterfeits. Alternatively or in addition, the serial number of the note provided to the ATM may be compared to serial numbers for notes previously deposited or input in the machine. In the event of a match in either example the control circuitry would act in response to the apparent suspect note in accordance with its programming. This may include capturing and storing the suspect note, capturing additional data about the user presenting the suspect note, notifying authorities or taking other action.

In embodiments where identifying data on all notes is captured and used for comparison, the control circuitry may operate to indicate when the note has been dispensed out of the machine. This may include for example deleting the information about the note such as its serial number from the data store upon dispense. Alternatively such indication may include storing the information indicative that the particular note has been dispensed. The information about the note dispensed may in some embodiments be stored in correlated relation with information unable to identify the user who received the note from the machine. Of course other approaches may be used in other embodiments and the approaches discussed with regard to notes may also be applied to other types of documents.

Returning to the discussion of the operation of the separating mechanism, after sheet 160 is separated from the stack 158 as shown in FIG. 14, the control circuitry may operate the transports in the first path 46 to move the remaining stack to a position to the right of the intersection 60. If it is desired to separate an additional sheet from the stack, the remaining sheets may be moved through the intersection again in the direction of Arrow D to accomplish separation of the sheet that is newly bounding the side of the stack. Alternatively, if the control circuitry determines that it is not necessary to separate a further sheet from the stack, the sheet directing apparatus may be operated so that belts 116 and rollers 112 and 114, move in the same direction as rollers 92 and at a similar speed. This will result in the stack passing through the intersection without a sheet being separated from the stack.

It should be understood that while in the embodiment shown the sheet directing apparatus comprises a plurality of rolls having resilient surfaces thereon that move at a relative speed that is less than the speed of the moving stack, in other embodiments other types of stripping and separating devices may be used. These may include for example, resilient pads or rolls. Such devices may also include resilient suction cup type mechanisms or vacuum generating devices. Further alternative forms of sheet directing devices may include other physical members that engage selectively one or more sheets so as to direct them from path 46 into another path 42.

Figure 23:
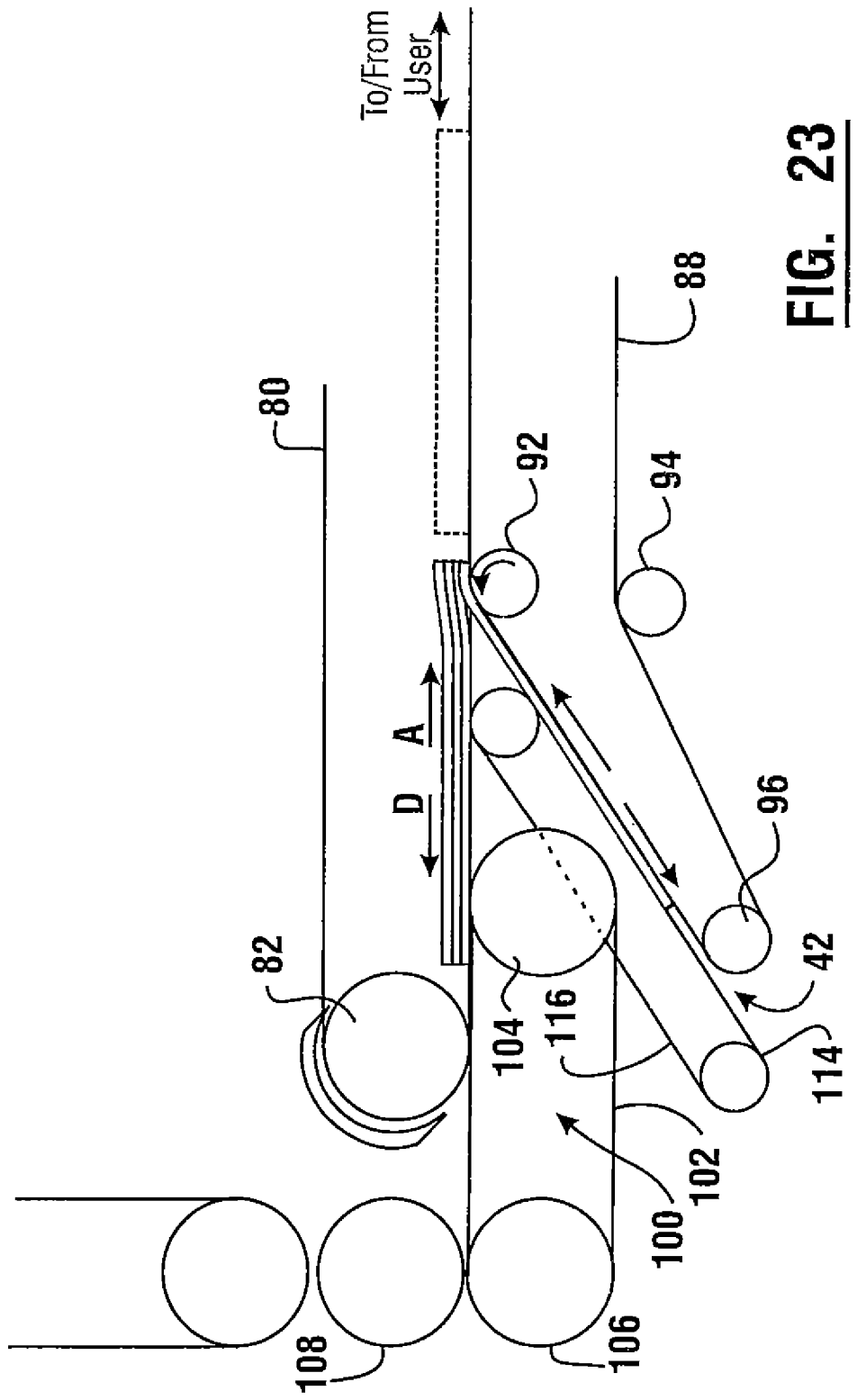
FIG. 23 is a schematic view showing a sheet separating from or adding to a stack as the stack passes through an intersection.

It should also be noted that in the exemplary embodiment shown in FIGS. 13, 14 and 23, sheets may be separated from a stack as the stack moves from right to left. However, in other embodiments it may be desirable to arrange the sheet directing apparatus so that sheets may be separated from a stack when the stack moves in either direction. This may be readily accomplished through arrangements of resilient rollers or other stripping devices or members which may be selectively actuated to engage and separate a sheet upon passage of a stack through an intersection. This configuration may have advantages in other embodiments where greater speed in sheet separation is desired.

As will be appreciated from the foregoing discussion, in some banking machines it may be desirable to process certain sheets individually. For example, if it is determined that a sheet separated from a stack is a check or other negotiable instrument that must be transferred to the imaging device, it may be desirable to clear a path which enables the sheet requiring such handling to be transported individually. This can be accomplished by disposing the stack of sheets that are not currently being processed individually away from the single sheet in first path 46. In this manner the sheet requiring individual handling can be transferred to path 150 or such other location as may be necessary without causing the remaining stack to undergo transport to an undesirable location.

Figure 19:
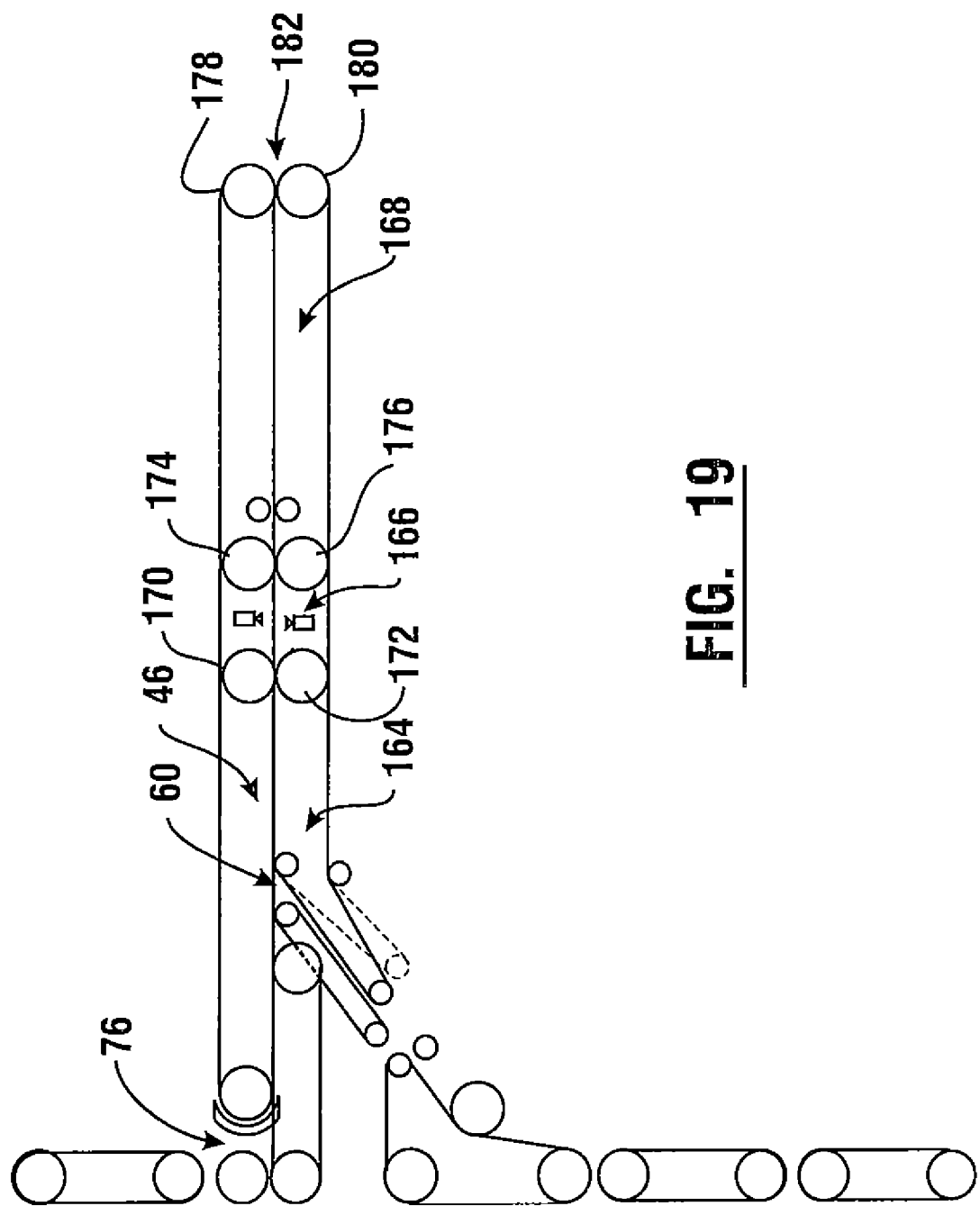
FIG. 19 is a schematic view of an alternative embodiment of the first, second and third transport paths with additional holding devices in the first transport path.

A further alternative to facilitate individual handling of particular sheets is represented by the alternative embodiment shown in FIG. 19. In this embodiment path 46 includes three separately controlled transport sections 164, 166 and 168. Transport section 164 is similar to the transport previously discussed, except that its belts terminate at rolls 170 and 172. Transport section 166 may include an interwoven belt transport similar to that shown in FIG. 5 with the exception that its belts are offset from those in transport section 164. Transport section 166 may be driven by one or more independent reversible drives from transport section 164. The drive for transport section 166 is in operative connection with and operates under the control of the control circuitry.

Transport section 166 terminates in rolls 174 and 176. Rolls 174 and 176 are coaxial with other rolls that are spaced intermediate thereto that are part of transport section 168. Transport section 168 terminates at rolls 178 and 180 which are adjacent to a customer accessible opening indicated 182. Transport section 168 is operated by at least one independent reversible drive in response to the control circuitry.

Transport sections 166 and 168 along path 46 provide locations in which documents or stacks of documents may be temporarily stored as other documents are routed through intersections 60 and 76. After the necessary processing is done on the individual documents, the documents that are temporarily stored in the transport sections 166 and 168 may be moved to other transport sections for further processing. It should be understood that transport sections 166 and 168 include appropriate sensors for sensing the positions of the documents being temporarily stored therein which enables the control circuitry to coordinate movement thereof.

Figure 17:
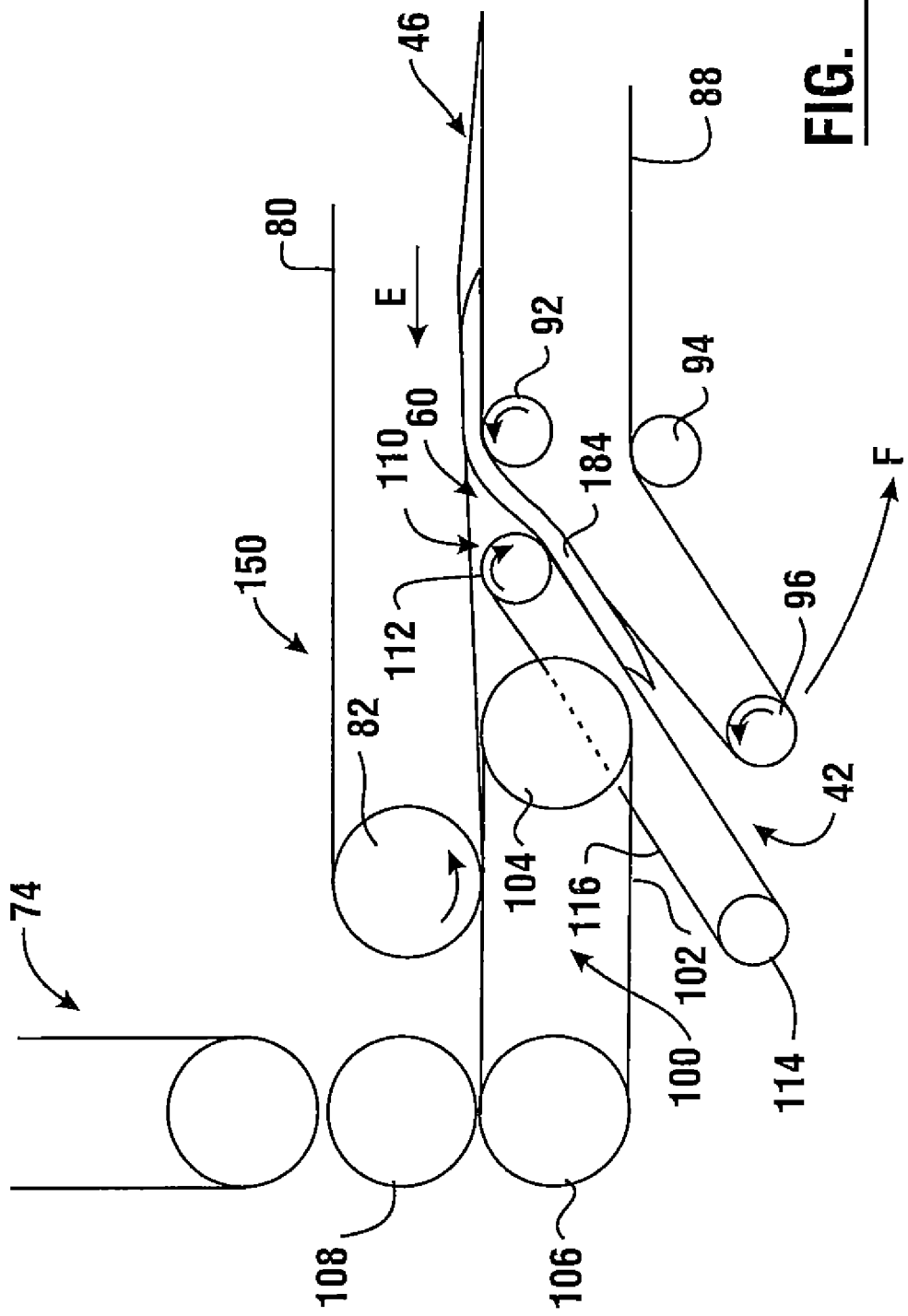
FIG. 17 is a schematic view of the first and second transport paths with a deposit envelope passing therethrough.

A further advantage of the exemplary embodiment described herein is that not only may the automated banking machine 10 accept individual documents and stacks of documents from a customer, but it may also accept conventional deposit envelopes. As shown in FIG. 17 a thick sheet like deposit envelope 184 may be moved along path 46 from a customer. The identification of the deposited item as a deposit envelope may be made based on readings from sensors 126, 128 or 130 as shown in FIG. 4, or alternatively or in addition based on customer inputs through one or more input devices at the customer interface 12 of the machine.

Deposit envelope 184 moves in transport path 46 in the direction of Arrow E as shown in FIG. 17. Upon determining that the item moving in the transport path is a deposit envelope, the control circuitry operates the sheet directing apparatus 110 to direct the envelope into transport path 42. The control circuitry also enables roll 96 and belts 88 to move in the direction indicated by Arrow F. This causes the flight of belt 88 to move to the position shown in phantom in FIG. 4. This enables the envelope to move into the depository device 40 (see FIG. 3) in which it may be stacked in aligned relation with other envelopes. Further the control circuitry may also operate transport 118 and rolls 124 shown in FIG. 4 to assure that envelope 184 does not pass further along sheet transport path 42 than the depository 40.

The ability of the embodiment of the automated banking machine to handle depository envelopes, stacks of sheets and individual sheets, provides enhanced functionality for the machine. The ability of the exemplary embodiment to accept thick items in the area of path 42 adjacent to the intersection, also enables the control circuitry to use the area adjacent to the intersection as a temporary storage location for stacks of sheets. This may be desirable in some embodiments where a receipt form is delivered on transport path 74 and must be directed to transport path 150 for printing thereon before being combined with a stack to be delivered to a customer.

The exemplary embodiment of the ATM has the capability of storing the assembled stack of sheets adjacent to intersection 60 in transport path 42 until such time as the printed receipt is moved into the intersection along first path 46. As the receipt form is produced by a document producing device and moved into the intersection 60 by transport section 100, the stack is moved into the intersection in coordinated relation therewith so that the printed receipt is assembled into the stack and positioned at the top side of the stack. The assembled stack may be moved along transport path 46 to the opening where it may be taken by the customer.

In some embodiments the ATM may also operate to provide certain types of documents in exchange for other documents. As previously discussed, some embodiments may involve a check cashing transaction. For example, the machine can receive or accept checks (or other instruments), validate the check, and provide the user with currency notes. In some embodiments, a user may provide notes to the ATM and receive other types of documents such as money orders, scrip, vouchers, gift certificates or bank checks. In some embodiments the control circuitry may operate in the manner previously discussed to store information concerning individual notes in a data store in correlated relation with information usable to identify the user who deposited the notes in the machine. Some embodiments may store in correlated relation with all or a portion of such data, information which identifies the check, money order or other document provided by the machine to the user.

In some embodiments the ability of a single user to provide cash to the ATM may be controlled or limited to avoid money laundering or other suspect activities. For example, a user placing notes in the ATM to purchase money orders or other documents, may be required to provide at least one identifying input. This may include a biometric input such as a thumbprint for example. Such at least one identifying input may include data on a card or other device a user provides to operate the machine, or may be in lieu thereof or in addition thereto. Alternatively, some embodiments may enable use of the ATM to buy documents such as money orders, gift certificates or other documents without using a card or similar device to access the machine. In some cases a user may exchange notes of certain denominations for notes of other denominations. In such cases the control circuitry may require at least one identifying input from the user requesting to exchange cash for other documents.

The control circuitry may operate in accordance with programmed instructions and parameters to limit the number or value of documents a user may purchase or otherwise receive. This may include comparing user identifying data with data input in connection with prior transactions. This may be done by comparing user input data stored in a data store at the particular ATM, and/or data stored in computers connected to the ATM. By limiting the number or value of documents a user can purchase with cash, either overall, for a particular document or within a given time period, the risk of illegal activities such as money laundering can be minimized. Further such systems may more readily enable funds to be tracked.

Figure 22:
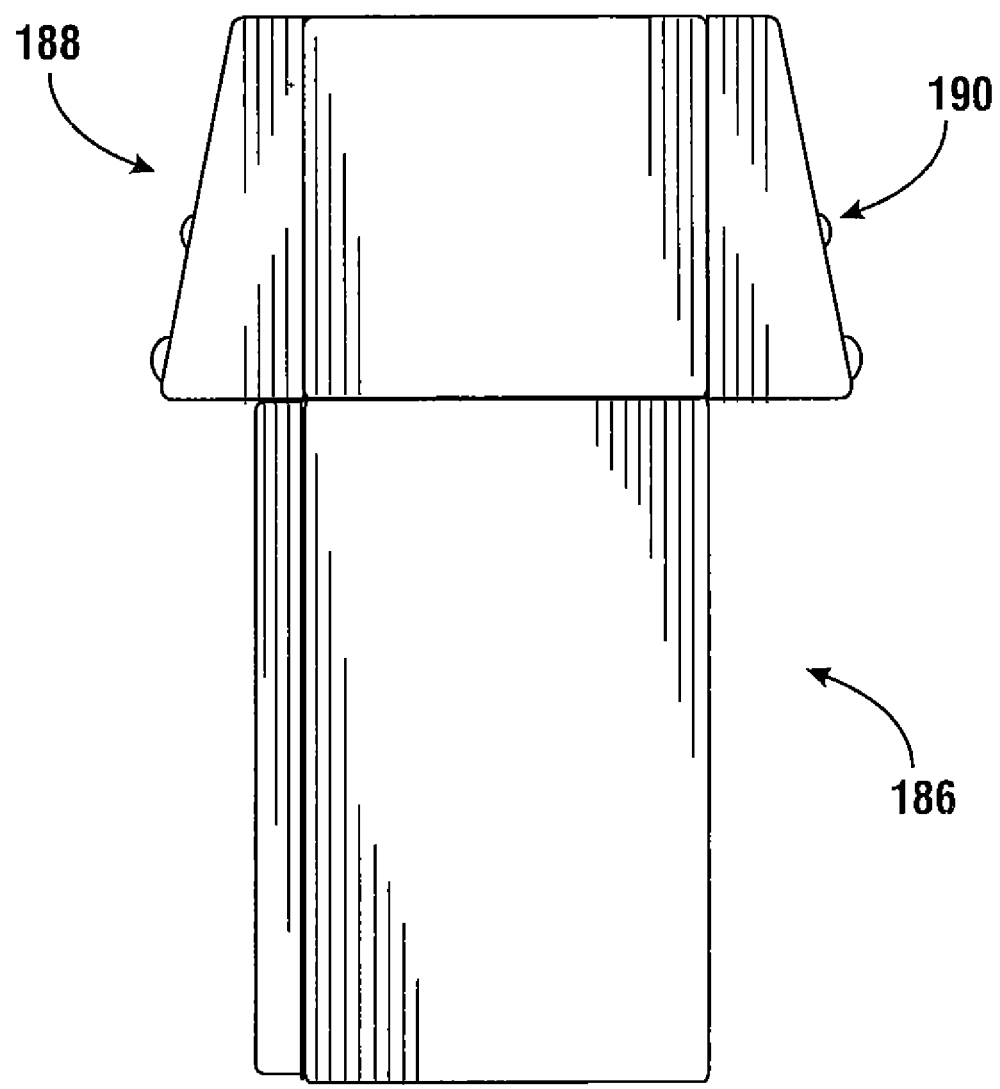
FIG. 22 is a side view of an automated banking machine housing the transport apparatus schematically shown in FIG. 21.

An alternative embodiment of an automated banking machine is indicated 186 in FIG. 22. Machine 186 is similar to machine 10 except that it includes two fascias and customer interfaces designated 188 and 190. Machine 186 is capable of operation by two users generally simultaneously.

Figure 21:
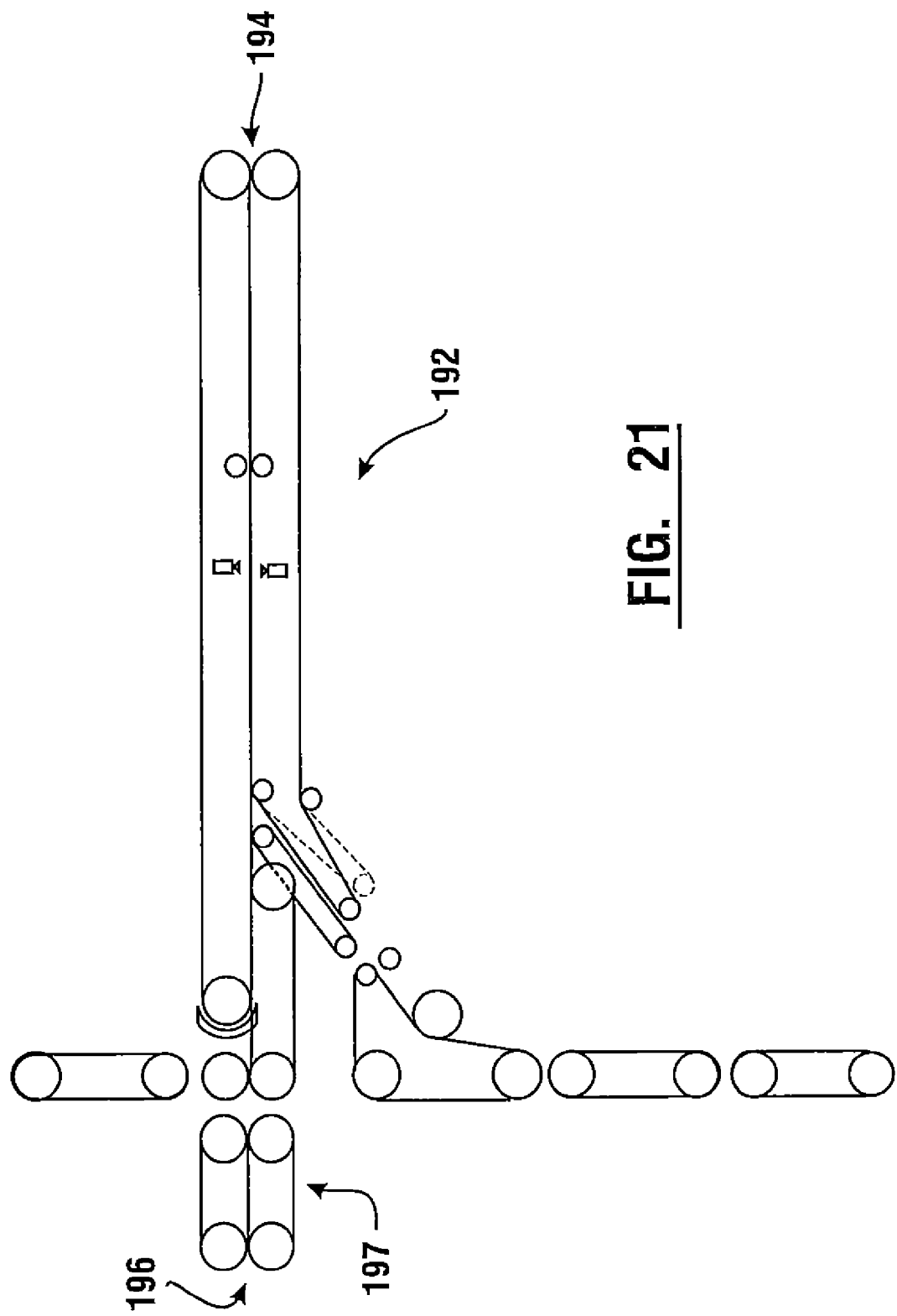
FIG. 21 is a schematic view of an alternative embodiment of the first, second and third transport paths used in an alternative automated banking machine in which two user interfaces and user accessible openings are provided.

The sheet handling mechanism for machine 186 is indicated 192 in FIG. 21. The sheet handling mechanism 192 is similar to that described in the first embodiment, except as otherwise noted. Mechanism 192 includes a first customer accessible opening 194 in customer interface 190, and a second customer accessible opening 196 in customer interface 188. Customer opening 196 receives and delivers sheets through a transport section 197. Transport section 197 is preferably an interwoven belt type transport of the type shown in FIG. 5 and is capable of moving sheets, envelopes and stacks of sheets in engagement therewith. Transport section 197 is operated by a reversible drive similar to the reversible drives used for the other belt transport sections, and is in operative connection with the control circuitry of the machine.

The operation of the alternative sheet handling mechanism 192 is similar to that previously described except that the sheets, envelopes or stacks of sheets that are processed may be received from or delivered to either customer opening 194 or customer opening 196. Because of the high speed capability of the exemplary embodiment, it is possible for the sheet handling mechanism 192 to adequately service two users simultaneously without undue delay.

As will be appreciated from the foregoing description, the modifications necessary for the sheet handling mechanism of the first embodiment to accommodate two simultaneous users is relatively modest. In the exemplary embodiment it is possible to increase the number of customer interfaces on the machine from one to two at a relatively small cost. This is particularly advantageous for an ATM positioned in a high customer traffic area. It is also useful for automated banking machines, such as those used by bank tellers to count and dispense currency notes. This is because the configuration of the sheet handling mechanism enables two tellers or other bank personnel to be serviced by a single machine.

Exemplary embodiments may operate to assure operation in accordance with the principles of U.S. application Ser. No. 09/664,698 filed Sep. 19, 2000, the disclosure of which is incorporated by reference as if fully rewritten herein.

In an exemplary embodiment, as schematically illustrated in FIGS. 24-36, a sheet handling mechanism includes features to reduce the risk that a stack of sheets may become misaligned from each other as they move along a transport, such as sheet transport 300. Such misalignment of the stack or "shingling" may occur, especially when the stack is being built and moving back and forth along the transport path. The sheet transport 300 includes a plurality of continuous belts 302 which extend about sets of rolls 304, 305 (FIGS. 32-35). It should be understood that the transport 300 can include belts that extend the entire length of the transport, or can include several belts which span separate sections of the entire length of the transport.

Figure 24:
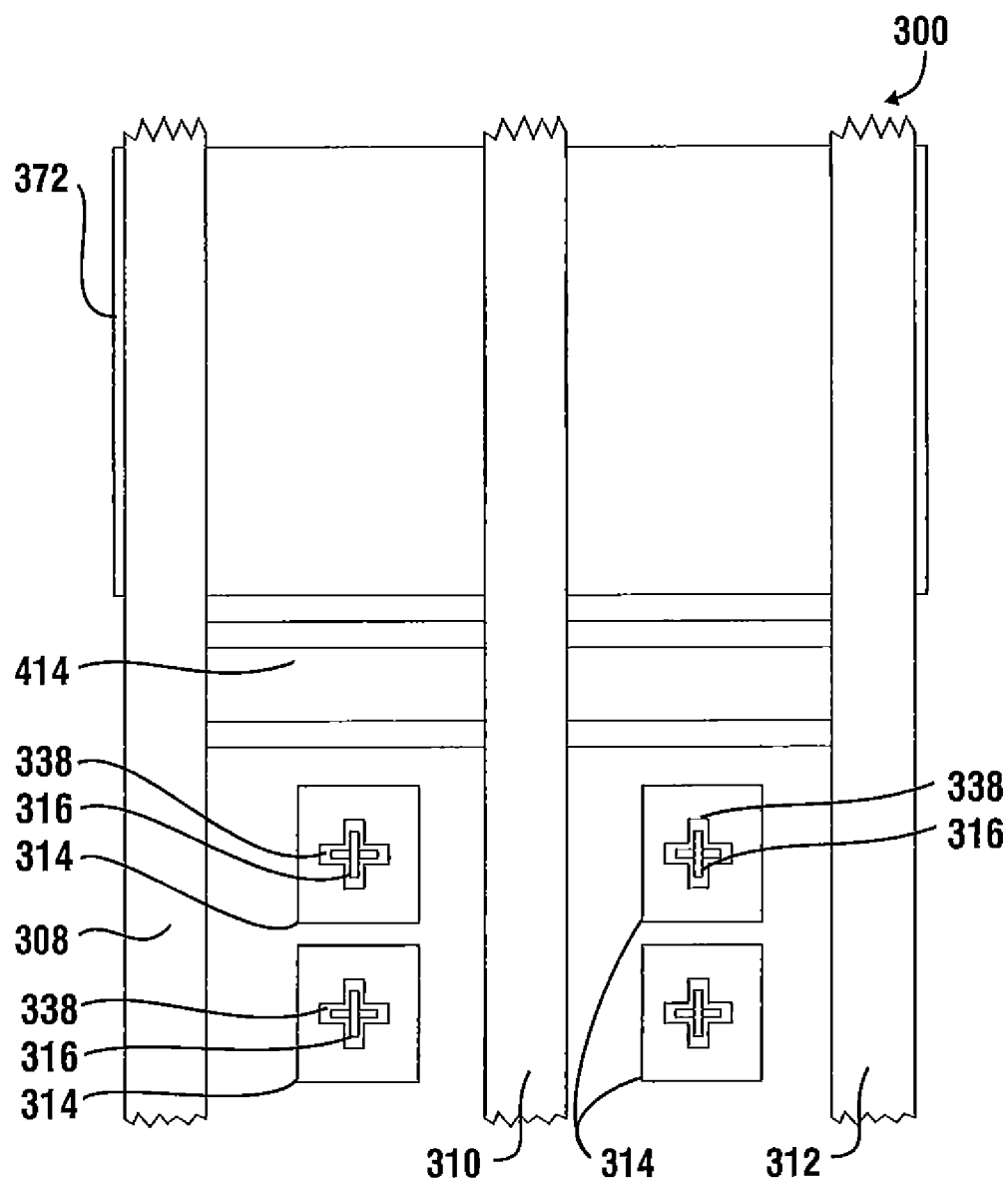
FIG. 24 is a side schematic view of a portion of a sheet transport of an exemplary embodiment.

In an exemplary embodiment, continuous belts are arranged so that the transport includes a plurality of generally parallel belt flights. These belt flights are represented in FIG. 24 by belt flights 308, 310 and 312. The belt flights are vertically spaced from each other. Each of the belt flights extend along a longitudinal direction of the transport, in which longitudinal direction the sheets are moved.

The belts move or stop moving in response to the rotation of the rolls 304. The rolls 304 are driven by one or more independent reversible drives (not shown) under control of control circuitry 44. The control circuitry 44 preferably includes at least one processor in operative connection with at least one memory or data store, and is operative to carry out programmed instructions based on data stored in the memory. The control circuitry in the exemplary embodiment operates the automated transaction machine (e.g., ATM) to carry out the operations hereinafter described. This operation can include operation of the belts.

As shown in FIG. 24, a first column of bearing assemblies in the form of roller assemblies 314 is disposed transversely intermediate the pair of belt flights 308, 310. A second column of roller assemblies 314 is disposed transversely intermediate the pair of belt flights 310, 312. That is, roller assemblies 314 are vertically positioned within gaps created by the vertical spacing between the belts 308, 310, 312. It should be understood that the positioning of the belt flights and the roller assemblies is not limited to the vertical orientation. That is, in other exemplary embodiments the belt flights and the roller assemblies can be horizontally positioned.

Figure 25:
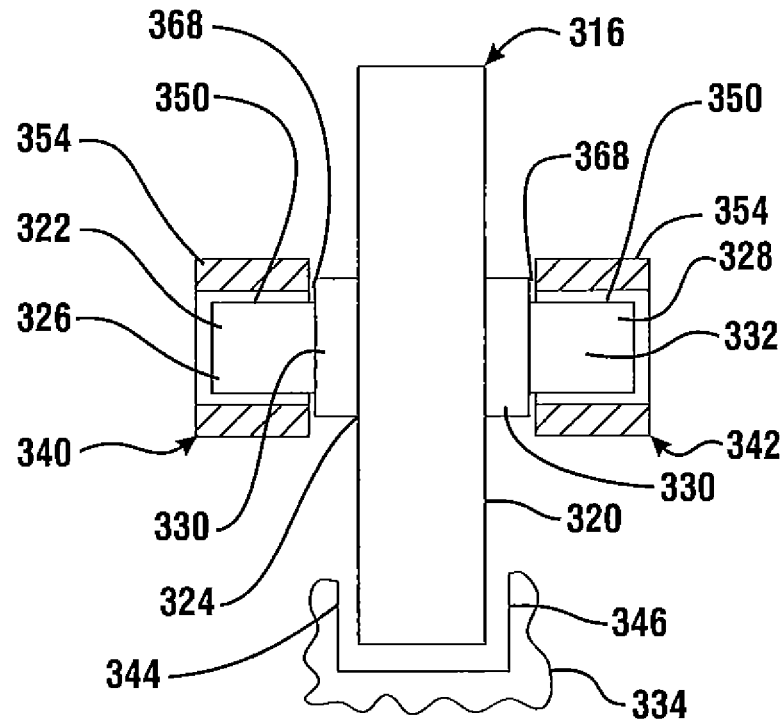
FIG. 25 is a top view of a roller assembly shown in FIG. 24 with portions broken away for illustration purposes.
Figure 26:
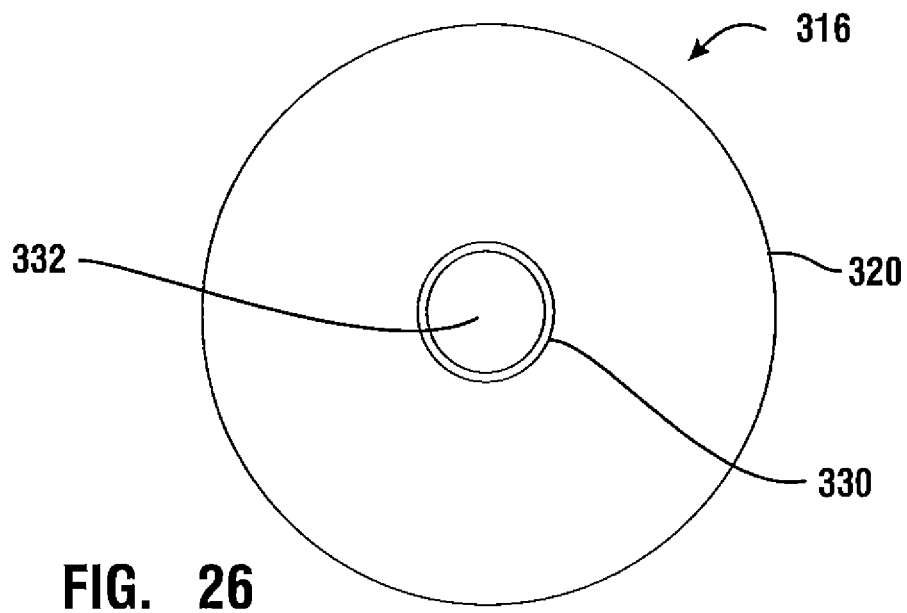
FIG. 26 is a side view of a roller of the roller assembly shown in FIG. 25.

FIGS. 25-29 show each of the exemplary roller assemblies 314 in more detail. Each roller assembly 314 includes a roller 316 that is rotatably and removably mounted in a support body 318. As best depicted in FIGS. 25-26, the roller 316 includes a thin cylindrical member or wheel 320 and a cylindrical axle 322 extending through the hub 324 of the wheel 320. The axle 322 includes symmetrical axial portions 326, 328 on opposite sides of the wheel 320. Each axial portion includes a proximal portion 330 extending from the hub 324 and a distal portion 332 extending outward from the proximal portion 330. The proximal portion 330 has a diameter that is slightly larger than the distal portion 332. The proximal portions 330 are equal in length to each other, and the distal portions 332 are equal in length to each other.

The roller 316 can be formed of one piece. In the exemplary embodiment the roller is made of a single unitary plastic piece. The plastic piece can be formed by injection molding or other suitable process. Alternatively the roller can be formed of two or more pieces. The roller can also be made of suitable materials other than plastic such as steel.

Figure 27:
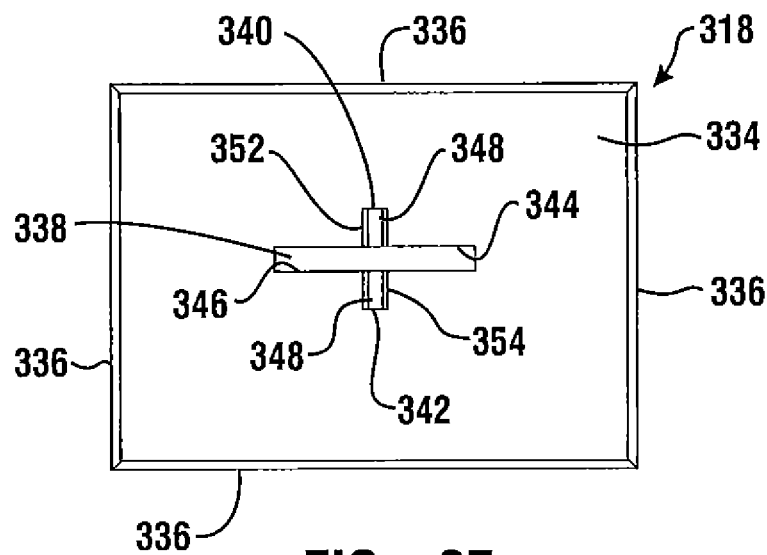
FIG. 27 is a top view of the support body of the roller assembly shown in FIG. 24.
Figure 28:
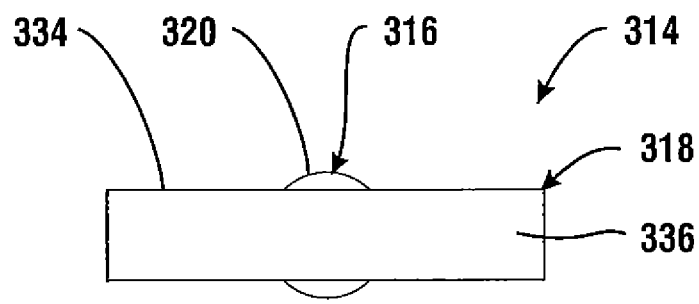
FIG. 28 is a side view of the roller assembly shown in FIG. 25.
Figure 29:
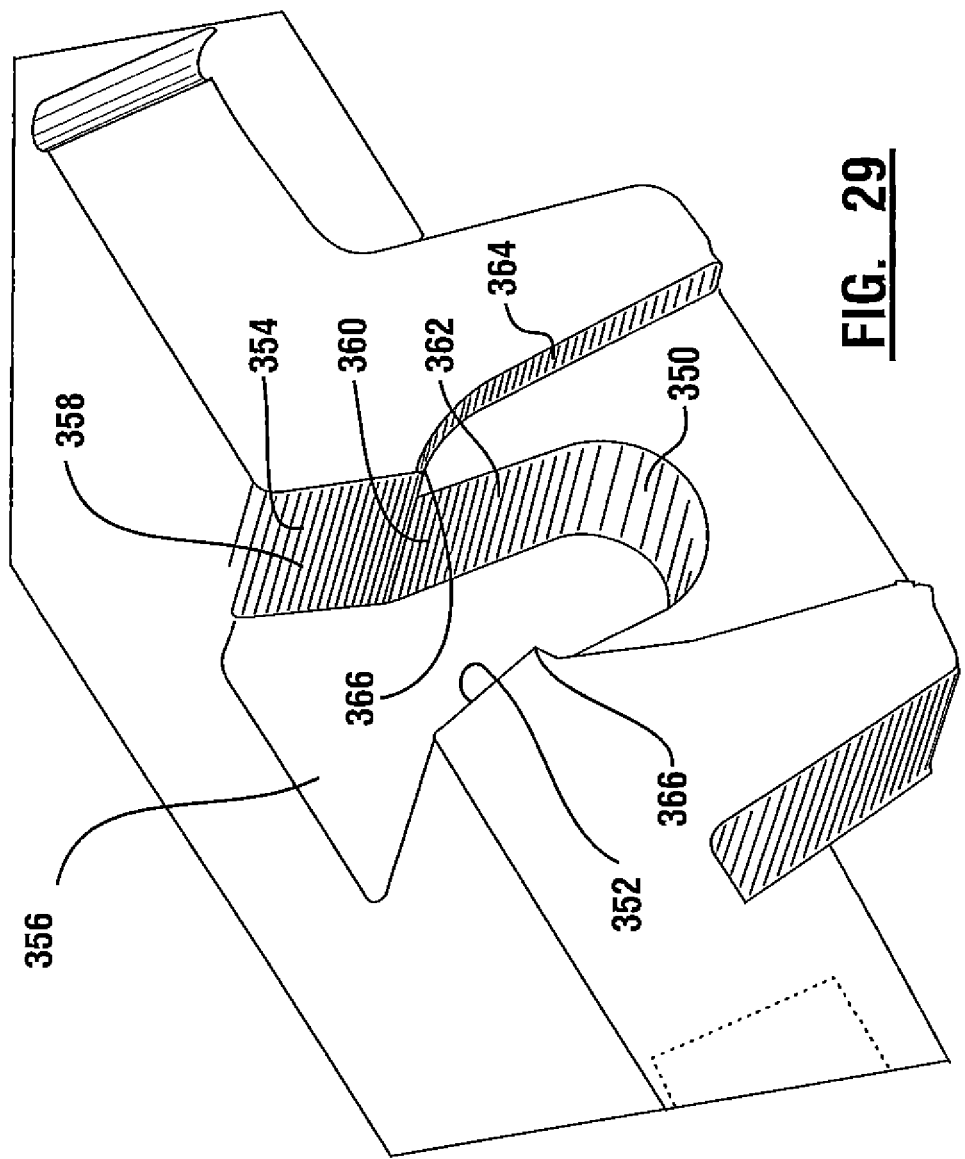
FIG. 29 is a side perspective view of a portion of the support body of the roller assembly shown in FIG. 24.

Referring to FIGS. 27-29, the exemplary support body 318 includes a rectangular top wall 334 (as shown in FIG. 27) and side walls 336 that extend downwardly and slightly outwardly. The support body 318 further includes a longitudinal slot 338 formed in center of the top wall 334. A pair of opposite axle bearings 340, 342 is formed on opposite lateral ends 344, 346 of the slot 338 at its center. The axle bearings are similar in construction and function, so only the axial bearing 340 will be described. In particular, the axle bearing 340 includes a detent recess 348 formed in the top wall 334. The detent recess 348 laterally extends outwardly from the associated lateral end 344 of the slot 338. As best seen in FIG. 29, the detent recess 348 is defined by a curved bottom wall 350, a pair of opposing side walls 352, 354, and an end wall 356 that extends between the side walls 352, 354. The bottom wall 350 is generally U-shaped in cross section as seen in FIG. 29. The side walls 352, 354 are similar in construction and function so only the side wall 354 will be described. The side wall 352 includes an upper surface 358 and a lower surface 360. The upper surface 358 extends from a rounded upper edge of the detent recess 348 and slopes downwardly and inwardly in a straight direction therefrom toward the other opposing side wall. Thus, as viewed in FIG. 29, the upper surfaces 358 of the side walls 352, 354 converge or slant toward each other going deeper into the detent recess 348.

The lower surface 360 has a first portion 362 adjacent the end wall 356. The lower surface has a second portion 364 located between the slot 338 (FIG. 27) and the first portion 362. The first portion 362 extends downwardly from the lower end of the upper surface 358 terminating at the bottom wall

350. The second portion 364 curves outwardly and downwardly from the lower end of the upper surface 358 and then slopes downwardly and outwardly in a straight direction away from the other opposing side wall. The intersection of the second portion 364 of the lower surface 360 and the upper surface defines an elastic catch projection 366. The catch projection 366 has sufficient elasticity to allow it to flex outwardly when a predetermined force is applied outwardly to it, and then move back to its original position when the force is withdrawn. The support body 318 can be formed of one piece. In the exemplary embodiment the support body 318 is made of a single unitary plastic piece. The plastic piece can be formed by injection molding or other suitable process. In the exemplary embodiment, the detent recesses 348 require a mold piece to be withdrawn from the bottom of the support body 318 and also an opening which requires a mold piece to be withdrawn from the top of the body to form the detent recess. Alternatively, the support body 318 can be formed of two or more pieces, or other suitable construction.

As previous mentioned, the roller 316 is rotatably mounted on the support body 318. When the roller 316 is rotatably mounted to the support body 318, the wheel extends through the slot 338 such that approximately a quarter of the wheel 320 extends above the top wall 334 as seen in FIG. 28. Each distal portion 332 of the axle 322 is seated on the bottom wall 350 of the corresponding detent recess 348 as best seen in FIG. 25. The proximal portions 330 of the axle 322 are each positioned between the free edge 368 of the bottom wall 350 of the respective detent recess 348 and the wheel 320 as best seen in FIG. 25. The height of the catch projections 366 (FIG. 29) and the distance between the lower surfaces 360 of the opposing side walls 352, 354 is greater than the diameter of the distal portion 332. However, the distance between the catch projections 366 of the opposing side walls 352, 354 is less than the diameter of the proximal portion 330. Thus, the axle 322 can freely rotate about its rotating axis but is prevented from falling out of the detent recesses 348 by the catch projections 366, unless a sufficient force is applied to the catch projections 366 to flex them outwardly.

Also, as best seen in FIG. 25, each proximal portion 330 is spaced an axial distance from the free edge 368 of the bottom wall 350 that is smaller than the axial distance between the wheel 320 and the lateral ends 344, 346 of the slot 342, so that the end of the proximal portion 330 first contacts the edge 368 when the wheel 320 shifts or moves along the rotating axis. This allows the wheel 320 to more freely rotate and prevents jamming of the wheel 320, since the contact area between the proximal portion 330 and the edge 368 of the bottom wall 350 is less than the contact area between the wheel 320 and the support body 318 should this situation occur. The rollers 316 can function as idler (or follower) rollers that are driven to rotate by movement of the stack pressed there against.

The roller 316 is removably mounted to the support body 318 as follows. The wheel 320 is grasped by a hand of the user (e.g., a machine servicer). Alternatively, a suitable tool such as pliers can be used by the user to grasp the wheel 320. The wheel 320 is then inserted into the slot 338, and the axle 322 is inserted into the detent recesses 348 until the proximal portions 330 of the axle 322 engage the catch projections 366. Then, the roller 316 is pushed with sufficient force into the detent recesses 348 to flex the catch projections 366 outwardly a sufficient distance to allow the proximal portions 330 to pass through. The roller 316 is pushed into the detent recesses 348 until the distal portions 332 are seated on the bottom walls 350 of the detent recesses 348. Thus, a roller 316 can have a (removable) snap fit attachment with its support 318.

The exemplary form of the transport improvements is designed for use in connection with existing transports which move sheets such as currency notes in an automated transaction machine (e.g., an ATM). The rollers 316 may break or otherwise may need to be replaced. The exemplary embodiment allows for easy removal of the roller 316 from the support body 318. To remove a roller 316, a service person opens the housing of the machine such as by unlocking and opening a door of a secure chest. The service person is then enabled to gain access to the interior of the housing. The service person then uses a suitable tool such as pliers to grab the wheel 320 of the roller 316. The service person then pulls the roller 316 outwardly with sufficient force to cause the proximal portions 330 to engage the catch projections 366 and flex the catch projections 366 outwardly to allow the proximal portions 330 to pass through the catch projections 366. The user continues to pull the roller 316 until it extends outside the detent recesses 348. With the prior roller 316 removed from the support body 318, a new roller 316 can then be rotatably movably mounted on the support body 318 by the service person as previously mentioned. After the new roller 316 is mounted to the support body 318, the service person can close and lock the door of the secure chest of the automated transaction machine.

In the exemplary embodiment, the arrangement can be configured so that the roller 316 only rotates about an axis that is perpendicular to the transport path, and that also lies in a plane parallel to the belt flight portion on the transport path facing the roller. This minimizes movement of the stack in a direction transverse to the transport path.

Figure 31:
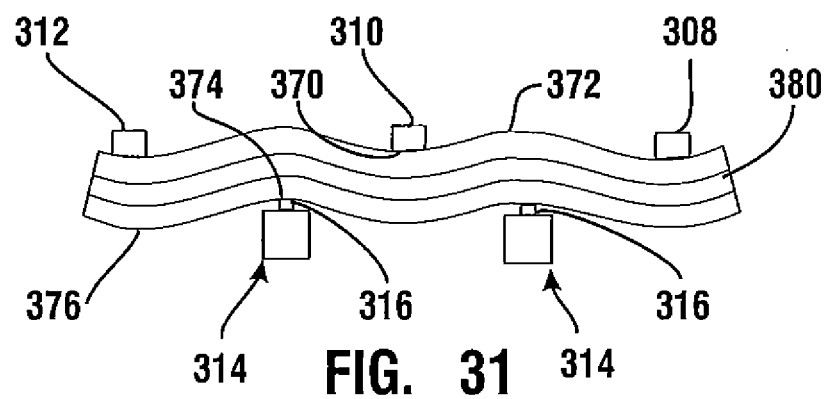
FIG. 31 is a side cross sectional view of the sheet transport of FIG. 24 showing a stack of sheets in engagement with a plurality of belt flights and roller assemblies.

FIG. 31 shows a stack of sheets 372, 376, 380 being moved sideways (e.g., out of the page). The belts 308, 310, 312 are vertically spaced from each other. The shown rollers 316 are likewise vertically spaced from each other. The stack is situated between the belts and the rollers. The belts engage a first side 372 of the stack, whereas the rollers engage the other side 376 of the stack. The first side of the stack is formed by the planar surface (face) of a first end sheet 372 of the stack. The other side of the stack is formed by the planar surface (face) of another end sheet 376 of the stack. As can be seen, the stack is oriented such that the edges of the sheets are facing upward.

In an exemplary embodiment, the stacked sheets in FIG. 31 are currency notes having two opposite short edges, two opposite long edges, and two opposite faces. While in the stack, one long edge of a currency note faces upward, whereas the other long edge faces downward. The currency note is moved with one short edge leading and the other short edge following.

In FIG. 31 each of the belt flights has a first sheet engaging surface represented by surface 370 of belt flight 310, which faces in a first facing direction toward a sheet 372 which extends in the transport 300. Each of the rollers includes a second sheet engaging surface represented by annular surface 374 of a roller 316 included in the second column of roller assemblies 314. The second sheet engaging surface 374 faces in a second facing direction toward a sheet 376 and engages the sheet 376. The second facing direction is generally opposed of the first facing direction. As will be appreciated, the first and second facing directions in which the sheet engaging surfaces of the belt flights and the rollers extend respectively, are both generally normal of the longitudinal direction in which the sheets move.

As can be appreciated from FIG. 31, the configuration of the belt flights 308, 310, 312 and the rollers 316 is such that the stack of sheets, which is in intermediate relation between the first sheet engaging surface 370 of the belt flights and the second sheet engaging surfaces 374 of the rollers, is deformed in a wavelike configuration. The end sheet 372 is engaged with the belt flights. As a result of the wavelike configuration, when the belt flights move, the first sheet 372 moves in engagement therewith, which engaging movement can cause the entire stack of sheets 372, 376, 380 to move together while remaining aligned. In an exemplary embodiment, the wavelike configuration causes more friction to be generated between adjacent sheets in the stack. Thus, the wavelike configuration can assist in preventing shingling of the stack.

In an exemplary stack moving operation, the stack is moved while it is positioned on its side. That is, the stack is moved while the long edges of the notes are facing down (and up). The arrangement causes the drive belts (located adjacent one side of the path/stack) to be engaged with the flat face of an end note which is positioned at one end (side) of the stack, whereas at least one column of rollers (located adjacent the opposite side of the path/stack) is engaged with the flat face of the other end note which is positioned at the opposite end (side) of the stack.

In other alternative embodiments, the stack can be moved while it is positioned on an end note, with the other end note located on top of the stack. For example, FIG. 31 can also be viewed as having the belts and the rollers horizontally spaced (instead of vertically spaced) from each other. That is, FIG. 31 can alternatively be viewed as having horizontally spaced belts 308, 310, 312 engaged with the top of the stack, whereas horizontally spaced rollers 316 engage the bottom of the stack. In still other alternative embodiments, the arrangement can be flipped to have the rollers engaging the top of the stack and the belts engaging the bottom of the stack. The belts 308, 310, 312 can all be on the same horizontal plane. In further embodiments, the belts 308, 310, 312 can be arranged to respectively be both horizontally and vertically spaced from each other to assist in causing a wavelike configuration. For example, some belts can be on different horizontal planes, such as vertically spaced planes. In a similar corresponding manner, the rollers 316 can all be on a same horizontal plane. The rollers can also be arranged to respectively be both horizontally and vertically spaced from each other to also assist in causing the wavelike configuration.

Figure 30:
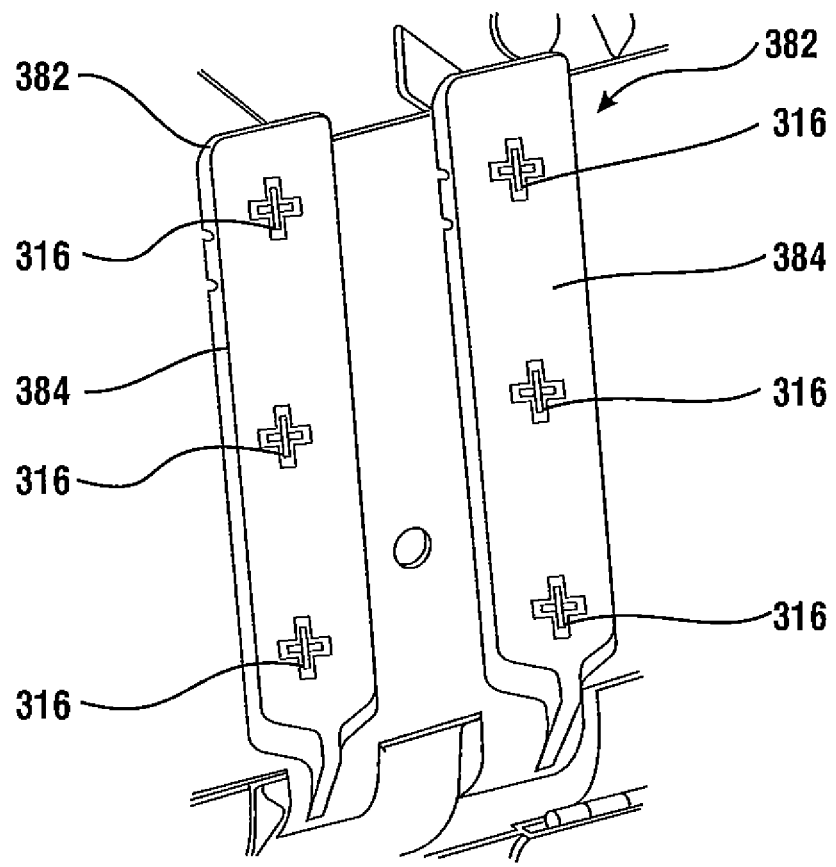
FIG. 30 is a side perspective view of a portion of a transport showing an alternative exemplary form of the roller assemblies.

FIG. 30 shows an alternative arrangement of the roller assemblies in the transport 300. The roller assembly 382 includes support bodies 384. Each support body 384 includes a plurality of rollers 316 that are removably and rotatably mounted thereto. In particular, a first roller column would include a set or series of vertically spaced rollers 316 mounted to a first support body 384. A second roller column would include another series of vertically spaced rollers 316 mounted to another support body 384. The columns are horizontally spaced from each other.

In other exemplary embodiments, FIG. 30 can alternatively be viewed as having columns of horizontally spaced rollers 316, with the roller columns vertically spaced from each other. Again, the exemplary embodiments allows for different arrangements to move a stack, whether its bottom is formed by the note sides or by the flat face of the (single) bottom end note. The different arrangements allow for the rollers to be located on one side of a stack, on the other side of the stack, above the stack, or below the stack. In alternative arrangements, rollers can also be positioned both on a side of a stack and below (or above) the stack. The positioning of rollers relative to a stack (and a stack transport path) similarly applies to the positioning of belts.

Since the rolling friction between the rollers and an end sheet of the stack is less than for example, the sliding friction between the end sheet and a stationary element, the end sheet facing the rollers is less likely to shift and begin to separate from alignment with the stack as it moves along the roller. In an exemplary embodiment, this rolling friction is less than the friction between the end sheet facing the rollers and the next inner sheet which is located nearest to this end sheet. Less movement of the sheet relative to the stack reduces the tendency of the stack of sheets to shingle or become misaligned.

Also, because the rollers provide such a low friction engaging surface with the sheet, the rollers can be extended further into the sheet to further deform the sheet stacks. This larger deformation of the sheets provides a greater cross-sectional wave configuration to the sheets, which in turn further reduces the tendency of the stack of sheets to shingle or become misaligned. In addition, each roller extends a distance along the transport path that is less than the distance that the stack of sheets extends along the transport path. Thus, when the engaging surface of the roller engages a portion of the sheet within the periphery of the sheet, a depression is created within the sheet that is completely surrounded by the sheet. This depression provides additional resistance to movement of the sheets in the stack relative to each other.

A system for stacking of sheets using the roller assemblies operates as shown schematically in FIGS. 32-35. The system includes a first cassette 386 containing a first stack 388 of sheets to be dispensed of a particular denomination, and a second cassette 390 containing a second stack 392 of sheets of a different denomination. The system also includes a divert bin 394 that can temporarily store sheets. Each of the cassettes 386, 390 is in operative association with a sheet picker 396. The sheet picker 396 separates individual sheets from the stack of sheets in the associated cassette. FIG. 36 shows the sheet picker mechanism 396 in greater detail. In the exemplary embodiment all of the picker mechanisms can be the same, or different types of sheet picker mechanisms can be used. The sheet pickers 396 for the first and second cassettes 386, 390 are similar in design and function, so in the interest of brevity, only the sheet picker 396 for the second cassette 390 will be described.

Picker mechanism 396 includes a picking member 398. The picking member 398 is selectively rotated responsive to the controller 22 about an axis 400. Bank notes or other sheets in the second stack 392 are supported by a supporting surface 402 which terminates in the area adjacent to the picking member. A sheet or an end note 404 bounds the stack adjacent to the picking member 398. During each rotation of the picking member 398 the then current end note bounding the stack is moved and delivered from the stack and passed to the transport 300.

The picking member 398 has an outer bounding surface 406. The outer bounding surface 406 is in generally abutting relation with stripping members 408 which are alternatively referred to herein as stripper members or strippers. As previously discussed the stripping members 408 in the exemplary embodiment do not rotate in a clockwise direction as shown in FIG. 36. In the exemplary embodiment, the stripping members 408 will however rotate in a counterclockwise direction due to action of associated one-way clutches as later described.

Positioned downstream of the stripping members 408 is a doubles detector 410. Doubles detector 410 can be a mechanical sensor, radiation sensor, sonic sensor or other type sensor that is suitable for determining if single or multiple sheets have moved past the stripping member toward the transport. Downstream of the doubles detector are a pair of carry away rolls 412. The carry away rolls are operative to engage sheets that have moved sufficiently away from the stack so as to engage the rolls. The rolls which are operated by a drive in response to the controller 22, operate to engage sheets and move them into the transport. It should be understood that this configuration of the dispenser mechanism is exemplary and in other embodiments different configurations can be used.

As discussed in the disclosure of U.S. Pat. No. 5,577,720, which is incorporated by reference in its entirety, the normal operation of the picker mechanism involves the picking member rotating responsive to the controller 22 during picking operations. When it is desired to pick the end note 404, the picking member 398 rotates in a counterclockwise direction as shown in FIG. 36 about the axis 400. This is done through operation of a drive or other similar device. Rotation of the picking member urges the end note 404 to move from the stack. The stripping members 408 resist the movement of the end note because the stripping members do not move in a clockwise direction as shown in FIG. 36. Because of the surface area of the picking member 398 engaging the end note and the frictional properties of the outer bounding surface 406, the force urging the end note 404 to move from the stack generally overcomes the resistance force of the stripping members. This is because the stripping members have a smaller surface area and/or a different frictional coefficient resulting in less resistance force than the moving force of the picking member. The stripping members however provide sufficient resistance to resist generally all but the end note 404 from moving from the stack. This is because the notes in the stack other than the end note, are not directly engaged with the picking member and do not experience the same degree of force urging them to move from the stack.

As the end note 404 is moved from the stack, the thickness thereof can be sensed by the doubles detector 410. The doubles detector 410 is operatively connected to the controller and at least one signal from the doubles detector provides an indication as to whether a single or a multiple note has been pulled from the stack. In circumstances where multiple notes are sensed, the controller can cause the picking member to operate to stop rotating in the counterclockwise direction as shown in FIG. 36, and instead to rotate in a clockwise direction. When the picking member 398 rotates in a clockwise direction to pull sheets back into the stack 388, the exemplary stripping members 408 are enabled to cooperatively rotate in a counterclockwise direction as shown in FIG. 36. This is due to the one-way clutch associated with each of the stripping members. As a result the sheets are returned to the stack. Thereafter the controller 22 can again operate so as to rotate picking member 398 in a counterclockwise direction and an attempt is again made to pick a single end note from the stack.

In circumstances where the doubles detector 410 senses only a single note passing from the stack, the controller operates a drive or other suitable moving mechanism to cause the carry away rolls 412 to engage and move the sheet to the transport 300. It should be understood that the steps described as being taken responsive to operation of the controller are exemplary. In some embodiments the controller can cause the automated banking machine to operate to direct double notes to a divert bin or other storage area rather than attempting to repeatedly pick a single note. Further details of the exemplary picking member are disclosed in U.S. Pat. No. 5,577,720, the disclosure of which is incorporated by reference as if fully rewritten herein. As can be appreciated from FIGS. 24 and 36, the sheet transport 300 is enabled to accept sheets such as a sheet 372 through openings such as opening 414.

The building of the sheet stack will be described using sheets from the second cassette 390 being picked and passed through the opening 414. However, a similar operation can be carried out for sheets from the first cassette 386 as well. A transport path 416 extends from the divert bin 394, past the first and second cassettes 386, 390 until it reaches an area in which the transport delivers the stack through an outlet opening to a machine user (customer). The sheet 372 can be moved along the transport path 416 in both a first direction, as indicated by arrow A of FIG. 32, and a second direction as indicated by arrow B of FIG. 32. The roller assemblies 314 are mounted along the transport path 416.

Figure 32:
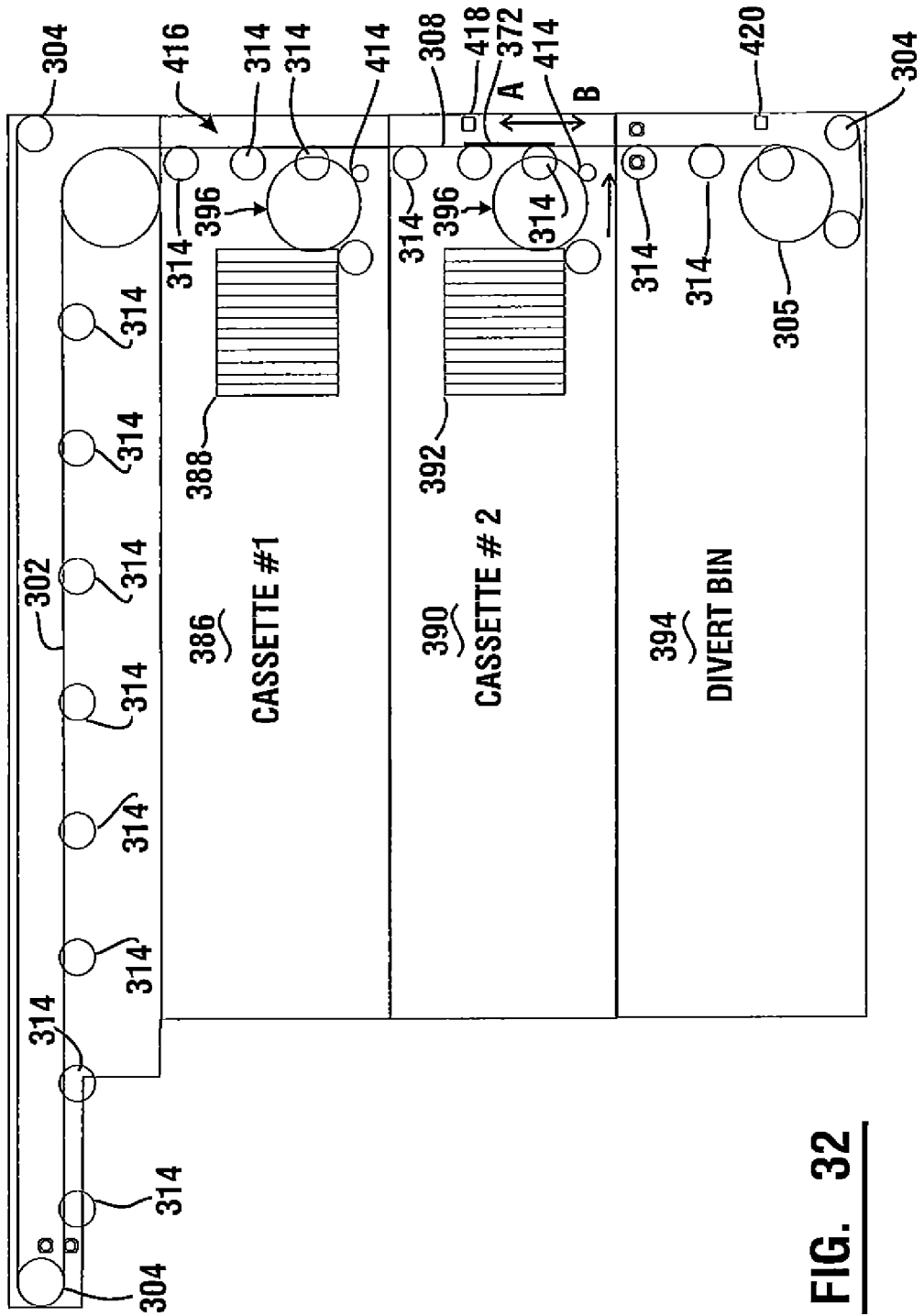
FIGS. 32-35 are side schematic views in sequence illustrating a system for stacking sheets using the roller assemblies of FIG. 24.

As can be appreciated from FIGS. 24, 31, and 36, the sheet 372 passing through the opening 414 between the roller assemblies 314 moves in engagement with the belt flights 308, 310, 312 to become trapped in sandwiched relation between the belt flights 308, 310, and 312 and the rollers 316. The sheet 372 once trapped in this manner is caused to be moved by the belt flights 308, 310, 312 to a desired location within the machine responsive to signals from the controller. Sheet 372 is fully moved through the opening 414 in the first direction along the transport path 416 to the location between the opening 414 of the first cassette 386 and the opening 414 of the second cassette as shown in FIG. 32. After the sheet 372 is fully moved through the opening 414, a sensor 418, which is positioned in the transport path 416 at a location beyond the opening 414 of the second cassette 390 in the first direction, senses the position of the sheet 372. The sensor 418 is in operative connection with the control circuitry and outputs at least one signal upon sensing the sheet 372. Sensor 418 can be one of several types of sensors suitable for sensing the position of sheets, such as a photo reflective type sensor.

Responsive at least in part to receiving the at least one output signal of the sensor, the control circuitry operates to stop movement of the sheet in the first direction. This is accomplished by the control circuitry 44 operating the transport drives in accordance with its program logic stored in memory, and in response at least in part to customer inputs at the customer interface.

Figure 33:
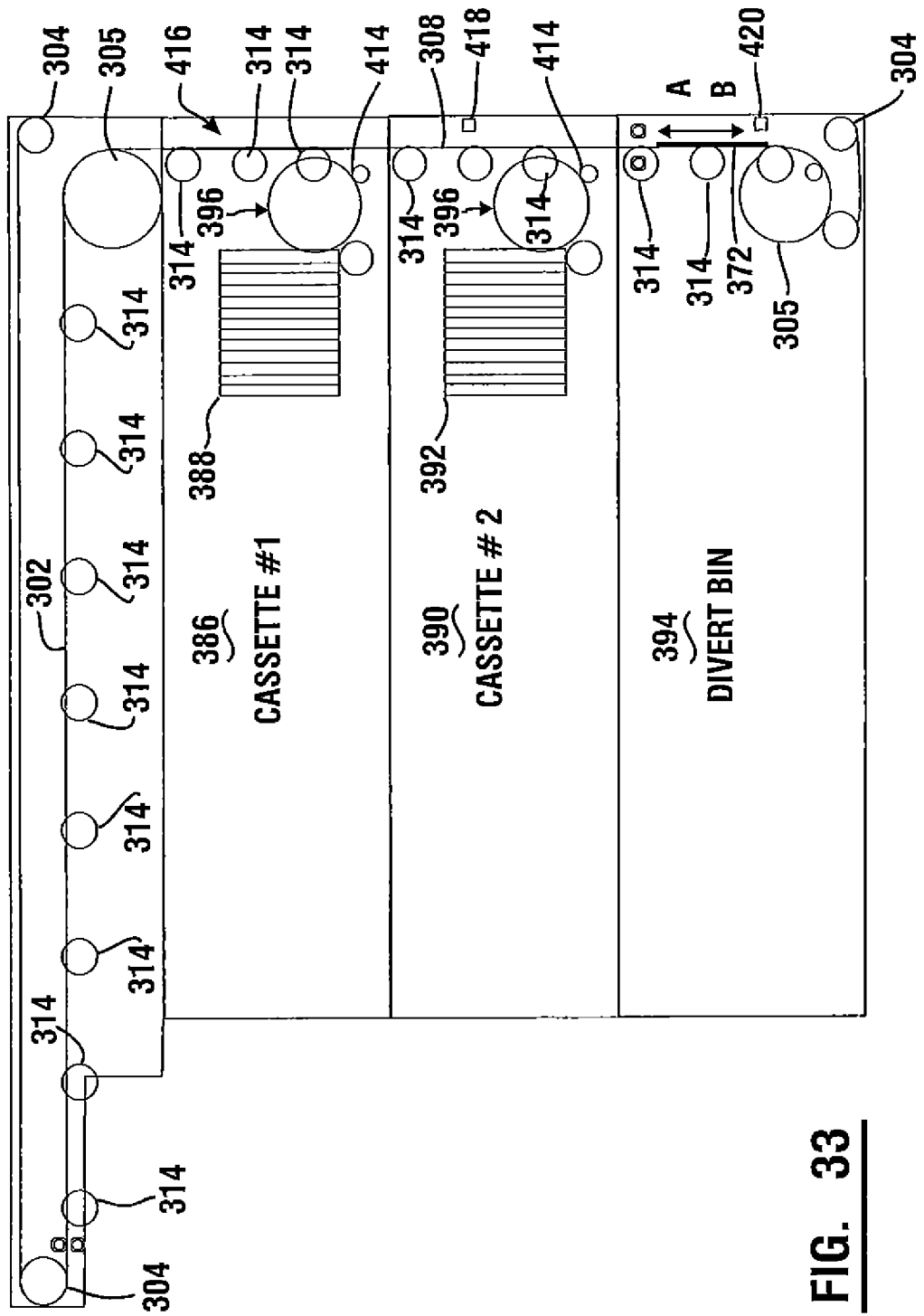

As shown in FIG. 33, the control circuitry now operates the components of the automated transaction machine (e.g., ATM) to move the sheet 372 in the second direction. The sheet 372 is moved in the second direction past the opening 414 of the second cassette 390 to location on the transport path 416 above the divert bin 394. A sensor which is schematically indicated 420 is positioned to sense that sheet 372 is positioned on the transport path 416 below the opening 414. The sensor 420 is operatively connected to the control circuitry and outputs at least one signal to the control circuitry upon sensing the sheet 372. Upon receiving the output signal from the sensor 420, the control circuitry operates to stop further movement of sheet 372 in the second direction when it has reached the position shown in FIG. 33.

Figure 34:
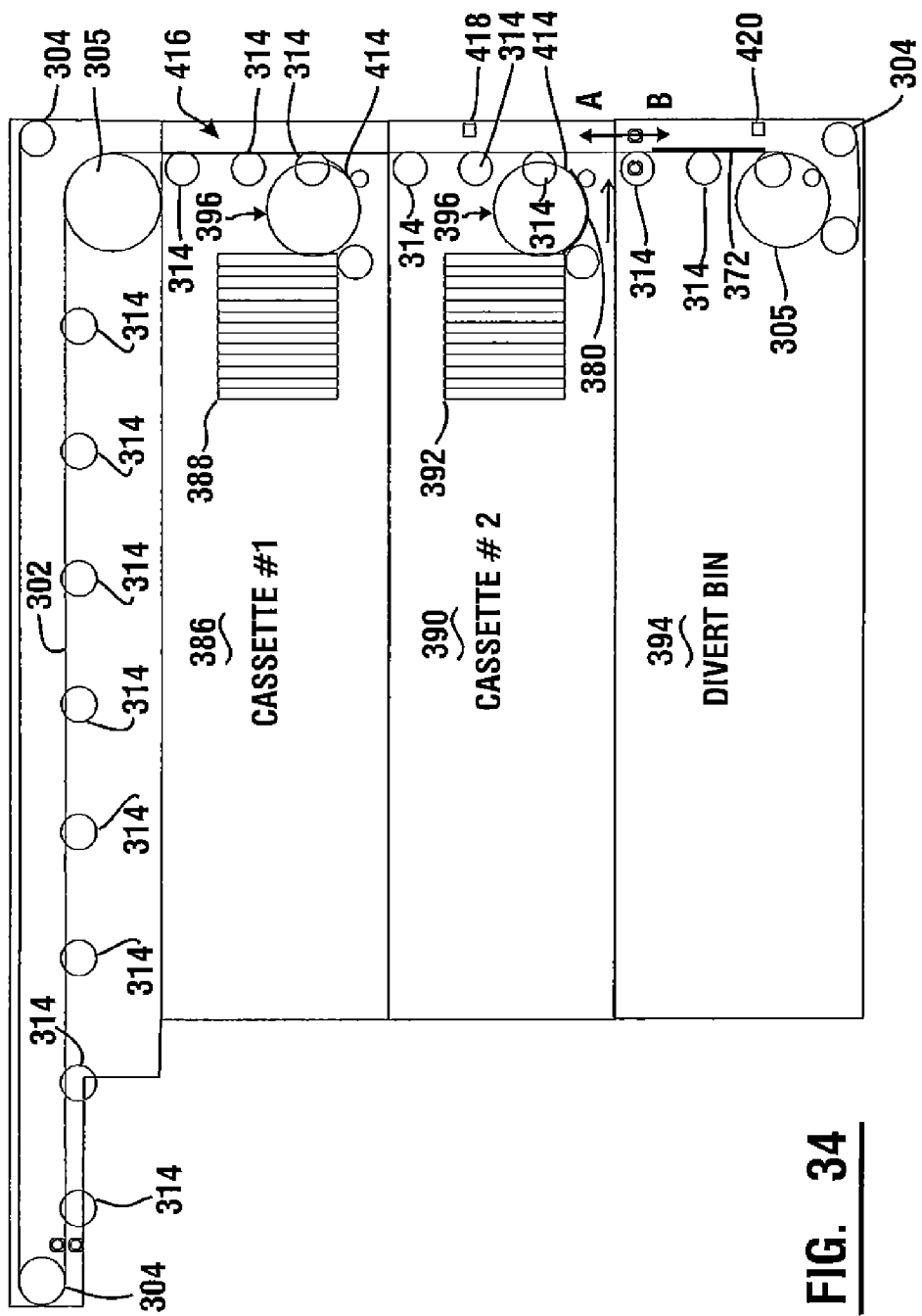

The next step in the operation of the exemplary stack assembly mechanism is represented in FIG. 34. A further sheet 380 from the second cassette 390 is moved toward the opening 414 by the sheet dispenser mechanism 396. As sheet 380 moves toward the opening 414, the control circuitry operates to begin moving sheet 372 in the first direction along path 416 toward the opening 414. The control circuitry coordinates the operation of the drives for the various components so that sheet 372 and sheet 380 intersect each other in coordinated relation. As a result, sheets 372 and 380 engage in aligned, abutting relation so as to form a stack as the sheet 380 pass through the opening 414 and sheet 372 moves over the opening 414.

Figure 35:
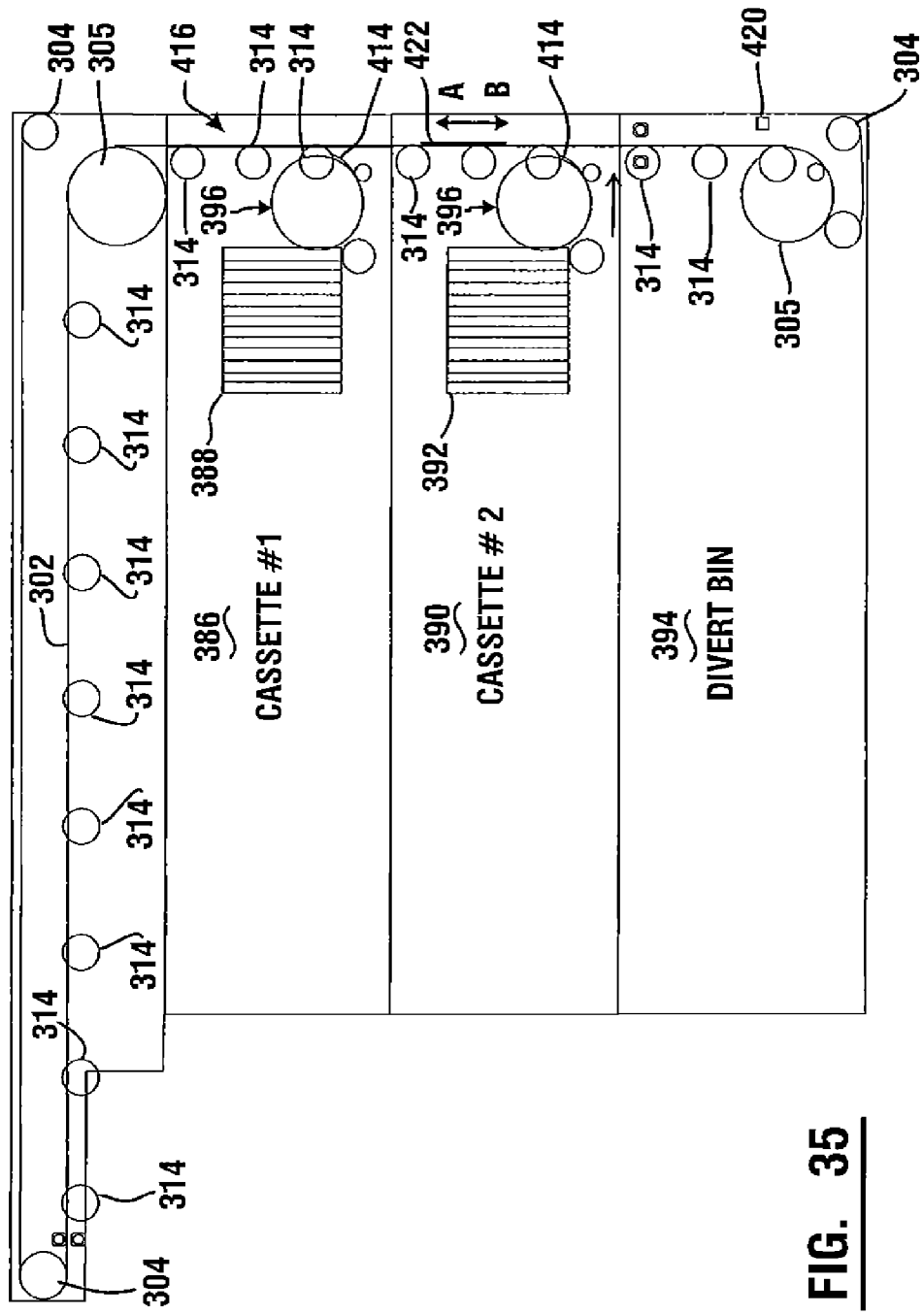
Figure 36:
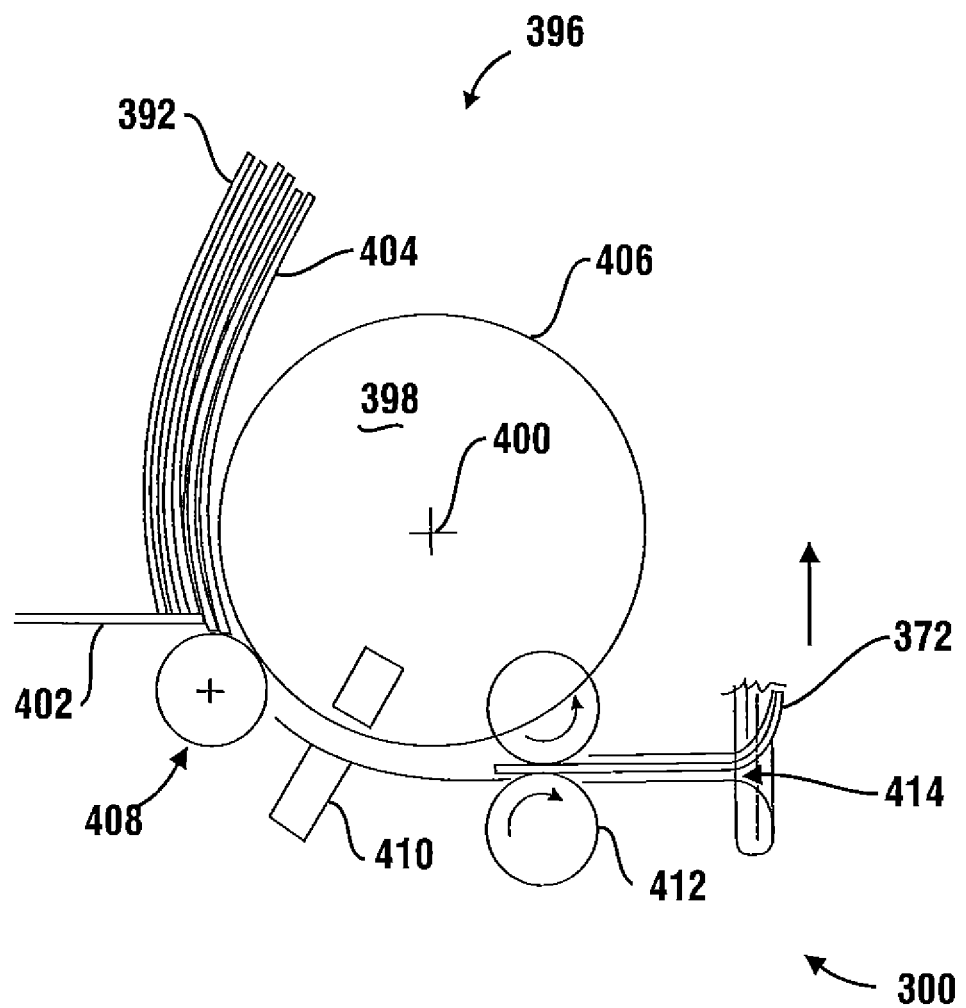
FIG. 36 is a side schematic view of a portion of FIGS. 32-35 showing a sheet that has been dispensed by a dispenser mechanism in FIGS. 32-35 moving to engage the sheet transport.

As shown in FIG. 35, once sheets 372 and 380 have passed the opening 414 in the first direction, they are in a stack generally indicated 422. As schematically indicated in FIG. 35, in this mode of operation, sensor 418 is operative to sense passage of the stack 422 past the opening 414 of the second cassette 390 and the control circuitry is operative to stop movement of the stack 422 in the first direction in response to signals from the sensor 418. After sheets 372 and 380 have combined to form stack 422, additional sheets can be added to the stack 422. This is accomplished by moving the stack 422 in the second direction similar to that which was done with sheet 372 previously, as represented in FIG. 33. If the stack 422 is complete, the stack 422 is moved in the first direction to be delivered to the user.

As can be appreciated, a stack of sheets can be built by including one or more sheets from cassette 390 in a stack, and then including one or more sheets from cassette 386 in the same stack (or vice versa). This is done by repeatedly moving the sheets in the transport past the opening associated with a respective picker mechanism, each time adding a note to the stack in aligned relation. In the exemplary embodiment sheets are moved in a first direction to add a sheet, and then the stack direction is reversed to place the stack in a position were a sheet can be added by movement of the stack past the picker mechanism opening again in the first direction. Of course it should be understood that in alternative embodiments sheets can be added to the stack when a stack is moved past the opening in either direction. In the exemplary embodiments the control circuitry is operative to coordinate operation of the transport and the picking mechanisms to produce a uniform stack of notes or other sheets to provide to a machine user. Further, it should be understood that while the exemplary embodiment includes two cassettes holding notes, and a divert bin, other embodiments can include other or different structures. This may include, for example, additional cassettes holding other or additional denominations of notes each with an associated picker mechanism. Other types of sheets can also be stored in the automated banking machine or generated within the machine and included in the stack.

Other embodiments can include additional features. For example each note that is picked can be moved past one or more sensors that sense properties of the note. This might include sensors of the types discussed in the incorporated disclosures which can be used to determine the denomination and/or validity of a note or other document. Thus, for example, in such embodiments, the denomination and/or validity of each picked note can be determined by moving the note past one or more appropriate sensors before the note is integrated into the stack or otherwise given to a customer. In this way it can be better assured that notes provided from the machine are genuine and correspond to what the user requested.

A presenter mechanism of exemplary embodiments can include additional belts that transport the stack away from where it is assembled and extend the stack 422 out of the machine to a user so that they can take it. One or more sensors can be positioned along the transport path and signals therefrom used to sense the stack and cause it to be moved into a position in which it can be taken by a user. One or more sensors can also sense the taking of the stack. Further, if the user does not take the presented stack 422 of sheets, the entire stack 422 can be retracted. In particular, by reversing the direction of the belts 308, 310, and 312, the stack 422 can be moved along the transport 300, past the sheet pickers 396, and into the divert bin 394. Thus, if a user fails to take the stack 422 of sheets within a certain time after they are presented, the machine can retract the stack 422, as stated above, and store the sheets in the stack 422 securely within the machine. The divert bin 394 is also used to receive sheets where there may be a problem creating the stack 422. For example, if the picker mechanism 396 picks a double sheet that cannot be separated through normal operation of the device, the machine can operate to take the entire stack 422 that has the problem and move the stack 422 into the divert bin 394. Thereafter, the machine can operate to build another stack 422 to present to the machine user.

In some embodiments, alternative sheet engaging assemblies may be used. In some embodiments, alternative structures that are configured to reduce the friction between a stack of sheets and the bearings can be used. For example, ball bearings can be mounted so as to extend in openings in support bodies. In another example, the low friction structures can take the form of a stationary element such as a projection with low friction material on its engaging surface that engages the sheets. In a further example, the support bodies can include compressed air jet outlets that enable low friction movement of sheets relative thereto.

Figure 37:
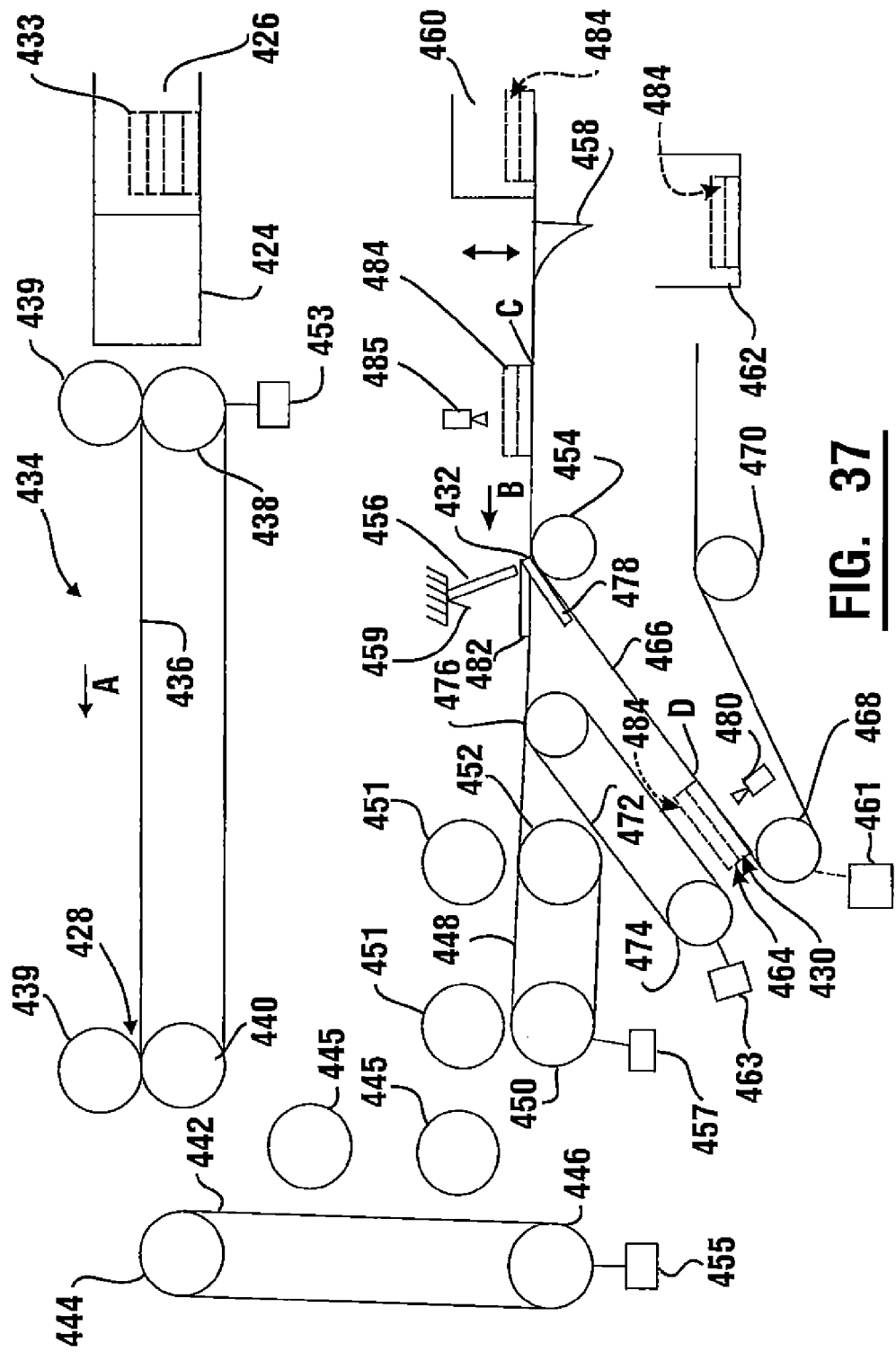
FIG. 37 is a side schematic view of an exemplary embodiment of a sheet handling mechanism showing a first transport path and a second transport path in an automated transaction machine.

In another exemplary embodiment as depicted in FIG. 37, a sheet handling mechanism includes features that handle sheets rejected by a currency validator 424. In this exemplary embodiment, the sheet handling mechanism includes a sheet inlet opening 426 that extends through the housing of the automated transaction machine (e.g., ATM). In the exemplary embodiment, the sheet inlet opening 426 is configured to enable sheets to be accepted into the machine from users.

Positioned adjacent the opening 426 is the currency validator 424 that is used to analyze properties of the sheets and determine whether the sheets are valid. One example of such a currency validator is manufactured by Japan Cash Machines. This validator has the capability to accept a stack of currency notes and unstack them one at a time. In another example, a currency validator employing the principles described in U.S. Pat. No. 5,923,413 which is incorporated herein by reference in its entirety, can be used for purposes of determining whether sheets have one or more property associated with valid notes. The at least one processor can be operative to determine whether notes received are likely valid, invalid and/or of suspect authenticity.

Other devices can be included which sense for other properties or data which can be used to analyze sheets for properties that are associated with authenticity. Based on determining whether sheets have at least one property, an exemplary automated banking machine is operative to store, return or otherwise process notes in a manner that is later described. Of course it should be understood that some of the principles can be used by the at least one processor to make a determination if at least one property associated with notes analyzed through devices in the machine, have one or more properties that suggest that they are valid or invalid notes. Similarly, analysis devices in a machine can be used to assess validity of other types of sheets.

The sheet handling mechanism further includes a first transport path 428 and a second transport path 430 that intersects the first transport path 428 at an intersection 432. The first transport path 428 receives individual sheets that have been separated from a stack 433 of sheets through operation of the validator 424. Each of the individual sheets is moved in the downstream direction as depicted by arrow A in the first transport path 428 through operation of a sheet transport 434.

The sheet transport 434 includes a plurality of first belts 436 journaled on spaced first rolls 438, 440. The sheet transport 434 also includes a plurality of second belts 442 journaled on spaced second rolls 444, 446 and located downstream from the first belts 436. The sheet transport further includes a plurality of third belts 448 journaled on spaced third rolls 450, 452, 454 and located downstream from the second belts 442. One or more of a respective first, second, and third roll can function as a drive roll that operates to move a respective first, second, and third belt. Furthermore, the first rolls 438, 440, second rolls 444, 446, and third rolls 450, 452, 454 can each be driven by one or more independent respective reversible drives 453, 455, 457 under control of the control circuitry 44. The control circuitry 44 preferably includes at least one processor in operative connection with at least one memory or data store, and is operative to carry out programmed instructions based on data stored in the memory and sensed conditions detected through operation of various sensors. The control circuitry in the exemplary embodiment operates the machine to carry out the operations hereinafter described.

The belts 436, 442, and 448 engage the sheets and move them along the first transport path 428. The transport 434 of the exemplary embodiment is operative to move sheets away from the sheet opening 426. It should be understood that although a single transport of a belt type is shown, in other embodiments other numbers and types of transports can be employed for moving sheets, such as rollers, tracks or compressed air. In some embodiments it may be desirable to use a sheet transport that moves sheets in sandwiched relation between a driving member such as a roll or belt flight, and a follower member that extends on an opposed side of the sheet from the driving member. The follower member can be operative to assure engagement of the sheet with the driving member to assure sheet movement therewith. In some embodiments, movable rolls or belts can operate as suitable follower members. For example, follower members 439 can extend on an opposed side of the first belts 436. Follower members 445 can extend on an opposed side of the second belts 442, and follower members 451 can extend on an oppose side of the third belts 448.

The exemplary sheet transport 434 further includes a gravity gate 456 located on the first transport path 428 adjacent to the intersection 432 on the upstream side. The gravity gate 456 is pivotally mounted in supporting connection with the machine and hangs freely in an initial position. The gravity gate 456 is allowed to pivot downstream from its initial position, but is prevented from pivoting upstream from the initial position by a stop member 459 (and belt 448). With this configuration, the gravity gate 456 allows a sheet or stack of sheets traveling downstream to pass through the pivoted gate but prevents the sheet or stack of sheets from moving back upstream through the gate 456 into the first transport path 428. However, the gravity gate 456 is mounted in a manner such that its initial position relative to the intersection 432 provides enough space to allow a sheet or stack of sheets 484 to move upstream (in reverse) to pass before the gate 456 into the second transport path 430. The gravity gate is exemplary. In other embodiments the gate can be powered or other types of sheet directing devices can be used.

A diverter gate 458 is positioned in the first transport path 428 downstream of the intersection 432. This diverter gate 458 is pivotally selectively movable between first and second positions by a drive or other suitable movement device. When the diverter gate 458 is in the first position as shown in FIG. 37, the diverter gate 458 directs the sheet or stack of sheets to an outlet opening 460 in the housing of the machine to be presented to the customer. In an operative embodiment this outlet opening 460 is generally located directly below the inlet opening 426 adjacent the validator 424 to which the sheets have been presented by the user.

When the diverter gate 458 is in the second position, the diverter gate 458 operates to direct the sheet or stack of sheets to a holding cassette 462 such as that described in U.S. Pat. No. 7,144,006, the disclosure of which is incorporated by reference in its entirety. Alternatively, the sheet or stack of sheets can be directed into other types of cassettes instead of the holding cassette. For example, the sheet or stack of sheets can be directed into a recycling cassette, or alternatively, a gravity cassette that holds the sheets in loose form. Of course these approaches are exemplary.

The second transport path 430 includes transport 464. The exemplary sheet transport 464 includes a plurality of belts 466 journaled on spaced rolls 468, 470 and 454. The sheet transport 464 can include a plurality of belts 472 journaled on spaced rolls 474, 476 located opposite the belts 466 and rolls 468 and 454. The rolls 468, 470, 454 operate to move the belts 466, and rolls 474, 476 operate to move belts 472. The rolls 468, 470, 454 of the sheet transport 464 are driven by one or more independent reversible drives 461 under control of the control circuitry 44. The rolls 474, 476 of the sheet transport 464 are driven by one or more independent reversible drives 463 under control of the control circuitry 44.

In operation, a sheet or a stack of sheets is positioned on the second transport path 430 and moved by the transport 464 to a position near the intersection 432. For example, a sheet 478 can be dispensed by a sheet dispensing device, sheet producing device, or is otherwise in the path, and is engaged by the belts 466 and 472 of the transport 464 and moved toward the intersection 432 by the transport 464. The sheet 478 is also sensed by a sensor 480 in the second transport path 430. Sensor 480 is in operative connection with the control circuitry. The control circuitry operates to accurately coordinate the movement of the sheet 478 in engagement with the belts 466, 472.

A user deposits a sheet 482 in the opening 426 of the machine. The sheet 482 passes through the validator 424 and is moved along the first transport path 428 by the transport 434. The sheet 482 is then moved past the gravity gate 456 and the intersection 432 where the sheet 482 is moved into alignment with the sheet 478 on the second transport path 430 to form a stack 484 as shown by the phantom lines at location C on the first transport. A sensor 485 senses the sheet 482 at this position and outputs a signal to the control circuitry. Upon receipt of this signal, the control circuitry operates the transport 434 to stop the movement of the stack 484 of sheets. Alternatively, instead of using the sheet sensor, the drives 453, 455, 457 of the transport 434 and the drives 461, 463 of the transport 464 can be in the form of stepper motors which can be controlled to automatically stop the transport with the stack at a desired location. If more sheets are to be stacked on the stack 484, then movement of the stack 484 can be reversed by the control circuitry, and the stack moved in the direction B back on the second transport path 430 to a location indicated by D. The stack 484 can then be moved by the transport 464 to a position near intersection 432 until the next sheet from the first transport path 428 arrives.

In the exemplary embodiment, if the sheet 482 in the stack 484 or any other sheet in the stack 484 passing through the validator 424 is determined to be invalid by the validator 424 or if the customer cancels the transaction by providing one or more inputs to the machine, the exemplary control circuitry operates to cause the diverter gate 458 to be in the first position to direct the stack 484 of sheets out through the opening 460 in the housing. The stack 484 is moved out through the opening 460, as depicted by the phantom lines, and returned to the user.

Alternatively, if the sheet 482 and all of the other sheets in the stack 484 that passed through the validator are determined by the validator 424 to be valid, control circuitry operates the diverter gate 458 to be in the second position to direct the stack 484 of sheets downward into the holding cassette 462. The stack 484 of sheets is then moved downward to the holding cassette as depicted by the phantom lines.

Figure 38:
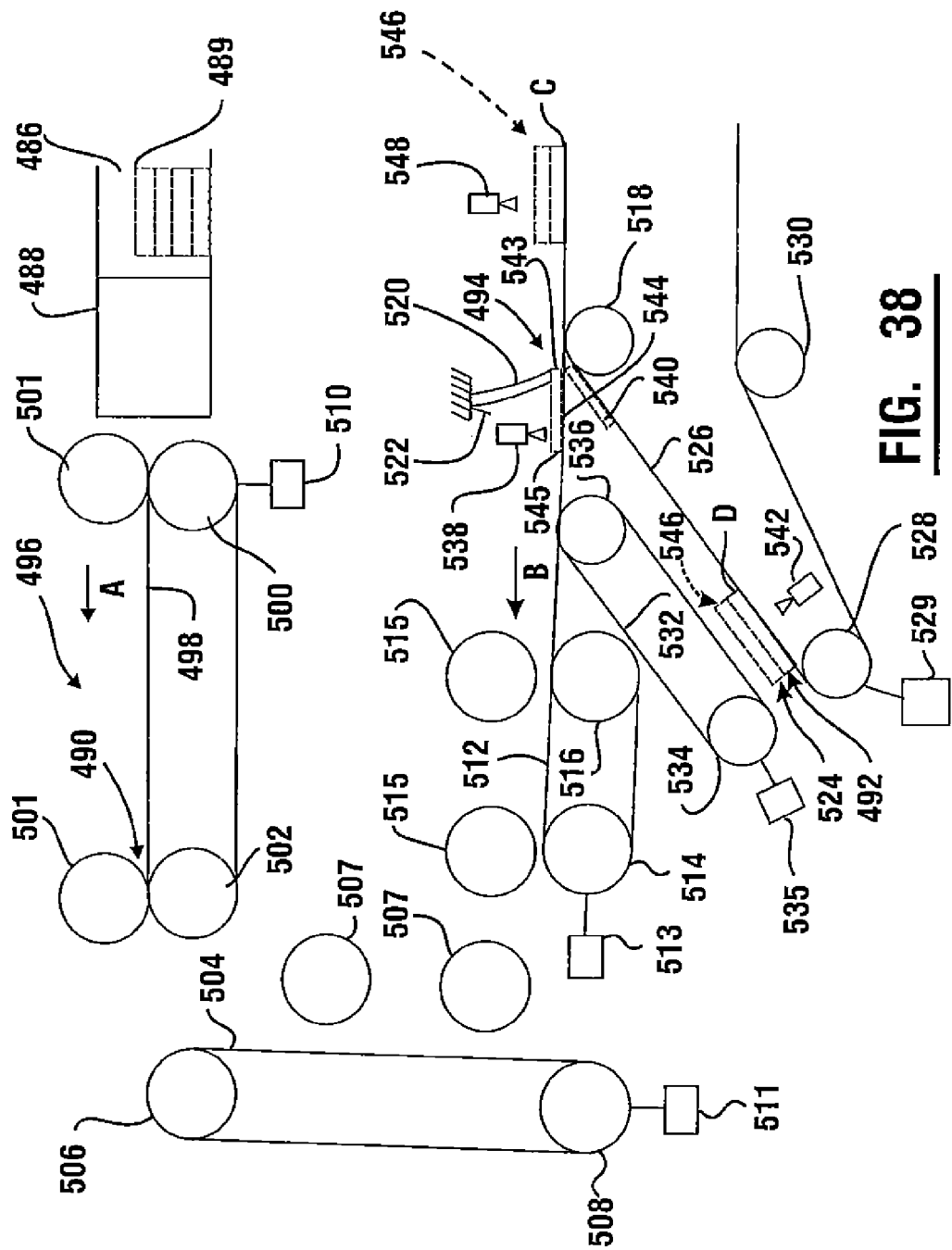
FIG. 38 is a side schematic view of another exemplary embodiment of a sheet handling mechanism showing a first transport path and a second transport path in an automated transaction machine.

In another exemplary embodiment as illustrated in FIG. 38, a note handling mechanism can instead return an individual invalid sheet or currency note to the machine user rather than return the entire stack. In this exemplary embodiment, the sheet handling mechanism includes a sheet opening 486 that extends through the housing of the automated transaction machine (e.g., ATM). In the exemplary embodiment, the sheet opening 486 is configured to enable the sheets to be provided therethrough into the machine from machine users (customers).

This note handling mechanism is also suitable for automated transaction machines (e.g., ATMs) that are designed to not include a separate return opening for a stack of sheets (e.g., currency bills) being returned to the customer if a sheet is determined to be invalid. As a result, the sheet opening 486 can be used as an inlet/outlet opening for a sheet/stack.

Positioned adjacent the opening 486 is a currency validator 488 that is used to analyze properties of the sheets and determine whether the sheets are valid. One example of such a currency validator is manufactured by Japan Cash Machines. This validator has the capability to accept a stack of sheets and unstack them. In another example, a currency validator employing the principles described in U.S. Pat. No. 5,923,413 which is incorporated herein by reference, can be used for purposes of determining whether sheets have one or more property associated with valid sheets. The at least one processor can be operative to determine whether notes received are likely valid, invalid and/or of suspect authenticity.

Other devices can be included which sense for other properties or data which can be used to analyze sheets for properties that are associated with authenticity. Based on determining whether sheets have at least one property, the exemplary automated transaction machine is operative to store, return, or otherwise process notes in a manner that is later described. Of course it should be understood that some of the principles can be used by the at least one processor to make a determination if at least one property associated with notes analyzed through devices in the machine, have one or more properties that suggest that they are valid or invalid notes. Similar analysis devices in a machine can be used to assess validity of other types of sheets.

The exemplary sheet handling mechanism further includes a first transport path 490 and a second transport path 492 that intersects the first transport path 490 at an intersection 494. The first transport path 490 receives individual sheets from the validator 488 that have been separated from a stack 489 of sheets. Each of the individual sheets can be moved in the downstream direction as depicted by arrow A and the upstream direction as indicated by arrow B along the first transport path 490 through operation of a sheet transport 496, such as a currency note transporter.

The sheet transporter 496 includes a plurality of first belts 498 journaled on spaced first rolls 500, 502. The sheet transport 496 also includes a plurality of second belts 504 journaled on spaced second rolls 506, 508 and located downstream from the first belts 498. The sheet transport 496 further includes a plurality of third belts 512 journaled on spaced third rolls 514, 516, and 518 and located downstream from the second belts 504. The rolls operate to move the belts. The first rolls 500, 502, second rolls 506, 508, and third rolls 514, 516, 518 are each driven by one or more independent respective reversible drives 510, 511, 513 under control of control circuitry 44. The control circuitry 44 preferably includes at least one processor in operative connection with at least one memory or data store, and is operative to carry out programmed instructions based on data stored in the memory and signals from various sensors. The control circuitry in the exemplary embodiment operates the machine to carry out the operations hereinafter described.

The belts 498, 504, 512 engage the sheets and move them along the first transport path 490. The first transport path 490 can include the route from the opening 486 to the location C.

The transport 496 of the exemplary embodiment is operative to move sheets away from the sheet opening 486. It should be understood that although a single transport of a belt type can be used, in other embodiments other amounts and types of transports can be employed for moving sheets. These can include rollers, balls, or even jets of compressed fluid (e.g., air).

In some embodiments it may be desirable to use a sheet transport that move sheets in sandwiched relation between a driving member such as a roll or belt flight, and a follower member that extends on an opposed side of the sheet from the driving member. The follower member can be operative to assure engagement of the sheet with the driving member to assure sheet movement therewith. In some embodiments movable rolls or belts can operate as suitable follower (driven) members. For example, follower members can be similar to a previously discussed roller assembly 314 comprising an idler roller 316 mounted in a support body 318. In an exemplary arrangement as shown in FIG. 38, follower members 501 are positioned along the transport path at an opposed (opposite) side of the path relative to the first belts 498, follower members 507 extend (are positioned) on an opposite side of the second belts 504, and follower members 515 extend opposed of the third belts 512.

The exemplary sheet transport 496 further includes a gravity gate 520 located adjacent the first transport path 490 adjacent to the intersection 494 on the upstream side. The exemplary gravity gate 520 is pivotally mounted to the machine and hangs freely in an initial position. The gravity gate 520 is allowed to pivot downstream from its initial position, but is prevented from pivoting upstream from the initial position by a stop member 522. With this configuration, the gravity gate 520 allows a sheet or stack of sheets traveling downstream to pass through the gravity gate 520 but prevents the sheet or stack of sheets from moving back upstream through the gravity gate 520 into the first transport path 490. However, the gravity gate 520 is mounted in a manner such that its initial (closed) position relative to the intersection 432 provides enough space to allow a sheet or stack of sheets 546 to move upstream (in reverse) to pass before the gate 520 into the second transport path 492. Again, use of a gravity gate is exemplary, and in other embodiments other mechanisms or devices for directing and/or guiding sheets can be used.

The second transport path 492 includes a transport 524. The sheet transport 524 includes a plurality of belts 526 journaled on spaced rolls 528, 530, 518. The sheet transport can include a plurality of belts 532 journaled on spaced rolls 534, 536 located opposite the belts 526 and rolls 518, 528. The rolls 528, 530, 518 operate to move the belts 526 and the rolls 534, 536 operate to move the belts 532. The rolls of the sheet transport 524 are driven by one or more independent reversible drives (not shown) under control of the control circuitry 44. The rolls 518, 528, and 530 of the sheet transport 524 are driven by one or more independent reversible drives 529 under control of the control circuitry 44. The rolls 474, 476 of the sheet transport 464 are driven by one or more independent reversible drives 535 under control of the control circuitry 44. One or more sheet sensors 538 can be provided at the intersection to sense whether the sheet is at or near the intersection.

In an exemplary operation, a sheet or a stack of sheets is positioned on the second transport path 492 and moved by the transport 524 in a position near the intersection 494. For example, a sheet 540 can be dispensed by one of the sheet dispensers, sheet producing devices, or is otherwise in the path, and is engaged by the belts 526, 532 of the transport 524 and moved toward the intersection 494 by the transport 524. Sheet 540 is also sensed by a sensor 542 in the transport path 492. Sensor 542 is in operative connection with the control circuitry. The control circuitry 44 operates to accurately coordinate the movement of the sheet 540 in engagement with the belts 526, 532. As previously discussed, the control circuitry 44 can include at least one computer with programming that controls operation of the components of the transport 524.

A machine user deposits a sheet 544 in the opening 486. The sheet 544 passes through the validator 488 and is moved along the first transport path 490 by the transport 496. This sheet 544 passes through the validator 488 and is moved into partial engagement of the sheet 540 as shown in FIG. 38 in which a leading edge 543 of the sheet 544 is in engagement with the sheet 540 at the intersection 494. The trailing edge 545 of the sheet 544 is still in the first transport path 490. The sensor 538 senses the sheet 544 at this position and outputs a signal to the control circuitry. Upon receipt of this signal, the control circuitry operates the transport 496 to stop the movement of the sheet 544 until the validator 488 operates to determine whether or not the sheet 544 is valid. Alternatively, instead of using the sheet sensor 538, the drives of the transports can be in the form of stepper motors which can be automatically controlled to stop the transport 496 when the leading edge 543 of the sheet 544 is in engagement with the sheet 540 at the intersection 494.

If the validator 488 determines that the sheet 544 is valid, the control circuitry, responsive at least in part to one or more signals from the validator 488, is operated to resume the stacking operation. In particular, the control circuitry operates to begin moving the sheet 544 again in the downstream direction along the first transport path 490. The sheet 544 is then moved past the gravity gate 520 and the intersection 494 where it is aligned with the sheet 540 on the second transport path 492. The control circuitry coordinates the operation of the drives for the various components so that the sheet 540 and the sheet 544 pass through the intersection 494 in a coordinated relation. As a result, sheets 540 and 544 engage in aligned, abutting relation so as to form a stack 546, as shown in phantom lines, as the sheets move through the intersection 494 to a location C on the first transport path 490. A sensor 548 senses the stack 546 of sheets at this position and outputs a signal to the control circuitry. Upon receipt of this signal, the control circuitry operates the transport 496 to stop the movement of the stack 546 of sheets. If more sheets are to be stacked on the stack 546, the movement of the stack can then be reversed by the control circuitry and moved as directed by the gate 520 onto the second transport path 492 to a location indicated by D. The stack can then be moved by the transport 524 and placed at the same position near the intersection 494 until the next sheet from the first transport path 490 should arrive.

Alternatively, in the exemplary embodiment, if the validator 488 determines that the sheet 544 is invalid, the control circuitry operates the drives and other components of the machine to move the sheet 544 upstream away from the intersection 494 in the direction of arrow B. The sheet 544 is moved back along the first transport path 490 and through the validator 488 until it is returned to the user through the opening 486.

In this exemplary embodiment, because the validator 488 does not determine whether or not the sheet 544 deposited by the user is valid until after the sheet has passed through the validator 488, parking the sheet in the position before it is fully integrated in the stack and waiting until the determination is complete, enables the individual sheet be returned back to user if it is invalid. In this way, the invalid sheet is never fully integrated in the stack and can be returned separately. Thus the entire stack need not be returned to the user. This feature can speed transactions involving depositing and/or dispensing sheets, because it facilitates the handling of invalid sheets. This approach can also increase the speed of being able to deal with sheets generally, since the sheets can be stacked and the next sheet moved through the validator to the parked position more quickly.

In alternative exemplary embodiments, a currency validator can also be used in an automated transaction machine (e.g., ATM) which only dispenses currency notes. That is, a dispense-only machine that does not accept notes from customers. The currency validator can be arranged to operate to validate notes during a cash dispense operation. This would ensure that the customer received valid notes. Alternatively, the currency validator can be arranged to operate to validate notes soon after they have been loaded into the machine by an authorized person/entity. That is, the validator could verify all newly loaded notes before initiation of any cash dispense operation involving the newly loaded notes. For example, if bank employee loaded a counterfeit or suspect note into the machine during a cash loading procedure, then the machine would detect the invalid note. Furthermore, the validator could be programmed to both validate newly loaded notes (before they are requested in a cash withdrawal transaction) and then again validate the (same) notes that are to be dispensed during the cash withdrawal transaction. Notes determined to be invalid would be appropriately stored in the machine, in a manner as previously discussed.

As previously discussed, an exemplary currency cassette (or canister) includes indicia or other data that indicates the type (e.g., denomination) and/or properties (e.g., total number, value, etc.) of currency notes held therein. The indicia data may be a code that is represented on the cassette (e.g., a barcode) or programmed (RFID tags, NFC chips, etc.) into the cassette.

Cassette indicia can be read by a machine's reader device during (or after) installation of the cassette into the automated banking machine. For example, the reader may be a barcode reader. The reader may also be a contactless reader such as a radio frequency identification (RFID) reader, a near field contact (NFC) reader, infrared (IR), or a wireless communication port. Thus, the machine memory stores information regarding the expected denomination of notes in a particular cassette. Examples of noncontact and/or wireless manners of communicating identifying indicia are discussed in U.S. application Ser. No. 13/487,501 filed Jun. 4, 2012 and Ser. No. 13/555,235 filed Jul. 23, 2012.

All notes in a cassette are typically of the same denomination (e.g., $20 bills). However, difference may occur with regard to the true denomination of bills in a cassette and the denomination information being relied upon by the automated banking machine. For example, during a cash loading operation a cassette may have been manually placed in the wrong order (position or location) in the stack of cassettes in the machine. Also, a wrong denomination of bills may have been placed in the cassette. For example, $10 bills may have been placed in a cassette designated for $20 bills. Furthermore, the wrong denomination information for a cassette may have been stored. That is, cassette indicia may indicate an incorrect denomination. For example, cassette indicia may be loaded with wrong data or the indicia may have been modified (damaged) during transport. Additionally, an automated banking machine's reader may misread cassette indicia. For example, the reader (or other components associated therewith) may be faulty (or degrading in their operational ability). As can be seen, any of these factors can result in an automated banking machine performing an improper/inaccurate cash dispense.

As previously discussed with regard to an exemplary embodiment, an automated banking machine uses a note validator to verify all newly loaded notes. That is, newly loaded notes in a cassette are verified (with regard to being an unacceptable note, a suspect note, a counterfeit note, a correct denomination note, etc.) before initiation of any cash dispense operation involving these newly loaded notes. Thus, newly loaded notes are checked whether they correspond to the (type and property) indicia read from their cassette. As previously discussed, notes can additionally be validated (re-validated) during the cash dispense operation. This revalidation (during a cash dispense operation) includes determining the denomination of each particular picked note before the particular note is given to the customer. That is, for (at least) a second time a note's denomination can be compared to the denomination indicated by the cassette indicia. Thus, a note's denomination can be (at least) twice verified/validated (with respect to the note's description indicia included with the currency cassette.

Both verifications of correct denomination can involve comparing the denomination determined (read) from the cassette's indicia to the denomination determined from sensing (reading) the note. The first denomination check can occur at a time when the note is first received by the machine. For example, this may occur in a cash loading operation, a cassette loading operation, a cash receiving transaction (for a cash recycling machine), etc. The second denomination check can occur at a time when the note is being removed from the machine. For example, this may occur in a transaction that includes a cash dispense to a customer (e.g., a cash withdrawal transaction) or in a cassette removal operation in which the cassette is replaced with a fully loaded cassette. The revalidation of a currency note may also include a new (second) receiving (reading) of indicia from the note's cassette.

As can be seen, the exemplary embodiments provide for use of a note (currency bill) detector/validator for outgoing dispensed notes. The note detector is used to determine if notes that are being dispensed are the correct denomination. Furthermore, the note detector/reader can be used to determine/verify that the read denomination of a particular note that was taken from a particular cassette corresponds to (matches) the denomination code that was read from the particular cassette.

In an exemplary embodiment the machine is programmed to shutdown if the denomination that is detected/read from a note (as detected based on sensors and a processor) differs from the denomination indicated by the cassette. For example, cassette indicia may indicate that it holds notes of the $20 denomination, but it actually only holds $10 notes. If a machine user requested $100 then the user may only receive $50, but a dispense of $100 gets associated with the user's account.

In an exemplary embodiment, if the machine has an improperly labeled cassette, then the machine will detect the error and stop operating at the earliest opportunity. The machine can also notify (by sending at least message) servicing personnel and/or the financial institution of the discovered discrepancy.

Hence, the machine is programmed to avert the dispense of an improper cash amount to a customer. Thus, the novel system benefits the machine user by preventing a cash dispense where a customer would only receive $50 instead of the expected $100. The novel system likewise benefits the financial institution affiliated with the machine by saving it both time and money needed to resolve issues of inaccurate cash dispenses. As can be appreciated, the exemplary system provides a built-in security feature that warns the financial institution of cash dispensing anomalies regarding their automated banking machine.

In a further exemplary embodiment the machine, upon detecting the error in the cassette indicia, is able to compensate for the error by modifying machine memory to reflect the true denomination of the particular cassette. This compensation may also include the implementation of additional denomination checks (verifications) on the notes taken from that particular cassette (which may be placed on an alert status).

In review, the exemplary automated banking machine system can (during a cash dispense transaction) determine the denomination of notes that are being dispensed. That is, these notes have been taken from one or more currency cassettes (or other storage area) but have not yet been dispensed during the cash dispense transaction (e.g., cash withdrawal transaction, check cashing transaction, etc). The determined denomination of a taken note is compared against the denomination indicated by the cassette (from which it was taken). That is, with regard to a particular note, a machine-determined denomination of the particular note is compared with the cassette-indicated denomination of the particular note. Upon denomination correspondence, the note meets the requirements to be dispensed in the note dispense transaction.

The exemplary automated banking machine system can operate to verify whether a note corresponds to the note denomination indicated by the cassette from which the note was taken. In additional embodiments the system can perform a pre-dispense check of all notes in cassettes that were newly received into the machine. That is, the denomination verification process can occur during a cash dispense transaction or prior to a user request for a cash dispense transaction. The note denomination verification check can be carried out multiple times, including on newly installed cassettes and (thereafter) during each cash dispense transaction. Thus, the exemplary arrangement allows for multiple checks (verifications) of a currency note's denomination.

An exemplary embodiment includes the addition of a replaceable security module for use in a cash dispenser. This individual security module can operate as a dispensed-amount verifier (DAV) module. An exemplary note denomination determining (or analysis) module includes at least one module processor, at least one data store (memory), at least one note data reader (e.g., a scanner), and/or a note analyzer. The note analyzer is operable to analyze currency note data read by the at least one note data reader. The note analyzer can include a processor. The module is operable to analyze currency notes, including analysis regarding note denomination. That is, the module is programmed to operate to determine the denomination (value) of a currency note. The module can operate to verify whether the denomination of a note taken (e.g., during a user session, during a cash dispense transaction, etc.) from any given currency cassette (located in the machine) matches the expected note denomination indicated by that given cassette.

In the exemplary embodiment the note denomination determining module comprises a hardware module that operates to scan bills as they are dispensed (picked) from a cassette. For example, the security module may be located at an internal bill stacker. The stacker can produce a stack that includes bills of different denominations. A completed stack can then be presented to a machine user.

As previously discussed, a machine computer (or control circuitry) can obtain respective denomination data on every newly installed respective cassette. The machine computer can dictate the number of bills of specific denominations that are to be included in the stack, and which cassettes are to provide which bills. The machine computer can provide a bill stacking order. For example, a bill stacking order for a $90 cash dispense transaction may be four consecutive $20 bills taken from cassette #1 followed by one $10 bill taken from cassette #5, where the $10 bill ends up (as the last bill) on top of the stack. During the cash dispense transaction the note denomination determining module can receive (and store in memory) the bill stacking order from the machine computer. Thus, the module knows for each individual bill received at the stacker both the bill's expected denomination and the bill's source (cassette). This information allows that module to compare the expected denomination of a bill to the module-determined denomination of the same bill. An absence of denomination correspondence can be determined by the module. Thus, the module, by also knowing which cassette provided the non corresponding bill, allows for the identification of a particular currency cassette which may have bills of an incorrect denomination.

In the exemplary embodiment the note denomination module uses optical character recognition (OCR) technology in reading and identifying (determining) the denomination of bills as they arrive at the stacker. Other bill reading techniques can be used in determining a bill's denomination. It should be understood that an entire side of a currency note need not be read by the module in order for the module to obtain the note data necessary to determine the note's denomination. That is, an exemplary module is able to make a determination regarding a note's denomination based on data obtained only from a portion of the note.

If the module determines that a bill's denomination does not match (correspond to) the expected (cassette's) denomination of the bill, it can notify the cash dispenser (e.g., dispenser firmware) that there is an anomaly. A processor associated with the cash dispenser (or the machine) can then cause all dispense operations to cease. For example, the cash dispenser's shutter or a cash presenter gate can be set not to open. The customer would be notified that the cash dispense transaction can not be completed. The financial institution (e.g., a bank branch) would be made aware of the issue so that appropriate action could be taken. Thus, any denomination mismatch detected by the module can result in error detection action, including an error report in the form of one or more machine error signals.

In another embodiment the note analysis module only receives the denomination stacking order from the machine computer (or control circuitry), and does not receive information on which cassettes are to provide which bills. For example, in a cash dispense transaction the stacking order for $50 may be two consecutive $20 bills followed by one $10 bill. Again, the module knows what the denomination of each individual bill received at the stacker is expected to be. This information allows the module to compare the determined denomination of a bill to the expected denomination of the same bill. If the comparison does not result in a match, then the module can indicate to the machine computer (or other component) that a denomination error was detected. The machine computer (or control circuitry) can then cause the machine to take preventative action and inform the respective authorities of the error.

As shown in the Figures, there are many sheet/stack path positions where a security module may be located so that it can analyze and determine (or ascertain) the denomination of a currency note before that note is provided to a machine user. As previously discussed, the module (or a scanner thereof) may be located adjacent to (or be a part of) a stack assembly mechanism (e.g., a note stacker). Different automated banking machines can have different locations where notes are stacked before the completed stack is presented to a machine user in a cash dispense operation. A note stacker having note sensors 134, 138, and 142 has already been discussed. The security module may be placed near any of these sensors 134, 138, and 142. An imaging device 72 has also been discussed. The security module may be a part of the imaging device 72, or placed next to the sheet path that leads in/out of the imaging device. A further sensor 162 has been discussed. This sensor 162 may be part of a validation device that can determine note denomination. The security module may be a part of this validation device, or placed adjacent thereto.

FIGS. 39-42 show exemplary embodiments of security modules, and examples of different positions where a security module can be located in an automated banking machine. As previously discussed, each module is able to determine whether a note's actual denomination (as determined by the module) corresponds to (matches) the expected denomination of the note (where the expected denomination was obtained from data provided by the cassette).

Figure 39:
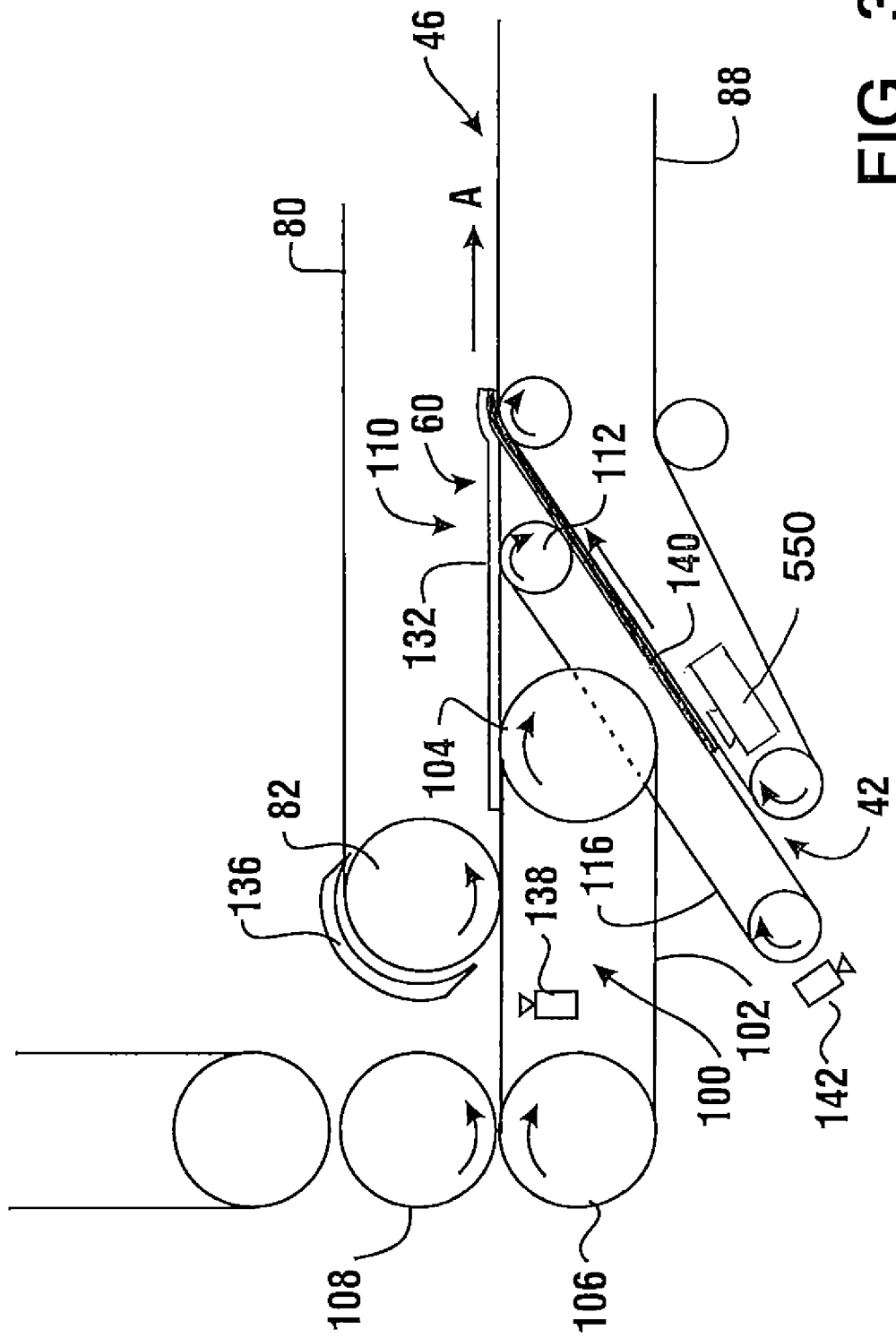
FIG. 39 shows an exemplary embodiment of a replaceable security module which is located in an automated transaction machine, where the module is operable (and positioned) to determine the denomination of a currency note taken from a storage container, and then verify whether the determined denomination corresponds to the note denomination indicated by that storage container.

FIG. 39 shows a note analysis module 550 that is located adjacent to the transport path 42. The module 550 is positioned to evaluate the denomination of the picked note 140 before the note is added (along with note 132) to the stack.

Figure 40:
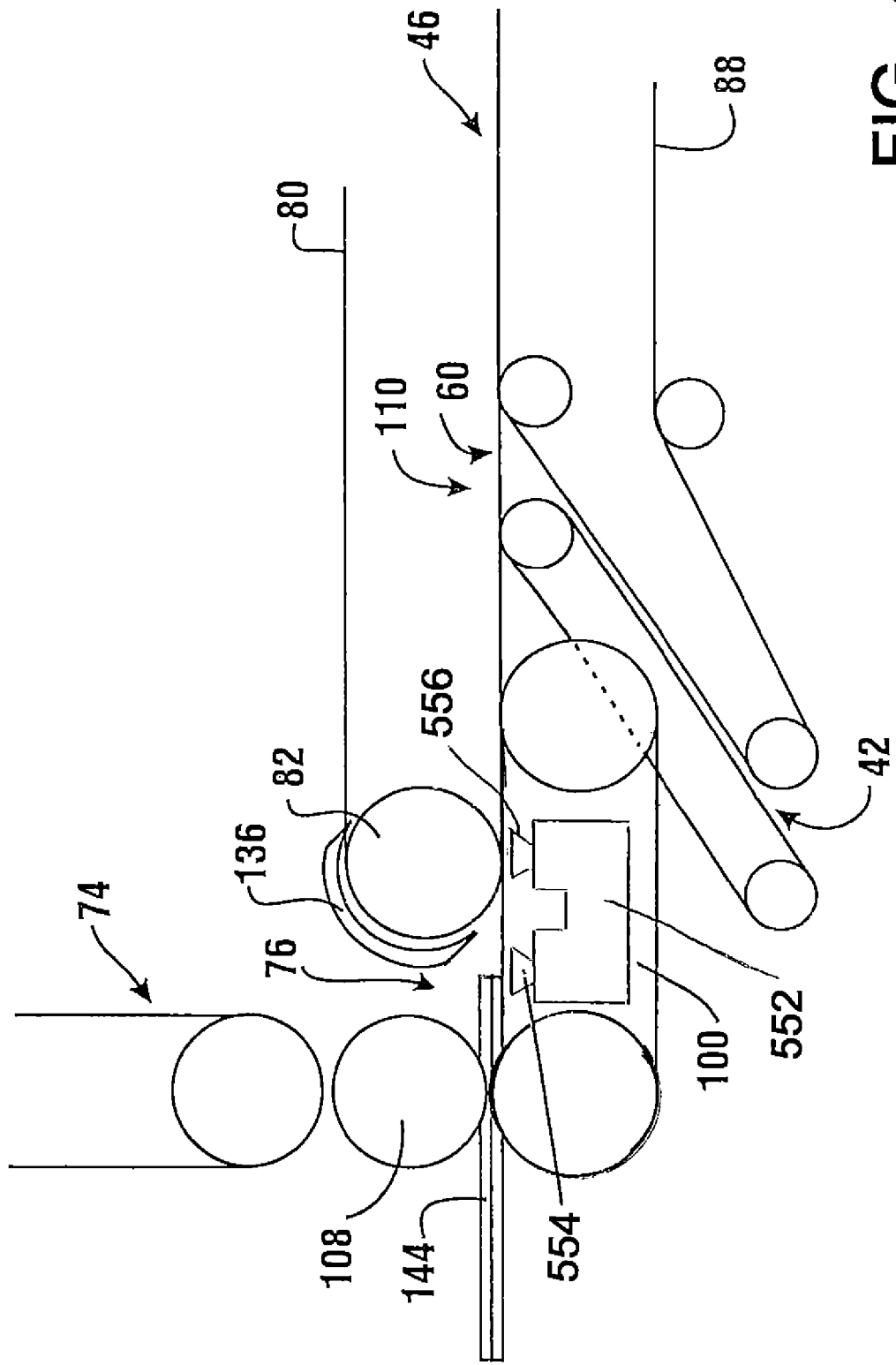
FIG. 40 shows another embodiment of an exemplary module which is positioned at a different location in an automated transaction machine.

FIG. 40 shows a note analysis module 552 that is located adjacent to the transport section 100. The module 552 is positioned to determine the denomination of note 140 after the note was added to the stack 144. The notes's denomination is checked while the note still remains in the stack 144. The module 552 includes data-obtaining devices (e.g., readers, scanners) 554, 556.

Figure 41:
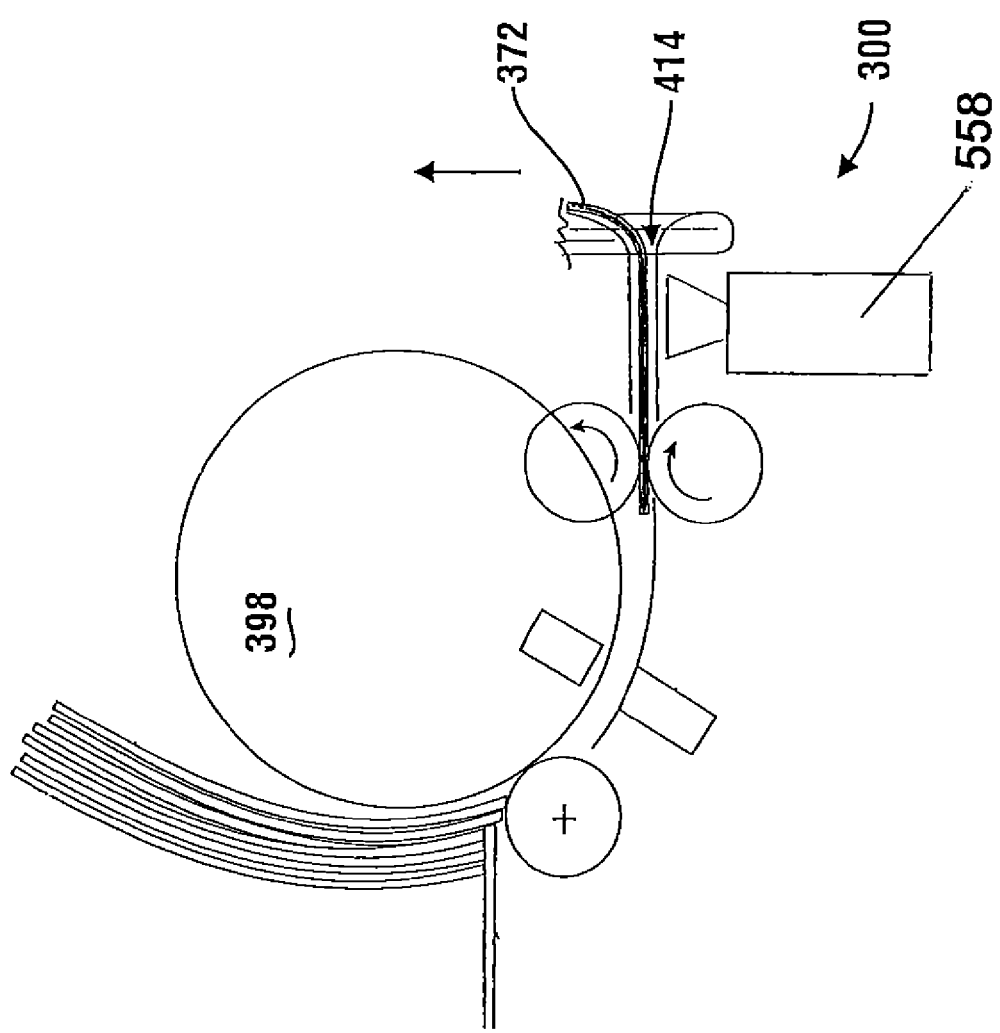
FIG. 41 shows further embodiment of an exemplary module which is positioned at a further location in an automated transaction machine.

FIG. 41 shows a module 558 that is positioned to analyze a note 372 that was picked by the picking member 398 but before the note is fully moved into the sheet transport 300. The module 558 is located between (intermediate) the picking member 398 and the transport 300. Thus, the module 558 is adjacent both the picking member 398 and the transport path.

Figure 42:
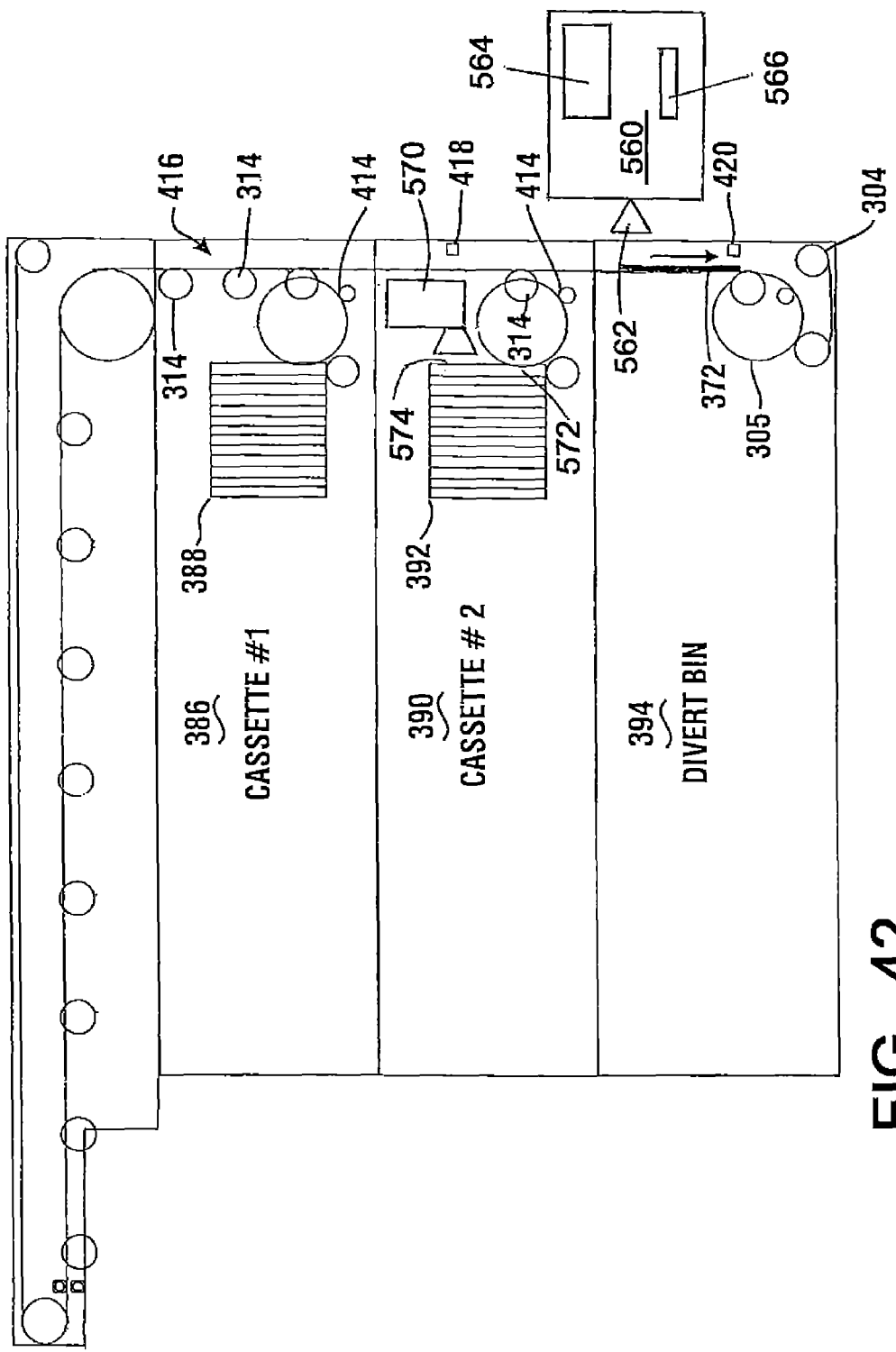
FIG. 42 shows yet another embodiment of an exemplary module which is positioned at yet another location in an automated transaction machine.

FIG. 42 shows a note analysis module 560 positioned adjacent a portion of the transport path 416, which portion is near the divert bin 394. The module 560 can be located on either side of the path 416. The module may also be in the path 416, with a note passing through the module as the note moves in the path. As the note 372 moves (downward) into the note position shown in the Figure, the module 560 is operable to read data from the note 372. From this read data the module 560 can determine the note's denomination. Additionally, the module 560 is also operable to read the note data as the note 372 is being moved (upward) from the note position shown in the Figure. Thus, the module can perform a double review of the same note.

The note analysis module 560 includes a recorder (e.g., reader, scanner, image capturing device, etc.) 562, at least one processor 564, and memory (e.g., a data store) 566. The module 560 can comprise a camera (e.g., a video camera), where the processor 564 is operable to determine whether data captured by the camera corresponds to the particular denomination of the cassette (e.g., cassette 386 or 390) from which the note was taken. Alternatively, the processor 564 may first try to recognize the denomination of the note 372, then compare the recognized denomination to the denomination indicated by the note's source cassette. If the processor cannot recognize a note's denomination, then that note can be made inaccessible to a customer. For example, an unrecognizable note may be moved to and then stored in an invalid (divert, suspect, or reject) note storage bin located in the machine.

FIG. 42 also shows a module 570 positioned inside the currency cassette 390. The module 570 is operable to determine the denomination of a leading (front) note 572 in the stack 392. The determination can be based on note data that is obtained (read) from only a portion (e.g., a top half) of the facing side 574 of the top note 572.

Again, the denomination of a currency note can be verified before that note is added to a stack which is given to a customer. However, in other embodiments the currency note can be verified after the note was added to a stack. That is, a stack can be completed before the denomination of each currency note therein is verified. For example, a completed stack can be disassembled, the notes removed therefrom then verified, the notes then reassembled into a stack, and then the reassembled stack presented to the customer. Each successive note of the stack may be removed from the stack in a destack operation, then examined by the security module, and then restacked. In an example, all notes can be examined before any of the notes are brought together to form a stack. In an alternative example, some notes can be in the process of being examined while other (already examined) notes are in the process of being added to the stack being reassembled. That is, a note stack may be simultaneously undergoing both disassembly and reassembly during the denomination review of the stack notes.

Again, a plurality of currency notes may already be grouped in the form of a stack before the denomination of each note therein is checked. Thus, in a further exemplary embodiment, a note analysis module is operatively positioned to read the denomination value of each note in a stack of notes. The module is programmed to add the detected note values to determine a total value for the entire stack. During the cash dispense transaction the module can obtain the total value of the cash dispense from the machine computer (or some other processor). The module is programmed to compare the determined stack value to the obtained cash value. If the values do not match then the module can cause an output indicating that at least one note came from a mislabeled currency cassette. Notification (e.g., via a message to personnel) or machine action (e.g., shutdown) resulting from the detection of a bad note (e.g., a mislabeled denomination) can be performed in a manner as previously discussed.

As already discussed, in an exemplary automated banking machine can be shutdown if a note's determined denomination differs from the denomination indicated by the specific cassette from which the note was taken. However, in other exemplary embodiments the machine is not (immediately) shutdown. For example, another exemplary machine is programmed, upon a determination that a note stack includes one or more problem notes, to dump the entire stack into a note reject bin 394. The machine is further programmed to then try to build another (second) stack that passes the note denomination tests. If all of the notes in the second stack are denomination acceptable, then the cash dispense process can proceed. Such a situation may occur where one cassette had only one bad note.

If all of the notes in the second stack are not denomination acceptable, then there may be a larger problem. Such a situation may occur where one cassette is mislabeled. That is, the cassette may contain only $10 notes but be labeled as containing $20 notes. The situation may require that other denomination related checks and tests be undertaken by the machine before the machine is actually shutdown. That is, the machine can be programmed to carry out other attempts/procedures (e.g., bypassing a problem cassette) to ensure that accurate cash dispense transactions can be conducted before (the last resort of) shutting down the machine.

As previously discussed, in some embodiments a bad note can be detected (during a cash dispense operation) before it is added to a note stack. In such a situation the machine programming can cause the bad note to be dumped into the note reject bin 394 before it is added to the stack. The machine can then attempt to replace the discarded note with another note that meets the proper note denomination. That is, the machine can try to provide the stack with an acceptable note. If unsuccessful, then the machine can perform other procedures/steps to try to maintain the ability to conduct cash dispenses (as already discussed) before being shutdown.

Similarly, a bad note may be detected (as previously discussed) after it was already added to a note stack. Likewise, machine programming can cause the bad note to be stored in the note reject bin 394. The machine can then try to provide the stack with a properly denominated note.

In alternative exemplary embodiments, an automated banking machine can be programmed to bypass one or more problem cassettes in order to maintain an ability to carry out cash dispense transactions. These cash dispense operations may be provided on a reduced or limited basis.

For example, a customer may request a cash withdrawal in the amount of $110. A machine processor recently concludes (e.g., after a denomination detection by a module, etc.) that a currency cassette which indicated $10 bills now only contains $20 bills. No other cassette is available for dispensing $10 notes to the customer. However, there are several cash cassettes that hold $20 notes. In such a situation the exemplary machine programming causes the customer to notified (e.g., via a display screen) that the amount requested cannot be provided. However, the programming also causes the customer to be offered (e.g., via the display screen) a choice of accepting a larger or smaller cash withdrawal amount. The programming can be part of an alternative cash withdrawal (software) application that a machine processor is configured to run when the machine's current circumstances and current capabilities are met (determined).

The machine processor programming determines the (two) amounts to offer the customer. The offers can be based on the amount requested ($110). For example, the customer may be given the option to choose to withdraw either $100 or $120. The customer is also given the option to cancel the transaction. If no choice is made within a predetermined time period, then the transaction and user session are canceled.

In other embodiments the customer (machine user) may be given other amount selection options. For example, based on a machine processor determining that only $20 bills are currently available for dispensing, the machine may be configured (e.g., programmed) to let the customer select their own preferred amount that is a multiple of 20. That is, the machine can inform (e.g., via a display device, audio message, etc.) the customer that the machine can only dispense $20 bills. The machine can ask the customer to provide input that corresponds to a new (different) cash amount that is a factor of twenty.

Furthermore, only one amount may be offered to the customer. For example, only the higher amount (e.g., $120) may be offered. Since the higher amount includes the requested amount, the customer may find the different amount to be more acceptable. Other amounts may be offered that are based on prior cash withdrawals that were made (on the current customer account) in recent user sessions.

In another embodiment, a machine may be programmed to automatically dispense the closest higher amount possible, if the transaction is a cash withdrawal transaction. The customer would not be provided with an ability to select a different amount. For example, if a machine is unable to dispense a requested cash withdrawal amount of $110, then the machine determines a new amount to dispense. This new amount can be physically dispensed by the machine. This new amount may need to meet several criteria, such as: (1) an amount nearest to the requested amount ($110); and (2) an amount greater than the requested amount ($110). If only $20 bills are available for dispensing, then the machine would determine the new amount to be $120. The machine would then request approval from the transaction host to dispense the new amount to the customer. If approved, then the new amount ($120) would be dispensed to the customer in carrying out the customer's requested cash withdrawal transaction. The transaction receipt would indicate that $120 was withdrawn. The transaction host, after receiving confirmation from the machine that the transaction was completed, would cause the value of the customer's account to be reduced by $120. The account would be assessed any necessary fee (e.g., transaction fee).

In review, after a requested cash dispense transaction is approved by a financial transaction host (computer, server, etc.) then the machine proceeds to obtain the correctly denominated currency notes in carrying out the transaction. Before the obtained notes are given to the customer their denomination is checked (verified) by the machine. The verification involves determining the denomination of each obtained note, and then comparing the determined denomination of the individual note to that denomination indicated by the currency cassette from which that individual note was obtained (picked). In an exemplary embodiment the machine is configured (both structurally and functionally) to cause the cancellation of an approved cash dispense transaction that cannot be performed by the machine.

If a customer (machine user) who requested the (unavailable) transaction agrees to accept a cash dispense for a different amount (in comparison to the originally requested amount), then the machine can operate to cause a new (cash withdrawal) transaction request to be initiated. For example, a customer who originally requested an amount ($110) that cannot be fulfilled may then accept a presented (displayed) option to withdraw a different amount ($120). In response to the newly accepted amount ($120), the machine operates to request from the transaction host an approval for a cash dispense transaction (on the customer's account) in the amount of $120. This is a request for host approval of a second transaction in the same user session. The customer's account information was already received from the customer during the request for the $110 involving the first cash dispense transaction. Upon host approval for the second transaction, then the machine carries out the transaction which includes dispensing the requested $120.

The machine causes the host approved first transaction (a request for $110) to get canceled. When and how the machine initiates the transaction cancellation process can vary. In one embodiment a machine can be programmed to inform the host to cancel the first transaction immediately after determining that it cannot be carried out at the machine level. In another embodiment a machine can wait until after the customer indicates acceptance of a different cash amount before telling the host to cancel the first transaction. In a further embodiment a machine can inform the host to cancel the first transaction after the user session has ended. In yet another embodiment, the machine may not have to notify or request the host to cancel the unavailable first transaction. Rather, the host may automatically cancel the first transaction upon not receiving a transaction completion message from the machine within a predetermined time period.

In some embodiments the machine (and host) programming may require that the first transaction be canceled before the machine can request approval of a second transaction (or before the host will approve a second transaction). That is, the machine and host relationship may require that a still open host-approved transaction be closed (i.e., completed or cancelled) before the host will approve another (new) transaction requested by that same machine. In other words, the programming may not allow transactions to overlap. In other embodiments simultaneous transactions involving a particular machine and a host may be open (ongoing).

For any inconvenience that may have been caused to a customer because of a machine's inability to carry out a requested cash dispense transaction (e.g., cash withdrawal transaction, check cashing transaction, credit/debit card cash advance transaction, bill exchange transaction, etc.) the machine may be programmed to additionally provide some type of monetary value to the affected customer. The monetary value may be in the form of an item (e.g., a coupon, voucher, discount, etc.) that is dispensed from the machine to the customer. The monetary value may be gift/rebate payment (25 cents) made to the customer's account. Alternatively, the monetary value may involve waiving the normal transaction fee associated with the cash dispense transaction.

A note analysis module can be configured (through hardware, firmware, and/or software programming) to verify the bill denomination for an entire cassette only once. For example, the denomination verification for a newly installed cassette may occur during the first dispense operation that involves that cassette. That is, if the note analysis module determines (in carrying out the first dispense operation) that the denomination ($20) of bills taken from the cassette correspond to the denomination data ($20) received by the module for that cassette, then all bills in the cassette are deemed to be of the correct denomination ($20). As a result, no additional denomination verification is carried out by the module on any additional bills coming from that cassette during the remaining period the cassette is in the machine. However, replacement of the cassette would trigger a new denomination verification process for the newly installed cassette.

In an alternative exemplary embodiment, a note analysis module is configured to verify bill denomination with regard to a particular cassette on a periodic or predetermined basis. For example, each fifth time a cassette is used in a cash dispense transaction, a denomination verification may be conducted on the bills taken from the cassette for the fifth cash dispense.

In still other alternative exemplary embodiments, a note analysis module can be configured to verify bill denomination with regard to a particular cassette on a random basis.

As previously discussed, a single security module can be used. The module (or a scanner thereof) may be located adjacent a bill stacker that can receive notes from several cassettes. However, in other embodiments a plurality of modules can be used. For example, a respective module may be positioned adjacent the outlet of a respective currency cassette. That is, each respective cassette can have a respective machine module associated therewith. The particular module can receive the particular cassette's denomination data from the machine computer. Alternatively, the particular module can receive (read) the particular cassette's denomination data directly from the cassette. Because a module is closely positioned next to its associated cassette, the module can read (scan) a note soon after the note is taken (picked) from the cassette. In other arrangements the module can be a part of the note picker mechanism.

In still other embodiments the currency cassette can include the security module. That is, the module can be a part of (e.g., inside) a currency cassette. The module can store in its memory the bill denomination (e.g., $20) of its cassette. For example, note module 570 in FIG. 42. The module may be programmed with the denomination data. The module can be positioned to scan the note which is the next note to be taken (removed) from the cassette. This next note may be the top note in the stack. The module can communicate with the machine computer, or a linking processor associated with the machine computer. The communication can be wireless (RF signal, RFID, etc.). If the module detects (inside the cassette) a note that does match the cassette's designated denomination (e.g., $20), then it informs the linking processor of the error. The linking processor can notify the machine computer, which can function to prevent dispensing operations until the error issue is resolved.

In some embodiments the machine can accept valid checks through operation of a check acceptor/validator and then dispense currency notes corresponding to the value of the check during a check cashing transaction/operation which includes verification of the denomination of bills taken from a currency cassette. That is, an exemplary automated banking machine is configured (with hardware and software) to check and/or verify the denomination of currency note just before the note is presented (made manually accessible) to the customer. The currency note denomination verification process can be performed by the machine during (as part of) the transaction that was requested by the customer. In other embodiments a remote computer can control the machine to cause the verification process to be carried out. Also, all data comparing and determining involved in the verification process may be performed remote from the machine.

Of course it should be understood that these approaches are exemplary and in other embodiments other approaches can be used. Thus, an automated banking machine of the exemplary embodiment achieves at least some of the above stated objectives, eliminates difficulties encountered in the use of prior devices and systems, solves problems, and attains the desirable results described herein.

In the foregoing description certain terms have been used for brevity, clarity and understanding. However, no unnecessary limitations are to be implied therefrom because such terms are used for descriptive purposes and are intended to be broadly construed. Moreover the descriptions and illustrations given are by way of examples and the exemplary embodiments are not limited to the exact details shown or described.

In the following claims any feature described as a means for performing a function shall be construed as encompassing any means capable of performing the recited function, and not mere equivalents of the particular means described in the foregoing description. The inclusion of an Abstract shall not be deemed to limit the claimed invention to any of the features described in the Abstract.

Having described the features, discoveries and principles of the invention, the manner in which it is constructed and operated, and the advantages and useful results attained; the new and useful structures, devices, elements, arrangements, parts, combinations, systems, equipment, operations, methods, and relationships are set forth in the appended claims.

We claim:
1. Apparatus comprising:
an automated banking machine operable to cause financial transfers responsive at least in part to data read from data bearing records,
  wherein the machine includes at least one user data reader operable to read user data usable to identify a financial account of a machine user,
    wherein the machine is operable to carry out a financial transaction involving the account,
  wherein the machine includes a cash dispenser,
    wherein the cash dispenser is operable to dispense currency notes to authorized users of the machine,
  wherein the machine is operable to carry out a cash dispense transaction on a financial account for an authorized user, based at least in part on a computer-determined relationship between user data read by the at least one user data reader and the financial account,
  wherein the machine includes at least one note picker,
    wherein the at least one note picker is operable to take at least one currency note from a currency cassette,
  wherein the machine includes at least one cassette data reader,
    wherein the at least one cassette data reader is operable to read from the currency cassette, cassette data indicative of currency note denomination held by the cassette,
  wherein the machine includes at least one note reader,
    wherein the at least one note reader is operable during a cash dispense transaction to read note data from each currency note taken from the currency cassette during the transaction,
      wherein the machine is operable during the transaction to determine from note data read by the at least one note reader, a respective currency note denomination of each respective currency note taken from the currency cassette,
      wherein the machine is operable during the transaction to determine whether a currency note denomination determined from note data read by the at least one note reader differs from the currency note denomination indicated by the cassette data,
      wherein the machine is operable responsive at least in part to a determination of differing currency note denominations, to cause at least one denomination discrepancy message to be sent to at least one remote computer.
2. The apparatus according to claim 1 wherein the automated banking machine is part of a check cashing banking system, wherein the machine includes a check acceptor,
  wherein the machine is associated with at least one computer,
  wherein the at least one user data reader includes both
    at least one card reader, and
    at least one biometric reader,
  wherein the at least one computer is operative during a user transaction session with the machine to:
    cause card data to be read from a card through operation of the at least one card reader, and then cause the read card data to be compared with card information stored in at least one data store, and
    cause biometric data to be read through operation of the at least one biometric reader, and then cause the read biometric data to be compared with biometric information in the at least one data store, wherein the at least one computer is operative to authorize the user to perform a check cashing transaction that includes operation of the cash dispenser responsive at least in part to both:
computer-determined correspondence between the read card data and stored card information, and
computer-determined correspondence between the read biometric data and stored biometric information.

3. Apparatus comprising:
an automated banking machine,
wherein the machine includes a cash dispenser,
wherein the machine includes a plurality of currency cassettes,
wherein each respective cassette is associated with a respective note denomination,
wherein a first cassette of the plurality of currency cassettes is associated with a first denomination,
wherein a second cassette of the plurality of currency cassettes is associated with a second denomination,
wherein the second denomination differs from the first denomination,
wherein the machine includes at least one note analyzer operable to analyze currency notes,
wherein the machine is configured to cause during a cash dispense transaction, analysis of notes to be used in the transaction by the at least one note analyzer,
wherein the machine is operable during the transaction, based at least in part on the analysis, to determine:
whether any note from the first cassette has a denomination that differs from the first denomination, and
whether any note from the second cassette has a denomination that differs from the second denomination,
wherein the machine is configured to cause at least one denomination discrepancy message to be sent to at least one remote computer, responsive at least in part to determining at least one of:
a note removed from the first cassette has a denomination that differs from the first denomination, and
a note removed from the second cassette has a denomination that differs from the second denomination.

4. The apparatus according to claim 3 wherein each respective cassette includes cassette data indicative of a respective note denomination,
wherein the machine includes at least one cassette data reader,
wherein the at least one cassette data reader is operable to read cassette data from a currency cassette.

5. The apparatus according to claim 3 wherein the currency note dispenser includes a note denomination determining module,
wherein the module includes at least one note analyzer and at least one processor,
wherein the module is operable to analyze a respective currency note to determine denomination of the respective currency note.

6. The apparatus according to claim 5 wherein the cash dispenser includes a stacker operable to produce a stack of currency notes,
wherein the at least one note analyzer includes a scanner, wherein the scanner is located adjacent the stacker.

7. The apparatus according to claim 3 wherein the machine is configured to shutdown subsequent to causing the at least one denomination discrepancy message to be sent to the at least one remote computer.

8. Apparatus comprising:
an automated banking machine,
wherein the machine includes a cash dispenser,
wherein the machine includes a plurality of currency cassettes,
wherein each respective cassette includes cassette data corresponding to an indicated note denomination,
wherein the machine includes at least one note data reader,
wherein the machine includes at least one note analyzer operable to analyze note data read by the at least one note data reader,
wherein the machine is operable to remove at least one currency note from a respective cassette,
wherein the machine is configured to operate during a cash dispense transaction to:
read note data from each respective note to be dispensed in the transaction,
then analyze the read note data to determine an actual note denomination of the respective note, and
then determine whether the actual note denomination differs from the indicated note denomination of the respective cassette from which the respective note was removed,
wherein the machine is operable to cause at least one denomination discrepancy message to be sent to at least one remote computer, responsive at least in part to determining that the actual note denomination differs from the indicated note denomination.

9. The apparatus according to claim 8 wherein the at least one note data reader includes a scanner.

10. The apparatus according to claim 9 wherein the currency note dispenser includes a note denomination determining module,
wherein the module includes the at least one note data reader, the at least one note analyzer, and at least one processor,
wherein the module is operable to determine an actual note denomination of a currency note.

11. The apparatus according to claim 8 wherein the machine is configured to shutdown subsequent to causing the at least one denomination discrepancy message to be sent to the at least one remote computer.

12. The apparatus according to claim 8 wherein the machine includes at least one divert bin,
wherein the machine is configured to operate responsive at least in part to determining that the actual note denomination differs from the indicated note denomination, to store the respective note in the at least one divert bin.

13. The apparatus according to claim 12 wherein the machine is configured to operate responsive at least in part to determining that the actual note denomination differs from the indicated note denomination, to obtain a replacement note that has a denomination that corresponds to the indicated note denomination,
wherein the machine is configured to then continue the cash dispense transaction using the replacement note.

14. The apparatus according to claim 12 wherein the machine is configured to operate responsive at least in part to determining that the actual note denomination differs from the indicated note denomination, to cause the cash dispense transaction to be cancelled.

15. The apparatus according to claim 8 wherein the machine includes a stacker that is operable during the transaction to produce a single stack of notes to be dispensed in the transaction,
   wherein the machine is configured to remove a respective note from the stack prior to reading note data from the respective note.

16. The apparatus according to claim 8 wherein the machine includes a stacker that is operable during the transaction to produce a single stack of notes to be dispensed in the transaction,
   wherein the machine is configured to operate during the transaction to read note data from a respective note prior to adding the respective note to the stack.

17. The apparatus according to claim 8 wherein the cash dispense transaction involves a requested amount of cash, wherein the machine is configured to operate during the transaction responsive at least in part to determining that the actual note denomination differs from the indicated note denomination, to dispense an amount of cash that differs from the requested amount of cash.

18. The apparatus according to claim 17 wherein the machine is configured to operate during the transaction responsive at least in part to determining that the actual note denomination differs from the indicated note denomination, to dispense an amount of cash that is greater than the requested amount of cash.

19. The apparatus according to claim 8 wherein the machine includes at least one cassette data reader, wherein the at least one cassette data reader is operable to obtain cassette data from a currency cassette.

20. The apparatus according to claim 19 wherein the machine is configured to operate to obtain the cassette data prior to start of the cash dispense transaction.

* * * * *